(12) United States Patent
Nagao et al.

(10) Patent No.: US 6,763,915 B2
(45) Date of Patent: Jul. 20, 2004

(54) MAINSPRING MECHANISM AND DEVICE HAVING THE SAME

(75) Inventors: Shoichi Nagao, Suwa (JP); Eiji Morikuni, Suwa (JP); Taro Matsunaga, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/978,247

(22) Filed: Oct. 15, 2001

(65) Prior Publication Data

US 2003/0066713 A1 Apr. 10, 2003

(30) Foreign Application Priority Data

| Oct. 16, 2000 | (JP) | 2000-315819 |
| Oct. 17, 2000 | (JP) | 2000-317090 |
| Mar. 9, 2001 | (JP) | 2001-067648 |
| Sep. 3, 2001 | (JP) | 2001-266337 |
| Sep. 12, 2001 | (JP) | 2001-277095 |
| Sep. 12, 2001 | (JP) | 2001-277096 |
| Sep. 12, 2001 | (JP) | 2001-277097 |
| Sep. 27, 2001 | (JP) | 2001-297757 |
| Sep. 27, 2001 | (JP) | 2001-297758 |
| Sep. 27, 2001 | (JP) | 2001-297759 |

(51) Int. Cl.$^7$ ............................................. F03G 1/00
(52) U.S. Cl. ..................... 185/37; 188/290; 267/155
(58) Field of Search ........................... 185/37, 38, 45, 185/9, 11; 188/290, 296; 267/154, 155, 82

(56) References Cited

U.S. PATENT DOCUMENTS

| 3,693,759 A | * | 9/1972 | Schindel | 185/40 R |
| 4,550,470 A | * | 11/1985 | Omata | 16/85 |
| 5,211,269 A | * | 5/1993 | Ohshima | 188/290 |
| 5,213,183 A | * | 5/1993 | Maurer | 188/290 |
| 6,015,142 A | * | 1/2000 | Ulicny | 267/154 |
| 6,173,822 B1 | * | 1/2001 | Korb et al. | 188/307 |

FOREIGN PATENT DOCUMENTS

| JP | 62-74893 | 5/1987 |
| JP | 62-216847 | 9/1987 |
| JP | 64-13239 | 1/1989 |
| JP | 64-015547 | 1/1989 |
| JP | 05-071264 | 3/1993 |
| JP | 05-071265 | 3/1993 |
| JP | 7-19189 | 4/1995 |
| JP | 11-052876 | 2/1999 |
| JP | 11-076633 | 3/1999 |

* cited by examiner

*Primary Examiner*—David Fenstermacher
(74) *Attorney, Agent, or Firm*—Mark P. Watson

(57) ABSTRACT

A winding stem (10) is connected to an inner end (11a) of a mainspring (11), and an outer end (11b) of the mainspring (11) is connected to a barrel drum (12). A braking plate (15) is placed inside a braking case (14), and the braking case (14) is filled with a fluid (16). An uneven joint portion (10b) is formed at the lower end of the winding stem (10), and is engaged with an uneven joint portion (15b) of the braking plate (15) placed in the braking case (14). By adopting the above configuration which can simplify the structure of the mainspring mechanism having the braking plate and which can reduce the number of components, the size and production cost of the mainspring mechanism can be reduced.

7 Claims, 50 Drawing Sheets

MAINSPRING MECHANISM AND DEVICE HAVING THE SAME

TECHNICAL FIELD

The present invention relates to a mainspring mechanism and a device having such a mechanism, and more particularly, to the configuration of a driving mechanism which is suitable for use as an automatic opening and closing mechanism, or the like for a lid and a storage section.

BACKGROUND ART

In general, small mainspring mechanisms are used as driving sources for obtaining a driving force for various kinds of objects in various fields. Normally, a spiral mainspring is held inside a mainspring case called a barrel drum, and a rotating shaft connected to the inner end of the mainspring is rotatably supported in the center of the mainspring case. While only the rotating shaft is sometimes used as a unique driving-force output section in this case, for example, one of the rotating shaft and the mainspring case is sometimes used as an input shaft, and the other is used as an output shaft.

In the above-described mainspring mechanisms, since the driving force obtained after winding up the mainspring generally increases and decreases in accordance with the degree of winding of the mainspring, the driving speed varies depending on the degree of winding of the mainspring when a fixed driving load exists. Accordingly, as disclosed in Japanese Patent Publication No. 54-31146, a configuration (speed regulating mechanism) is adopted in which a braking plate rotatably held in a braking case filled with a fluid, such as liquid or powder, is connected to one end of a mainspring, and variations in the driving force of the mainspring are suppressed by the braking action of the braking plate, thereby reducing changes in driving force or driving speed.

However, while the above mainspring mechanism with the braking device has the configuration including the mainspring, the mainspring case, the braking plate, and the braking case, it must have a high sealing performance because it is necessary to fill the braking case for holding the braking plate with fluid or the like. Since it is also necessary to connect the braking plate and the mainspring, the configuration is usually quite complicated, the number of components is large, and it is difficult to reduce the production cost. Since the shape and structure are complicated, the mainspring case and the like are complicated, and it sometimes cannot be made of materials other than a plastic mold from a cost standpoint. This results in insufficient rigidity and insufficient durability of the mechanism in most cases. Furthermore, the overall mechanism is made thicker for similar reasons, and it is difficult to incorporate it in various devices.

Some of the conventional mainspring mechanisms having the braking device cannot perform efficient driving since the rotational load, such as frictional load, is increased due to size reduction and a simplified structure, and are difficult to be mounted in various devices since the configuration is special.

Furthermore, since the braking property is determined almost by the structure of the braking section, the material of fluid, and the like, the degree of flexibility in the structure of the braking section and in the selection of the material is low, and it is difficult to adjust the braking property of the assembled braking section.

Accordingly, the present invention aims to solve the above problems, and objects of the invention are to reduce the size and thickness of a mainspring mechanism having a braking device by adopting a configuration which can simplify the structure of the mainspring mechanism and which can reduce the number of components, to reduce the production cost of the mainspring mechanism, to provide a mainspring mechanism which can efficiently transmit the driving force and which can easily be mounted in various devices, and to provide a configuration in which the braking property of a braking section can easily be adjusted.

DISCLOSURE OF INVENTION

In order to achieve the above objects, a mainspring mechanism of the present invention includes a driving-force storing section having a mainspring to be wound up by a winding force so as to store a resilient force, a mainspring holding portion connected to the outer end of the mainspring so as to hold the mainspring therein, and a rotating member connected to the inner end of the mainspring and rotatably supported by the mainspring holding portion; an output device connected to the rotating member; and a braking section having a braking member connected to the rotating member so as to produce a braking force in response to the rotation of the braking member. According to this invention, since the rotating member is connected to the inner end of the mainspring, the diameter of the bearing portion of the winding stem supported by the mainspring holding portion is reduced, and the frictional load can be decreased. Furthermore, since the rotating member having the output device is placed on the inner side, the outer peripheral surface of the mainspring holding portion or the like can be easily attached to another member or the like. Since the rotating member is connected to the inner end of the mainspring, and also to the output device, the output device can be easily replaced and the shape and structure of the output device can be determined with more freedom by making the rotating member and the output device separate from each other. Therefore, it is possible to further reduce the size of the mainspring, and to reduce the production cost. The output device of the present invention may be formed of various structures, such as a gear, a gear train, a pulley, a chain, a belt, or a shaft.

Since the mainspring slowly stores and emits elastic energy because of the braking force produced by the braking section, the lifetime thereof is prolonged. The mainspring includes a constant torque spring and a coil spring which are used in such a manner as to receive and emit energy in response to changes in the winding state. The mainspring, the rotating member, and the mainspring holding portion may be connected by arbitrary device, such as press welding, hooking, or welding.

In the present invention, it is preferable that the driving-force storing section and the braking section be separate from each other. According to this invention, since the driving-force storing section and the braking section are separate, for example, in a case in which the driving-force storing section can independently operate, the braking section can be incorporated after the driving-force storing section is assembled, and the driving-force storing section can be removed from the production line before assembly of the braking component when a component, such as the mainspring, of the driving-force storing section is defective. For example, in a case in which the braking section can independently operate, since the driving-force storing section can be incorporated after the braking section is assembled, handling, management and the like of the components during assembly operation can be facilitated, for example, the braking section having the structure filled with a viscous fluid can be combined with another component after filling, or a plurality of braking sections having different braking forces can be prepared beforehand.

In the present invention, it is preferable that the braking section form a unit by itself. Herein, "the braking section forms a unit by itself" device that another component can be mounted into the braking section after the braking section has been completely assembled. According to this invention, since the braking section forms a unit by itself, it can be easily handled, and the assembly operation can be easily performed, for example, the braking section can be linked with the driving-force storing section in the final process of assembly. In particular, in a case in which the fluid is stored in the braking section, the braking section can be easily handled and managed with it being sealed. It is also possible to prepare a plurality of types of braking sections having different braking properties beforehand, and to selectively mount the braking sections in accordance with required properties of the product.

In the present invention, it is preferable that the rotating member and the braking member be separate from each other, and be linked with each other at least in the rotating direction. According to this invention, since the rotating member and the braking member are separate and are linked with each other in the rotating direction, it is possible to adopt an assembly procedure in which one of the driving-force storing section and the braking section is assembled first, and the other is then connected thereto. This can enhance assembly efficiency, for example, the components can be easily handled, and the assembly operation can be easily performed. While the rotating member and the braking member may be linked in the rotating direction by any structure engaged in the rotating direction, in particular, they are linked by, for example, an engaging structure between a groove crossing the center of rotation and a corresponding projection (for example, between a linear groove and a projection shaped like the tip of a flat-tip screwdriver) or an engaging structure between a polygonal recess and a polygonal projection (for example, a hexagon socket and a hexagon prism). The rotating member and the braking member may be press-fitted together. In this case, assembly efficiency is rather low, but both the members can be completely combined. Since the rotating member is rotatably supported in the mainspring holding portion, the structure for guiding the braking member is unnecessary.

In the present invention, it is preferable that the braking section has a cushioning mechanism for cushioning the rotational force transmitted from the driving-force storing section to the braking section. According to this invention, since the rotational force to be applied to the braking section can be cushioned by the cushioning mechanism, it is possible to prevent the braking section, the transmission mechanism, and the like from being broken when a great force is applied thereto. As the cushioning mechanism, a slip device, a clutch mechanism, or the like may be used.

In this case, it is preferable to place a slip device having a predetermined load resistance in the course of a rotation transmitting path from the rotating member to the braking member. In a case in which an excessive force is applied from the outside, or the braking force of the braking section increases due to a decrease in temperature, the slip device slips so as to suppress the transmission of rotation, and to reduce the load to be applied to the driving-force storing section and the braking section. Therefore, it is possible to prevent the mainspring mechanism from being damaged and broken. In this case, it is preferable that the braking member be in contact with a fluid and that the slip surface of the slip device be placed inside the fluid. In this case, since the slip surface of the slip device is placed inside the fluid, it is possible to achieve the lubricating and cooling effects of the fluid, to prevent seizing and wear, and to thereby stabilize the slipping state.

It is preferable to place a rotation intermitting device capable of intermitting the transmission of rotation in the course of the rotation transmitting path from the rotating member to the braking member. Since the rotation intermitting device makes it possible to apply an appropriate braking force and to remove the braking force, the braking force application property can be appropriately determined according to the usage of the mainspring mechanism. In this case, it is preferable that the rotation intermitting device cut off the transmission of rotation when the driving-force storing section stores the driving force, and transmit the rotation when the driving-force storing section emits the driving force. In this case, since the transmission of rotation is cut off by the rotation intermitting device when the driving force is stored in the driving-force storing section, the driving-force storing section and the braking section can be prevented from being damaged and broken in a case in which an excessive force is applied from the outside, or in a case in which the braking force excessively increases due to a decrease in temperature of a fluid resulting from a decrease in environmental temperature when the braking section produces a braking force by using the viscosity resistance of the fluid.

Another mainspring mechanism of the present invention includes a driving-force storing section having a mainspring to be wound up by a winding force so as to store a resilient force, and a mainspring holding portion connected to an outer end of the mainspring so as to hold the mainspring therein; a center member connected to an inner end of the mainspring; and a braking section for applying a braking force to the relative movement between the mainspring holding portion and the center member, wherein the driving-force storing section and the braking section are placed so that they do not substantially overlap in two dimensions, as viewed from the axial direction of the mainspring. According to this invention, since the driving-force storing section and the braking section are placed so that they do not overlap in two dimensions as viewed from the axial direction of the mainspring, they can be arranged so as not to overlap in the thickness direction, and this can reduce the thickness of the mainspring mechanism. When one of the driving-force storing section and the braking section becomes defective, it can be repaired without separating the sections, or without disassembling the other. Moreover, the driving-force storing section and the braking section can be independently and finely adjusted without being separated from each other or without disassembling one of them.

Herein, "the driving-force storing section and the braking section substantially do not overlap in two dimensions" device that an essential region of the driving-force storing section (that is, a region where the driving force is substantially stored) and an essential region of the braking section (that is, a region where the braking force is substantially produced) are arranged so as not to overlap each other. It is, of course, more preferable that the driving-force storing section and the braking section do not physically overlap at all in two dimensions.

The braking section may obtain a braking force from the flow resistance of a fluid such as gas or liquid. In this case, for example, the braking section may be composed of a rotatable braking member, and a fluid in contact with the braking member. Since a rotational resistance of gas is produced by providing the braking member with a wing, it can be used as a braking force. The flow resistance of a fluid other than gas in contact with the braking member may be used as a part of the braking force. This makes it possible to combine the braking using the gaseous resistance and the braking by the fluid other than gas. In this case, by placing the fluid other than gas only in a part of the space around the braking member, and increasing and decreasing the amount of the fluid, the braking force can be easily adjusted. Furthermore, the braking section may obtain a braking force by electromagnetic induction. In this case, for example, the braking section may be composed of a rotatable braking member, and a counter member opposing the braking member, wherein electromagnetic induction is produced between the braking member and the counter member (for example, a permanent magnet is placed in one of the braking member and the counter member, and a coil is placed in the other), and an electrical load against an induced electromotive force is connected thereto.

The mainspring includes a constant-torque spring and a coil spring used in such a manner as to receive and emit energy in response to changes in the winding state. The mainspring, the mainspring holding portion, and the center member may be connected by arbitrary device, such as press welding, hooking, or welding.

In the present invention, it is preferable that the braking section be placed on the outer periphery of the driving-force storing section. According to this invention, since the braking section is placed on the outer periphery of the driving-force storing section, it is possible to easily increase the operating distance and the braking area of the braking section. This can enhance the braking effect without increasing the size of the mechanism. For example, in a case in which the braking section includes a rotatable braking member, and a stationary counter member (for example, a braking case) disposed opposed thereto, when the braking member is connected to the driving-force storing section in the rotating direction and the counter member is placed outside the braking member, the operation of fixing the counter member by mounting onto another member is easily performed because the counter member is placed on the outermost side.

In the present invention, it is preferable that the braking section be placed inside the driving-force storing section. According to this invention, since the braking section is placed inside the driving-force storing section, after the braking section is completely assembled, the driving-force storing section can be connected thereto or can be assembled. This facilitates the assembly operation. Moreover, since the driving-force storing section can be easily disassembled, it can be subjected to maintenance and parts replacement, independently of the braking section. In a case in which the center member is fixed by being mounted to another member and the mainspring holding portion of the driving-force storing section is rotated so as to output a driving force, since the braking section is placed inside the driving-force storing section, the structure and position for extracting the driving force are not limited by the braking section. Of course, the driving force may be output from the center member.

In the present invention, it is preferable that an output device for outputting a driving force of the mainspring be connected to the driving-force storing section or the center member. According to this invention, an opening & closing structure and a moving portion can be directly or indirectly driven via the output device. Herein, "the output device is connected to the driving-force storing section or the center member" includes a case in which the output device is mechanically attached to the driving-force storing section or the center member, and a case in which the output device is formed integrally with a component of the driving-force storing section, or with the center member.

In the present invention, it is preferable that the driving-force storing section be hermetically sealed. According to this invention, since the driving-force storing section is hermetically sealed, it is possible to prevent dust from entering the driving-force storing section. Moreover, even when a high-viscosity grease is applied around the mainspring, it can be prevented from leaking out of the driving-force storing section. More specifically, it is preferable that the mainspring be enclosed by putting a lid on the aperture of the mainspring holding portion in the driving-force storing section.

In the present invention, it is preferable that a fluid in contact with the braking member be stored in the braking section and that the braking force be produced by the rotational resistance of the braking member with respect to the fluid. According to this invention, since the fluid is stored in the braking section, and the braking member and the fluid are in contact with each other, a high braking force can be ensured, and a stable braking force can be ensured. It is also possible to adjust the braking load in accordance with the viscosity of the fluid or the like, and to achieve various braking properties. Furthermore, since a sufficient braking force can be obtained with a small amount of fluid by adjusting properties, such as viscosity, the size of the braking section can be reduced.

In this case, it is preferable to provide an adjustment device for adjusting the contact area between the braking member and the fluid. By thus changing the contact area between the braking member and the fluid by the adjustment device, the braking load can be changed. More specifically, in a case in which the braking section includes a braking-member holding portion, and a braking member rotating therein, the fluid is in contact with both the inner surface of the braking-member holding portion and the surface of the braking member, and the resistance due to the flow of the fluid serves as the braking force. Therefore, the braking force varies depending on the contact area between the fluid and the braking member. In particular, it is preferable to increase and decrease the contact area of the fluid with the braking-member holding portion together with the contact area of the fluid with the braking member. As the adjustment device, any device may be used as long as it is capable of changing the contact area between the braking member and the fluid. For example, a device for moving the fluid and a device for changing the amount of the fluid may be used.

It is preferable that the space for storing the fluid in the braking section be extended toward the connecting portion between the braking member and the rotating member. Since the storage space in the braking section is extended toward the connecting portion between the braking member and the rotating member, the fluid is held in the storage space by its surface tension, and is prevented from flowing toward the connecting portion. Therefore, the fluid can be prevented from flowing outside through the connecting portion without adding a sealing member, such as a gasket, and a sealing structure. Since the rotational resistance resulting from the sealing member and the sealing structure is removed, energy loss can be reduced.

A further mainspring mechanism of the present invention includes a driving-force storing section having a mainspring to be wound up by a winding force so as to store a resilient force, and a mainspring holding portion for holding the mainspring therein; a rotating member to be rotated by the driving force of the mainspring; and a braking section for producing a braking force for the relative movement of the mainspring holding portion and the rotating member, wherein a power transmitting device for transmitting the rotation while increasing or decreasing the speed of the rotation is disposed between the driving-force storing section and the braking section. According to this invention, since the power transmitting device for transmitting the rotation while increasing or decreasing the speed of the rotation is disposed between the driving-force storing section and the braking section, the braking force can be increased or decreased by changing the speed-increasing ratio or the speed-reduction ratio of the power transmitting device. Since the braking force can be adjusted by the composition of the power transmitting device, it is possible to extend the range of choices of structures and materials of the braking section, and the like. Moreover, the degree of flexibility in the shape and size of the braking section is increased for a similar reason, and the relative positional relationship between the driving-force storing section and the braking section can be more freely determined because of the power transmitting device disposed therebetween. For example, the thickness of the mainspring mechanism can be reduced by placing the driving-force storing section and the braking section such that they do not overlap. In addition, it is possible to perform the assembly operation while adjusting the braking force of the braking section.

While the power transmitting device is, for example, a gear, a gear train having a plurality of gears, or a pulley and a transmission belt, any structure may be used as long as it transmits the rotation while increasing or decreasing the speed of the rotation.

The mainspring includes a constant-torque spring and a coil spring used in such a manner as to receive and emit energy in response to changes in the winding state. The mainspring, the mainspring holding portion, and the center member may be connected by arbitrary device, such as press welding, hooking, or welding.

In the present invention, it is preferable that the power transmitting device transmits the rotation of the driving-force storing section to the braking section while increasing the speed of the rotation. According to this invention, since the braking force can be increased in accordance with the speed-increasing ratio of the power transmitting device, the braking effect of the braking section can be enhanced, limitations on the structure of the braking section are reduced, and a wider range of structures and materials can be used. Furthermore, since the rotational driving speed of the driving-force storing section is made lower than the rotating speed of the braking section, the output rotation of the driving-force storing section can be easily controlled. This allows the driving speed to be controlled with high precision.

In the present invention, it is preferable that the braking section include a fluid, and a braking member in contact with the fluid, and that the braking force be produced by the rotational resistance of the braking member with respect to the fluid. According to this invention, since the fluid is stored in the braking section, and is in contact with the braking member, a large braking force can be ensured, and a stable braking force can be ensured. Moreover, the braking load can be adjusted in accordance with the viscosity of the fluid, and various braking properties can be achieved. Furthermore, since a sufficient braking force can be obtained with a small amount of fluid by adjusting properties, such as viscosity, the size of the braking section can be reduced.

In the present invention, it is preferable that the braking section has a braking member for producing the braking force by a rotational resistance thereof and that the braking member have a wing for receiving a gaseous resistance. According to this invention, since the wing receives a gaseous resistance when the braking member rotates, a rotational resistance is produced in the braking member by the gaseous resistance, and this resistance serves as a braking force. In particular, in a case in which the power transmitting device transmits the rotation of the driving-force storing section to the braking section while increasing the speed of the rotation, even when the gaseous resistance is low, a sufficient braking force can be ensured. Since the braking force is produced by the gaseous resistance, it is possible to adopt a simple structure, and to thereby reduce the size. The braking force may be obtained by also using the rotational resistance of a fluid other than gas together with the gaseous resistance. In this case, by placing the fluid other than gas only in a part of the space around the braking member, and increasing or decreasing the amount of the fluid, the braking force can be easily adjusted.

In this case, it is preferable that the braking section has an air-current suppressing face for covering at least a part of the outer peripheral portion of the braking member. According to this, since the air-current suppressing face is formed so as to cover at least a part of the outer peripheral portion of the braking member, an air current produced by the wing of the braking member can be prevented from separating from the braking member. This can further increase the rotational resistance by the gas. The air-current suppressing face may be formed of the inner surface of the braking-member holding portion which surrounds the braking member. It is preferable that the air-current suppressing face has an opening. Since this makes it possible to change the gaseous resistance in accordance with the number, position, and area of the opening formed in the air-suppressing face, the braking force can be adjusted.

In the present invention, it is preferable that the braking force be based on electromagnetic induction produced by the rotation of the braking member. More specifically, a braking member and a counter member disposed opposed thereto are provided, a permanent magnet is placed in one of the braking member and the counter member, an electromagnetic transducing device, such as a coil, is placed in the other. By connecting an electrical load to the electromagnetic transducing device, an induced electromotive force is generated in the electromagnetic transducing device by the rotation of the braking member, a current flows therethrough, and a braking force is produced in the braking member. While the braking force can be obtained according to an electrical load on the current (coil current) generated in the electromagnetic transducing device, at least a part of the electrical load can be utilized. For example, it is possible to cause a light-emitting element to emit light, and to cause a speaker to emit sound. Such light emission and sound emission can notify, for example, that braking is being done, or that the device is operating. Since the fluid is unnecessary, adjustment and maintenance can be easily performed.

In this case, it is preferable to provide an electrical-load changing device capable of changing the electrical load against the induced electromotive force produced by the electromagnetic induction. This allows the braking force to be changed by the electrical-load changing device. For example, the electromagnetic force can be increased or decreased, and the braking force can be adjusted by changing the (load) impedance connected to a coil. A variable resistor may be used as the electrical-load changing device.

In the present invention, it is preferable that the braking section has a slip portion where objects make contact with each other, and that the braking force be produced by a frictional resistance at the slip portion. According to this invention, since the braking force can be obtained by the frictional resistance at the slip portion, a simpler and more inexpensive structure is possible. In particular, in a case in which the power transmitting device transmits the rotation of the driving-force storing section to the braking section while increasing the speed of the rotation, a sufficient braking force can be obtained even when the frictional resistance is low, the wear of the slip portion can be reduced, and the lifetime of the slip portion can be prolonged. In this case, it is preferable that at least one of the objects forming the slip portion be made of an elastic material which exerts an elastic force on the other object in such a direction so as to press the other object. Since the frictional resistance can be stabilized by the elasticity of the elastic material and the elastic force to be applied to the sliding surface can be changed by changing the material and compressed state of the elastic material, the frictional resistance can be controlled by the elastic force, and the braking force can be adjusted.

In the present invention, it is preferable that the braking section has a speed control device. For example, in a case in which the flow resistance of the fluid is used as the braking force, such a speed control device is a device which adjusts the contact area between the fluid and the braking member and the amount of the fluid. In a case in which the gaseous resistance is used as the braking force, the speed control device is, for example, a device for adjusting the distance between the wing and the air-flow suppressing face, or a device for adjusting the aperture area of the air-flow suppressing face. In a case in which a braking force produced by electromagnetic induction is used, the speed control device is, for example, an electrical-load changing device (such as a variable resistor). In a case in which the frictional resistance at the slip portion is used as the braking force, the speed control device is, for example, a device for adjusting the pressure to be applied to the slip portion, such as the spring force of a coil spring.

In the present invention, it is preferable to provide a regulating device which can be engaged with and disengaged from the rotating member or the output device so as to regulate the output of the driving force from the mainspring. According to this invention, since the winding state of the mainspring can be maintained by the regulating device, operations of mounting into the device body and connection to another member are facilitated. Moreover, since the winding state of the mainspring can be set at a predetermined value beforehand by the regulating device, it can be prevented from varying. It is also possible to eliminate the necessity of adjusting and checking the winding state. It is preferable that the position of the regulating device be fixed (for example, engaged) by an immobile portion of the driving-force storing section or the braking section (a portion which does not respond to the rotation of the rotating member and the output operation of the output device, such as the mainspring holding portion or the braking-member holding portion of the braking section).

In this case, it is preferable that the regulating device has a plurality of engaging positions at which it engages with the rotating member or the output device. According to this, the winding state of the mainspring can be adjusted by appropriately selecting one of a plurality of engaging positions of the regulating device with respect to the rotating member or the output device. By forming a plurality of portions, where the position of the regulating device is fixed (for example, engaged) in an immobile portion of the driving-force storing section or the braking section (a portion which does not respond to the rotation of the rotating member and the output operation of the output device, such as the mainspring holding portion and the braking-member holding portion of the braking section), the regulating device can be engaged at a plurality of positions.

In the present invention, it is preferable to place a one-way clutch mechanism between the mainspring and the output device for outputting the driving force of the mainspring so as not to transmit the force from the output device in a rotating direction in which the mainspring is wound up and so as to transmit the force to the output device in a rotating direction in which the mainspring outputs the driving force. According to this invention, the mainspring can be wound up in a state in which the output section of the mainspring mechanism is connected to another member, for example, in a state in which the mainspring mechanism is mounted in a device such as an opening and closing mechanism. Therefore, it is unnecessary to wind up the mainspring into a predetermined state before the mainspring mechanism is mounted into the device, and to mount the mainspring mechanism into the device while maintaining the winding state. This can reduce the assembly time, the cost, and the like.

It is preferable that the present invention further includes an output gear for outputting the driving force of the mainspring, and a rack to be meshed with the output gear. According to this invention, since the mainspring mechanism can cause the rack to drive via the output gear, various devices can be slid.

It is preferable that the present invention further includes a fixing member for preventing the movement between the output gear and the rack. According to this invention, since the movement between the output gear and the rack meshed with each other in the output section (that is, a relative movement produced between the output gear and the rack by the rotation of the output gear) can be prevented by the fixing member, the mainspring mechanism can be mounted into a device or the like while keeping the mainspring in a predetermined winding state.

It is preferable that the present invention further includes a winding-number regulating device which disables the mainspring from being further wound after the mainspring is brought in a predetermined winding state. According to this invention, since the mainspring is disabled by the winding-number regulating device from being further wound up after it is brought into a predetermined winding state, it can be easily placed in the predetermined state without adjusting the degree of winding. Since an excessive and unnecessary force will not be applied to the mainspring, the durability of the mainspring can be increased.

In the present invention, it is preferable that the winding-number regulating device has a rotation connecting structure using the frictional force between the outer end of the mainspring and the mainspring holding portion. According to this, when the force to be applied between the mainspring and the mainspring holding portion is small, since a connection in the rotating direction is established by the rotation connecting structure because of the frictional force between the outer end of the mainspring and the mainspring holding portion, the mainspring can be wound up. When a force greater than a predetermined force is applied between the mainspring and the mainspring holding portion, the outer end of the mainspring and the mainspring holding portion slip each other, and the mainspring cannot be wound up further. This can simplify the rotation connecting structure, and therefore, the cost and size can be reduced.

A device of the present invention includes any of the above-described mainspring mechanisms, and a moving section to be driven by the mainspring mechanism. Such a device is not limited to a device having an opening and closing structure which will be described later, and any device may be adopted as long as it has a moving section, as in a moving toy.

In the present invention, it is preferable that the moving section be formed of an opening and closing mechanism to be opened and closed by the mainspring mechanism. Such a device having the opening and closing mechanism to be opened and closed by the mainspring mechanism is, for example, a device having a lid which pivots on a hinge shaft (a device having a pivotal opening and closing structure, such as a rise cooker or a folding electronic device) or a device having a portion which slides to be opened and closed (a device having a slidable opening and closing structure, such as a car-mounted drawer opening and closing mechanism, or a direct-acting retractable monitor). In these devices, the opening and closing operation can be performed at a controlled speed, and can be made more refined and more silent.

In the present invention, it is preferable that the opening and closing mechanism have a first member and a second member to be opened and closed relative to each other, and that the mainspring be wound up when the first member and the second member are assembled together. According to this invention, since the mainspring is wound up only by assembling the first member and the second member, which constitute the opening and closing mechanism, together, it is unnecessary to wind up the mainspring before the mainspring mechanism is mounted into the device. Since it is also unnecessary to set the degree of winding of the mainspring to a specified value, and to perform the mounting operation while maintaining the winding state, the operation can be easily performed, and the mounting time and cost can be reduced.

It is preferable to provide a range limiting device which limits the range of opening and closing of the first member and the second member to a range where the driving force of the mainspring is not completely released. The range limiting device also functions as a maintaining device for maintaining the assembly state of the first member and the second member in a state in which the first member and the second member are assembled together. When the first member and the second member are assembled together, the range of the opening and closing operation thereof is limited by the range limiting device, and the driving force of the mainspring is not completely released. Since this can stabilize the driving force of the mainspring over the full opening and closing range, the opening and closing operation can be performed reliably.

In the present invention, the moving section includes a moving portion of a toy.

BEST MODE FOR CARRYING OUT THE INVENTION

Next, embodiments of a mainspring mechanism and a device having the mechanism according to the present invention will be described in detail with reference to the attached drawings.

[First Embodiment]

Figure 1:
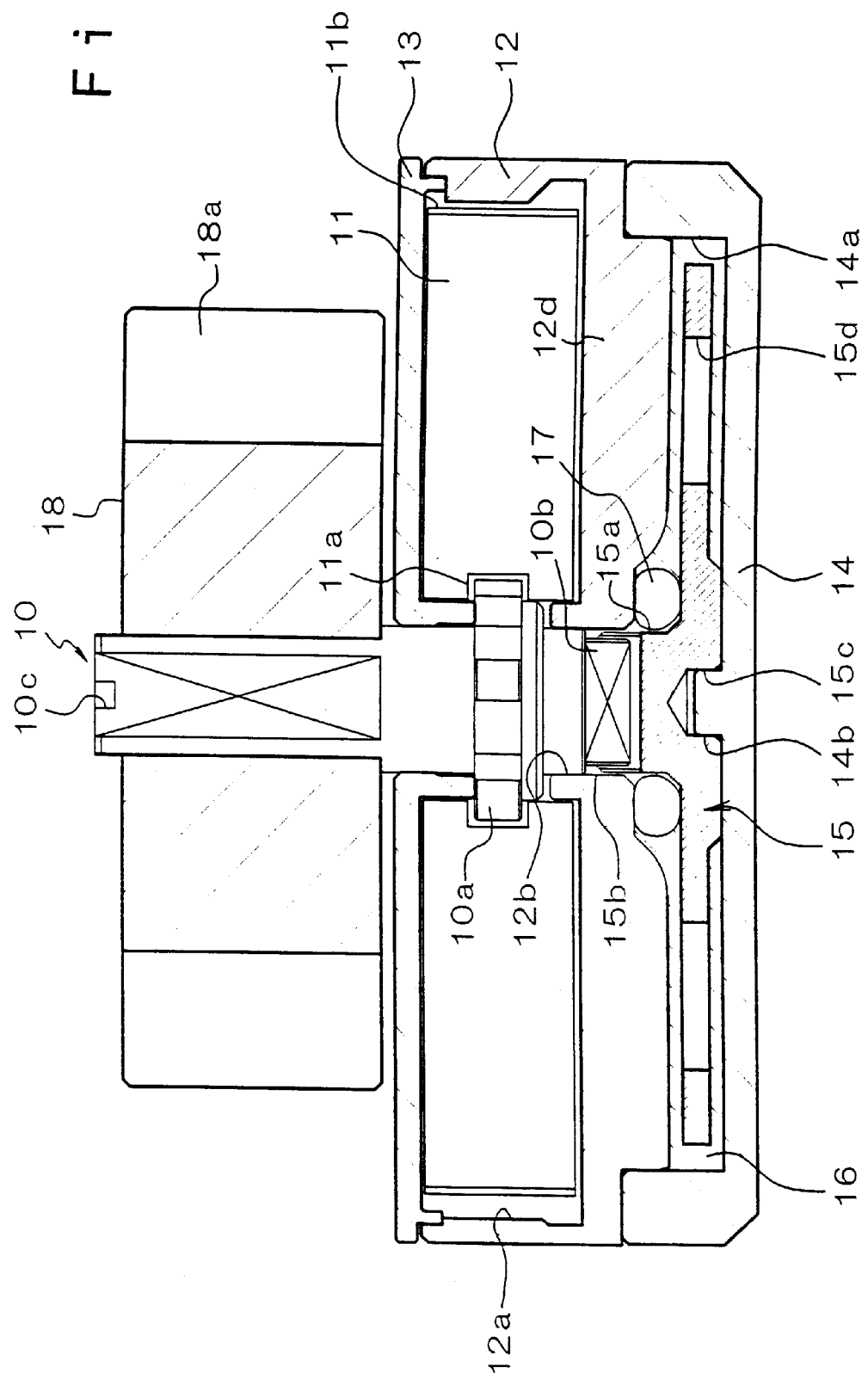
FIG. 1 is a longitudinal sectional view showing the structure of a mainspring mechanism according to a first embodiment of the present invention.
Figure 2:
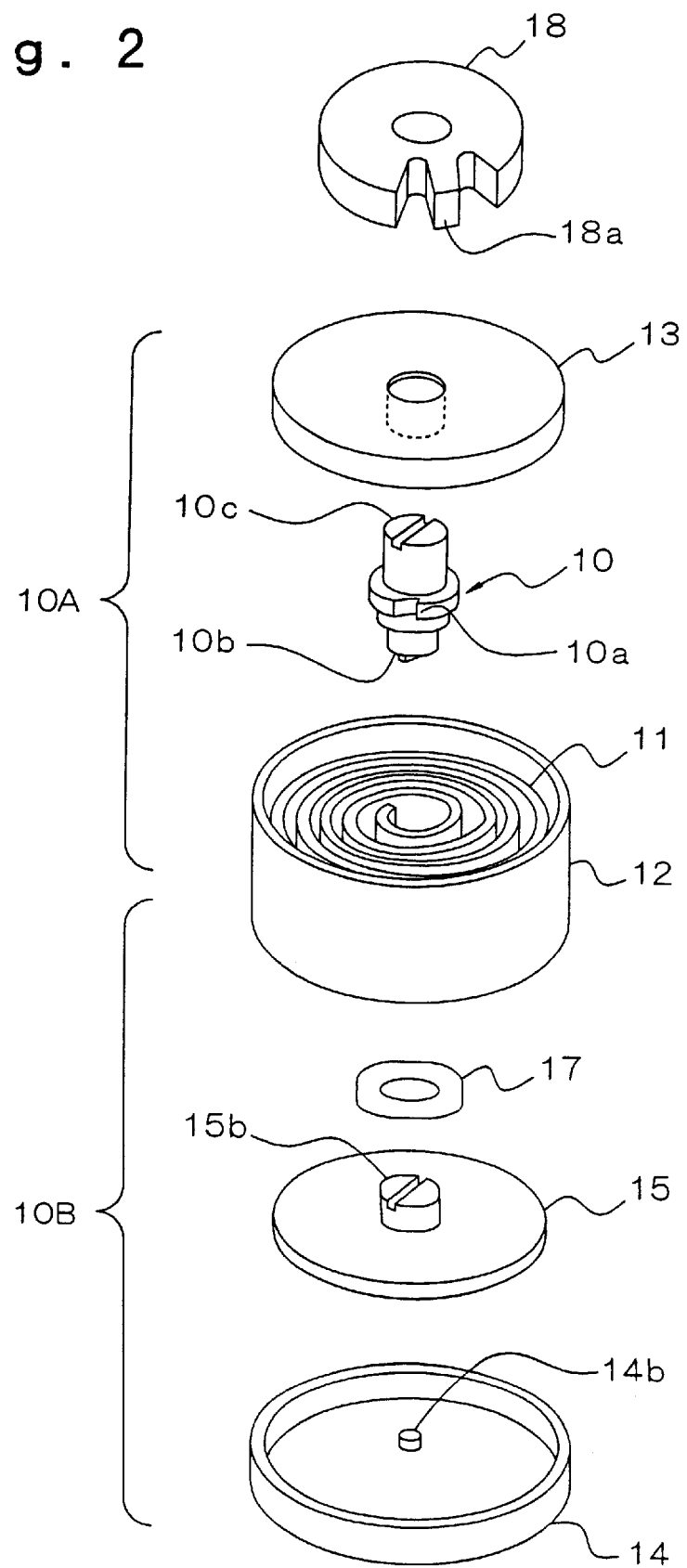
FIG. 2 is an exploded perspective view schematically showing the structure of the first embodiment.

FIG. 1 is a longitudinal sectional view of a mainspring mechanism according to a first embodiment of the present invention, and FIG. 2 is an exploded perspective view of the first embodiment. This embodiment includes a columnar winding stem 10 forming a rotating member, a spiral mainspring 11 connected to a mounting portion 10a of the winding stem 10 at an inner end 11a thereof, and a barrel drum 12 and a barrel lid 13 constituting a mainspring case for holding the mainspring 11 therein. The barrel drum 12 and the barrel lid 13 rotatably support the winding stem 10, and the inner peripheral surface of the barrel drum 12 which surrounds a mainspring holding portion 12a is connected to an outer end 11b of the mainspring 11.

A braking case 14 shaped like a saucer is fixedly press-fitted in the bottom of the barrel drum 12 from below. A disklike braking plate 15 is placed in a holding recess 14a of the braking case 14 so that it is coaxial with the winding stem 10. A center protuberance 15a projecting upward is formed at the center of the braking plate 15, and an uneven joint portion 15b which has irregularities in the rotating direction is formed at the upper end of the center protuberance 15a. A recess 15c is formed on the side of the braking plate 15 opposite from the center protuberance 15a, and a center protuberance 14b formed at the center of the braking case 14 is slidably fitted in the recess 15c. A plurality of openings 15d are formed through the peripheral portion of the braking plate 15 so that they are arranged in the rotating direction and extend vertically.

A rotation-controlling groove 10c is formed at the top of the winding stem 10 so that it can be engaged with a tool such as a flat-tip screwdriver. An uneven joint portion 10b which has irregularities in the rotating direction is formed at the bottom of the winding stem 10, and the uneven joint portion 15b of the braking plate 15 is fitted on the uneven joint portion 10b, thereby engaging the winding stem 10 and the braking plate 15 in the rotating direction. The outer periphery of the center protuberance 15a of the braking plate 15 is supported in rotatable contact with the inner periphery of a center hole 12b of the barrel drum 12.

The winding stem 10 protrudes upward from the barrel lid 13, and an output gear 18 having teeth 18a serving as the output device is fixedly fitted on the protruding portion by, for example, press fitting so that it rotates together with the winding stem 10.

While the barrel drum 12 and the barrel lid 13 are fixed to each other and rotatably support the winding stem 10 in this embodiment, the barrel lid 13 may be rotatably mounted on the barrel drum 12, and may be formed integrally with the winding stem 10 or may be fixed thereto. In this case, the barrel lid 13 also serves to tightly close the aperture of the barrel drum 12 in a manner similar to that in this embodiment, but rotates together with the winding stem 10.

It is preferable that a slipping attachment for preventing the mainspring 11 from being overwound be incorporated in the principal part of the mainspring mechanism constituted by the winding stem 10, the mainspring 11, and the barrel drum 12. The slipping attachment is formed of, for example, an arc-shaped frame which is pressed against the inner peripheral surface of the barrel drum 12 by its elasticity. The arc-shaped frame is usually pressed against and combined with the barrel drum 12 by connecting the outer end of the mainspring 11 thereto, and slips on the barrel drum 12 so as to prevent the mainspring 11 from being overwound when the mainspring 11 is wound up to a certain degree.

The holding recess 14a of the braking case 14 is filled with a fluid 16 such as silicone oil. When the braking plate 15 rotates in the fluid 16, it receives a predetermined rotational resistance resulting from a fluid-solid flow (viscosity) resistance to the fluid 16. The fluid 16 is filled in the space hermetically sealed by the braking case 14 and a bottom surface 12d of the barrel drum 12. A sealing member 17, such as a ring-shaped gasket, is interposed between the bottom surface 12d of the barrel drum 12 and the center of the surface of the braking plate 15. The sealing member prevents the fluid 16 from leaking into the connecting portion between the braking plate 15 and the winding stem 10.

This embodiment includes a driving-force storing section 10A constituted by the mainspring 11, the barrel drum 12, and the barrel lid 13, and a braking section 10B constituted by the barrel drum 12, the braking case 14, the braking plate 15, the fluid 16, and the sealing member 17, as shown in FIG. 2.

In this embodiment, the mainspring 11 can be wound up by rotating the winding stem 10 and the barrel drum 12 relative to each other. The wound mainspring 11 stores rotational energy. When one of the winding stem 10 and the barrel drum 12 is released, it rotates in a direction opposite from the winding direction. In this case, the braking plate 15 joined to the winding stem 10 in the rotating direction, and the barrel drum 12 and the braking case 14 fixedly fitted thereon rotate relative to each other in response to the rotation. Consequently, a rotational resistance is generated among the braking plate 15, the barrel drum 12, and the braking case 14 via the fluid 16. In general, since the rotational resistance is monotonically increases with the rotating speed, it serves to prevent the rotating speed from varying.

Since the mainspring 11 is sealed in the barrel drum 12 and the barrel lid 13, dust is not prone to enter the mainspring holding portion, and this prolongs the lifetime of the mainspring 11. In order to make the operation of the mainspring 11 smooth and to increase durability, a high-viscosity grease is sometimes applied to the mainspring 11. In this case, the grease can be prevented from leaking because the mainspring holding portion is hermetically sealed.

The winding stem 10 is rotatably supported in the center hole 12b of the barrel drum 12. Since the supported portion of the winding stem 10 is disposed offset from the mounting portion 10a attached to the inner end 11a of the mainspring 11 toward the axis thereof, it is shorter in the radial direction than the portion of the winding stem 10 which receives a driving torque. This makes it possible to reduce the bearing load, such as frictional resistance, of the supported portion, and to efficiently output the driving force of the mainspring 11. That is, since the driving force of the mainspring 11 is applied to the portion of the winding stem 10 offset outward from the supported portion, the winding stem 10 is easily rotated, and the driving force can be efficiently converted into the rotational force of the winding stem 10.

In this embodiment, the space for holding the braking plate 15 (braking-member holding portion) is defined by joining the barrel drum 12 and the braking case 14. Therefore, a quite simple structure including the minimum number of components can be achieved without any small and complicated components. This reduces the parts cost and the assembly cost, and also reduces the production cost. Moreover, the above configuration facilitates thickness reduction, and makes the entire mechanism compact.

Since the winding stem 10 and the braking plate 15 are separate, assembly and working of the components are facilitated. Moreover, since the braking plate 15 is rotatably supported in the center hole 12b of the barrel drum 12 and the braking case 14 is also fitted on the barrel drum 12, the components can be precisely assembled, centered on the barrel drum 12.

Since the braking case 14 is shaped like a saucer, and the outer peripheral portion thereof rises in the axial direction and is fitted on the barrel drum 12, the fluid 16 is easily filled therein and is not prone to leak.

Since the braking plate 15 has the openings 15d, the fluid 16 can flow therethrough after being filled in the braking case 14. This allows the braking plate 15 to be easily soaked in the fluid 16. The openings 15d can also increase the rotational resistance produced between the braking plate 15 and the fluid 16.

The mainspring mechanism of this embodiment can be easily connected to or put into various devices by, for example, winding the mainspring 11 to a certain degree by rotating the output gear 18 and the barrel drum 12 relative to each other with a tool or the like engaged with the rotation-controlling groove 10c, and engaging the output gear 18 with another gear or rack while maintaining the winding state by the rotation-controlling groove 10c.

[Second Embodiment]

Figure 3:
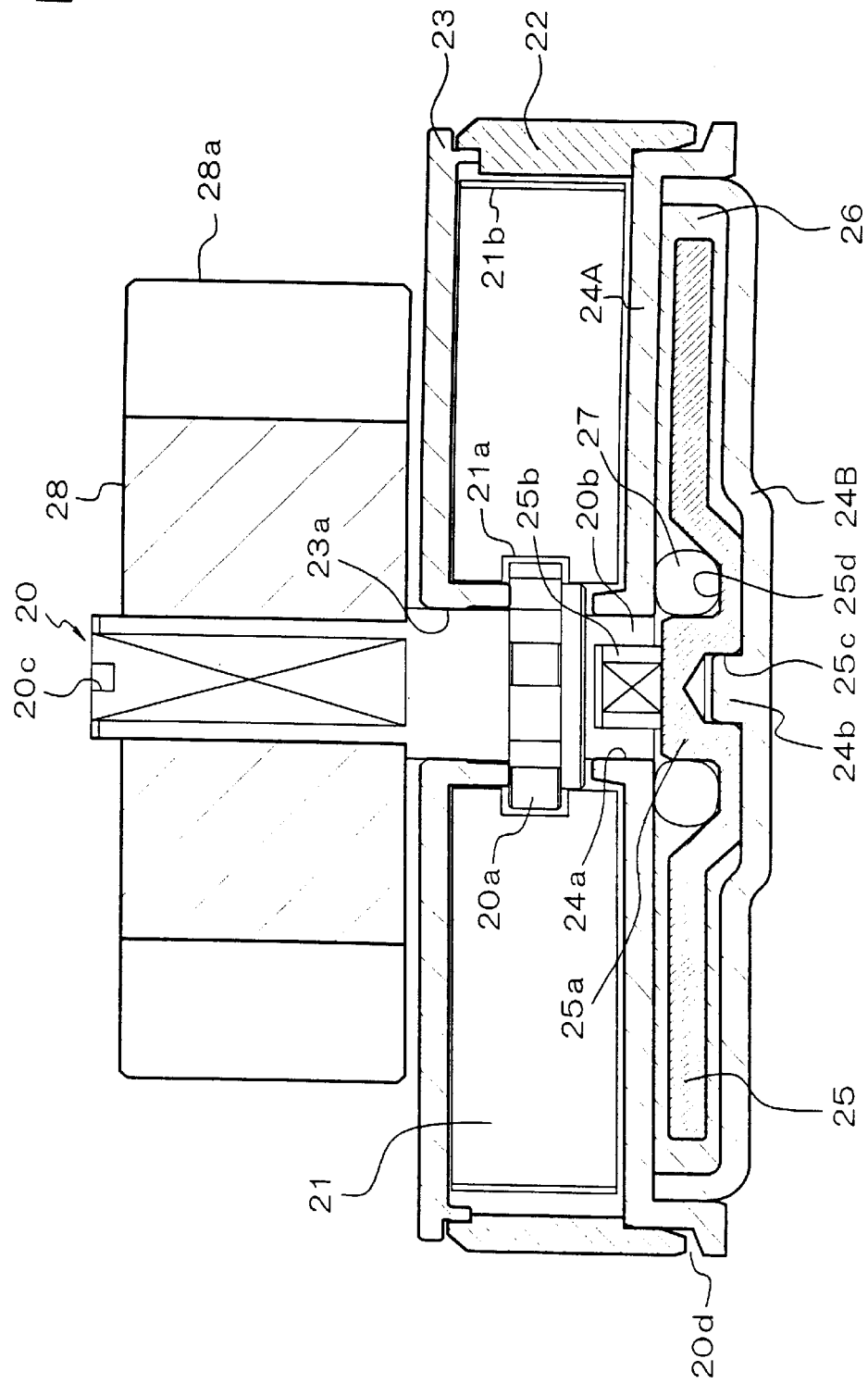
FIG. 3 is a longitudinal sectional view showing the structure of a second embodiment of the present invention.

Next, a mainspring mechanism according to a second embodiment of the present invention will be described with reference to FIGS. 3 and 4. Since this embodiment includes a mainspring 21, a barrel lid 23, and an output gear 28 similar to those in the above-described first embodiment, descriptions thereof are omitted.

In this embodiment, a barrel drum 22 is shaped like a cylinder which is opened at both the top and bottom thereof, and an outer end 21b of the mainspring 21 is connected thereto in a manner similar to that in the first embodiment. The barrel lid 23 is mounted on the top of the barrel drum 22, and an upper braking case 24A is fitted (press-fitted) in the bottom of the barrel drum 22, thereby enclosing a mainspring holding portion.

A winding stem 20 serving as the rotating member is rotatably supported in a center hole 23a of the barrel lid 23 and a center hole 24a of the upper braking case 24A, and a mounting portion 20a thereof is connected to an inner end 21a of the mainspring 21. A rotation-controlling groove 20c similar to that in the first embodiment is formed at the top of the winding stem 20, and an uneven joint portion 20b having irregularities in the rotating direction is formed at the bottom thereof. An even joint portion 25b of a braking plate 25 is fitted in the uneven joint portion 20b, thereby engaging the winding stem 20 and the braking plate 25 in the rotating direction. In this embodiment, the uneven joint portion 20b of the winding stem 20 is rotatably supported in the center hole 24a of the upper braking case 24A, and the uneven joint portion 25b of the braking plate 25 is fitted in the uneven joint portion 20b. The barrel drum 22 and the upper braking case 24A are fixed by fitting (press fitting).

A braking section has a structure in which the braking plate 25 is held in a braking-member holding portion defined by the upper braking case 24A and a lower braking case 24B which is fitted in the upper braking case 24A. The braking plate 25 has a center protuberance 25a, and the uneven joint portion 25b is formed on the center protuberance 25a. A recess 25c is formed on the side opposite from the center protuberance 25a, and a center protuberance 24b formed in the lower braking case 24B is slidably inserted in the recess 25c. An annular groove 25d is formed around the center protuberance 25a, and a sealing member 27, such as a ring-shaped gasket, is mounted in the annular groove 25d so as to tightly close the space between the braking plate 25 and the upper braking case 24A. The braking-member holding portion is filled with a fluid 26 similar to that in the first embodiment.

Figure 4:
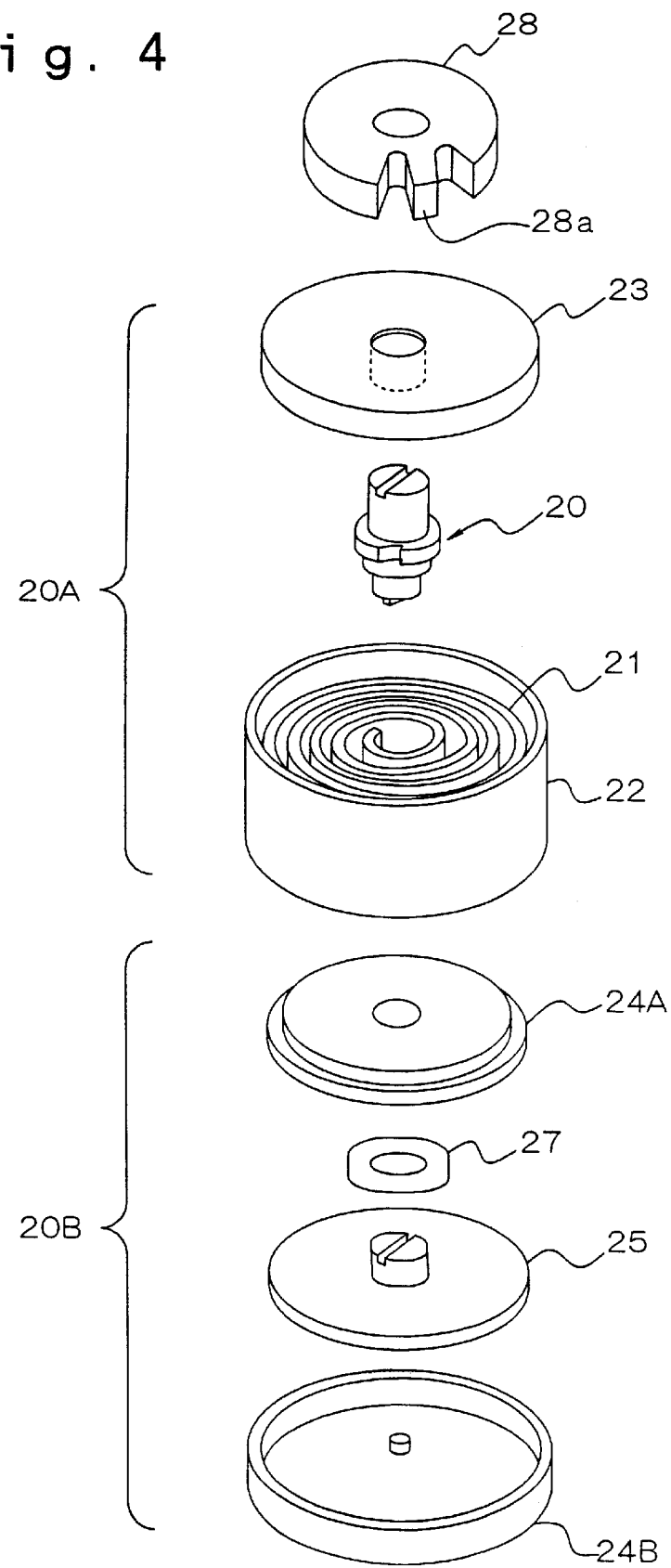
FIG. 4 is an exploded perspective view schematically showing the structure of the second embodiment.

This embodiment includes a driving-force storing section 20A constituted by the winding stem 20, the mainspring 21, the barrel drum 22, and the barrel lid 23, and a braking section 20B constituted by the braking plate 25, the upper braking case 24A, the lower braking case 24B, the fluid 26, and the sealing member 27, as shown in FIG. 4. Since the braking section 20B is formed as a unit of the braking plate 25, the upper braking case 24A, the lower braking case 24B, the fluid 26, and the sealing member 27, it can be connected to the driving-force storing section or to another component after being completely assembled. As a result, the components are easily handled and managed during the assembly process, for example, the braking section can be stored easily, the fluid 26 is not prone to leak from the braking section, and a braking section having a plurality of braking properties can be prepared.

More specifically, in this embodiment, an assembly of the winding stem 20, the mainspring 21, and the barrel drum 22 (the barrel lid 23 and the output gear 28 may be incorporated therein beforehand in addition to these components) can be connected to the completed braking section 20B. Therefore, the mainspring mechanism can be completed by concurrently assembling the driving-force storing section 20A and the braking section 20B and then connecting the sections.

In this embodiment, since an annular groove 20d is formed on the outer peripheries of the barrel drum 22 and the upper braking case 24A therebetween, the barrel drum 22 and the upper braking case 24A fixedly fitted together can be separated by being pried with the leading end of a tool, such as a flat-tip screwdriver, or a jig inserted in the groove 20d. Therefore, during or after production, it is possible to easily perform the operation of replacing one of the driving-force storing section 20A and the braking section 20B or of repairing the interior of the driving-force storing section 20A after separating the sections 20A and 20B.

[Examples of Structures of Output Device]

Figure 5:
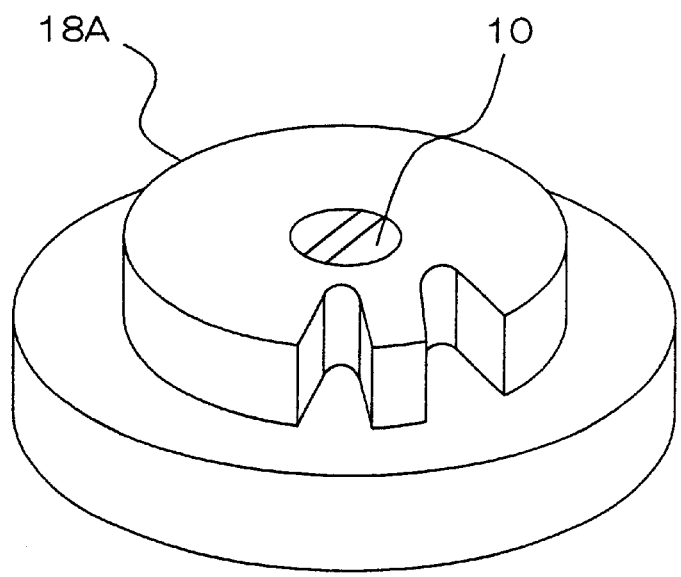
FIG. 5 is a general perspective view schematically showing the structure of another output device.
Figure 6:
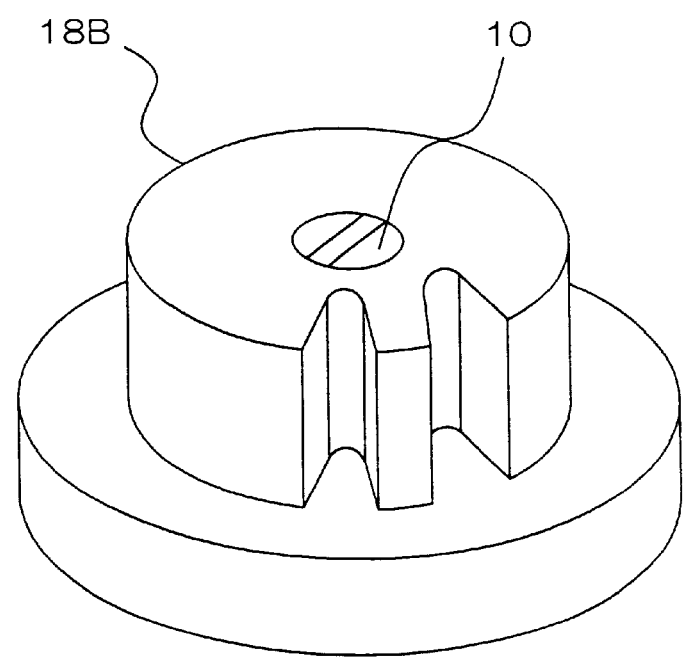
FIG. 6 is a general perspective view schematically showing the structure of a further output device.
Figure 7:
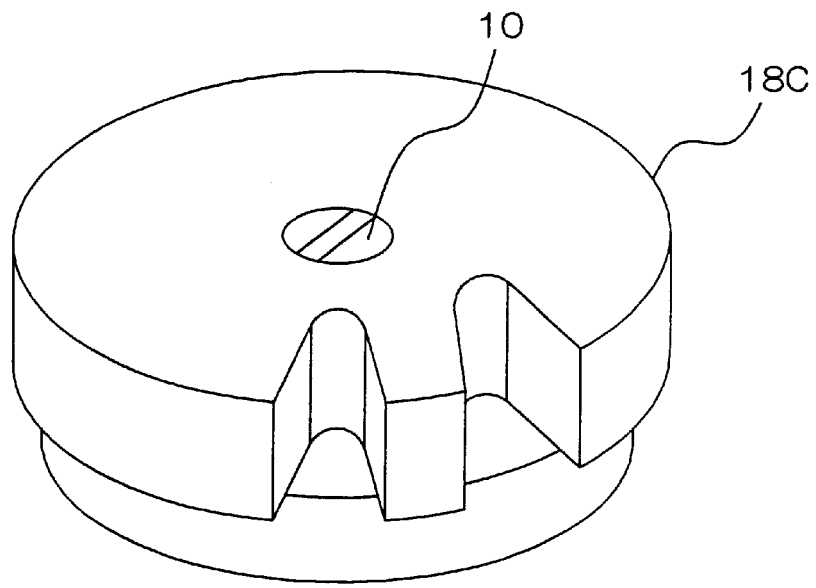
FIG. 7 is a general perspective view schematically showing the structure of a further output device.

Next, a description will be given of examples of structures of the output device which are applied to the above first and second embodiments and the following embodiments, with reference to FIGS. 5 to 8. An output device shown in FIG. 5 is a thin output gear 18A which is shorter in the axial direction than those in the above embodiments, an output device shown in FIG. 6 is a thick output gear 18B which is longer in the axial direction than those in the above embodiments, and an output device shown in FIG. 7 is a large-diameter output gear 18C which has a diameter longer than those in the above embodiments. Any of these output gears may be substituted for those in the above embodiments, or may be easily replaced with one another. Thus, the thickness and diameter of the output device are not limited by the driving-force storing section and the braking section, and a high degree of flexibility in determining the shape of the output device can be ensured. While any of the output devices is mounted on the winding stem 10 serving as the rotating member, the shape (length or diameter) of the winding stem 10 may be adapted for the output device. Conversely, the output device may be adapted for the common winding stem 10.

The embodiments having the above output gears have the structures suitable for a case in which the barrel drums 12 and 22 are fixed and the output gear is used as an input-output gear. For example, when the embodiments are applied to an automatic opening mechanism of a car-mounted drawer, the output gear is engaged with a rack (not shown) formed in the drawer, the output gear and the winding stem are rotated to wind up the mainspring when the drawer is pushed, and the drawer is stopped by a lock mechanism (not shown). When the drawer is slightly pushed, the lock mechanism is released, and the drawer is automatically opened by the output gear, which is rotationally driven by a rotational energy produced by the mainspring, while receiving the braking force.

Figure 8:
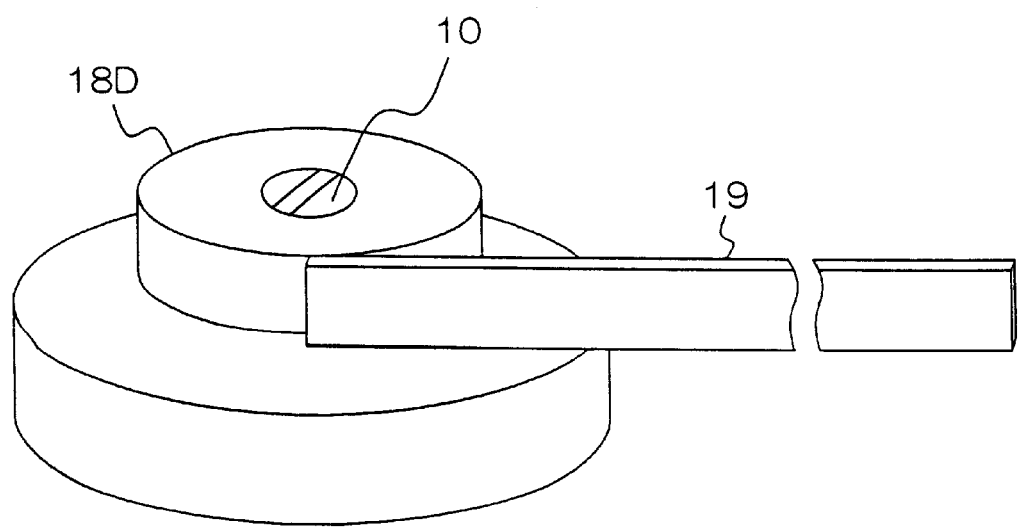
FIG. 8 is a general perspective view schematically showing the structure of a yet further output device.

An output device shown in FIG. 8 includes a cylindrical member 18D mounted on the winding stem 10, and a flexible band 19 mounted on the outer peripheral surface of the cylindrical member 18D. In the output device, when the cylindrical member 18D rotates together with the winding stem 10, the band 19 is wound up. Therefore, by attaching another member to the leading end of the band 19, the member can be linearly moved by the mainspring mechanism. For example, when the leading end of the band 19 is connected to a drawer, the mainspring is wound up by pushing the drawer, and is locked by a lock mechanism (not shown). By releasing the lock mechanism, the drawer is also released, and is slowly drawn out by the driving force of the mainspring while receiving the braking force of the braking section.

[Third Embodiment]

Figure 9:
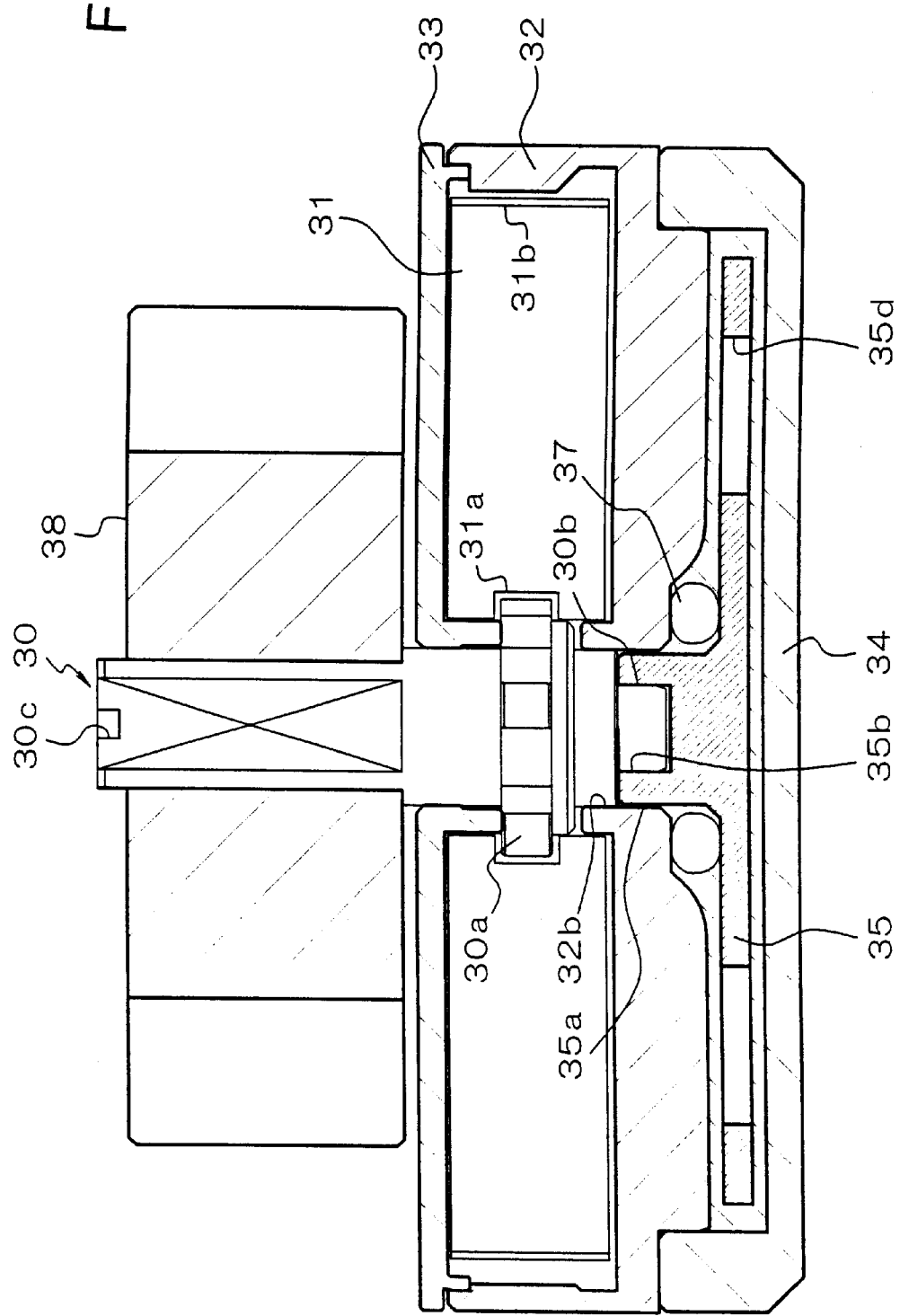
FIG. 9 is a longitudinal sectional view showing the structure of a third embodiment of the present invention.

Next, a third embodiment of the present invention will be described with reference to FIG. 9. This embodiment comprises a mainspring 31, a barrel drum 32, and a barrel lid 33 similar to those in the first embodiment. In this embodiment, descriptions of the same components as those in the first embodiment are omitted.

While a winding stem 30 is basically similar to those in the first embodiment and the second embodiment, it has at its lower end a fitting protuberance 30b instead of the uneven joint portion described above. A braking plate 35 has a center protuberance 35a, and a fitting recess 35b is formed at the upper end of the center protuberance 35a so as to be interference-fitted on the fitting protuberance 30b. The fitting protuberance 30b and the fitting recess 35b are fitted together, thereby fixing the winding stem 30 and the braking plate 35. A small clearance is formed between the outer periphery of the center protuberance 35*a* of the braking plate 35 and a center hole 32*b* of the barrel drum 32 so that both will not touch with each other. A braking case 34 does not have a center protuberance to be engaged with the braking plate 35.

In this embodiment, since the winding stem 30 and the braking plate 35 are combined by press fitting, and the winding stem 30 is rotatably supported by the barrel drum 32, the required level of assembly precision of the components is decreased, and the components can be easily assembled because, for example, there is no need to form a guide structure between the braking case 34 and the braking plate 35. Moreover, since the braking plate 35 is not directly supported, the bearing resistance can be reduced, and the braking plate 35 can be operated more smoothly.

[Fourth Embodiment]

Figure 10:
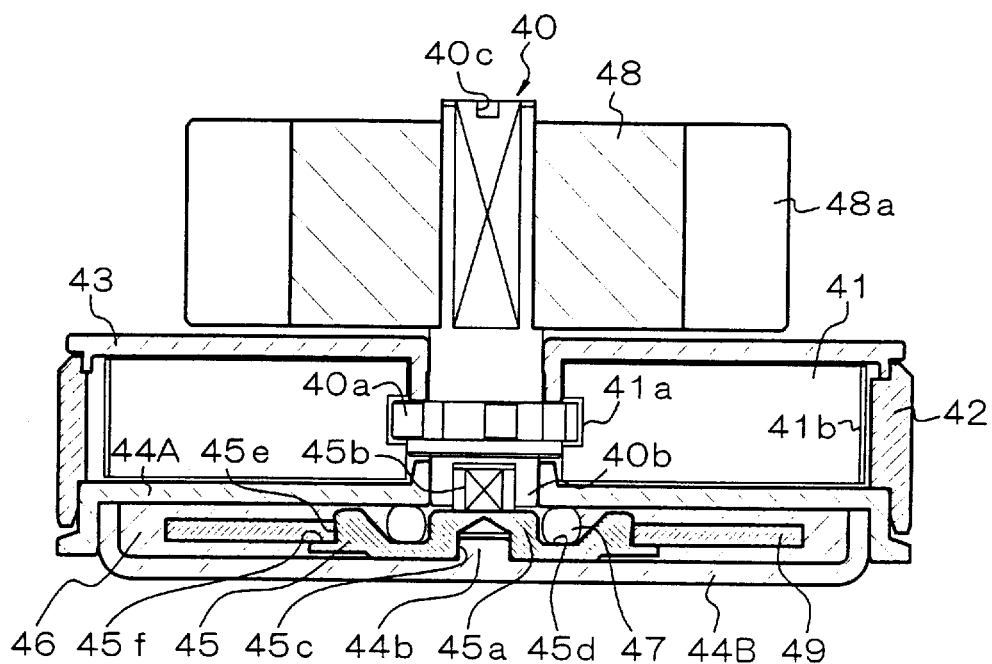
FIG. 10 is a longitudinal sectional view showing the structure of a fourth embodiment of the present invention.

Next, a fourth embodiment of the present invention will be described with reference to FIGS. 10 and 11. The basic configuration of this embodiment is similar to that of the second embodiment, and a winding stem 40, a mainspring 41, a barrel drum 42, a barrel lid 43, an upper braking case 44A, a lower braking case 44B, a fluid 46, a sealing member 47, and an output gear 48 are similar to those in the second embodiment. Therefore, descriptions thereof are omitted.

In this embodiment, a braking-member holding portion defined by the upper braking case 44A and the lower braking case 44B is filled with the fluid 46, and a center braking member 45 connected to the winding stem 40, and a peripheral braking plate 49 fitted on the center braking member 45 are placed inside the fluid 46. The center braking member 45 includes a center protuberance 45*a*, an uneven joint portion 45*b* formed on the center protuberance 45*a* and engaged with an uneven joint portion 40*b* of the winding stem 40 in the rotating direction, a recess 45*c* fitted on and rotatably supported by a center protuberance 44*b* of the lower braking case 44B, an annular recess 45*d* formed around the center protuberance 45*a* so as to accommodate the sealing member 47, and stepped faces 45*e* and 45*f* formed on the outer periphery.

Figure 11:
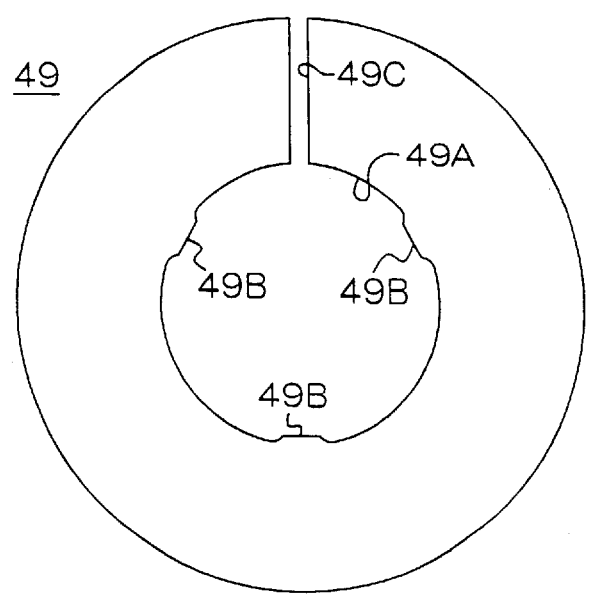
FIG. 11 is a plan view of a peripheral braking plate in the fourth embodiment.

The peripheral braking plate 49 also shown in FIG. 11 is fixedly fitted on the stepped faces 45*e* and 45*f* of the center braking member 45. The peripheral braking member 49 is made of an elastic material, such as stainless steel or spring steel, is shaped nearly like a ring in plan, and includes a center opening 49A, inner projections 49B projecting from the rim of the center opening 49A toward the center side, and a slit 49C formed so as to cut a part of the ring in the circumferential direction. The inner projections 49B of the peripheral braking plate 49 are elastically pressed against the stepped face 45*e* of the center braking member 45, and the rim of the center opening 49A is elastically pressed against the stepped face 45*f* of the center braking member 45. The stepped face 45*e* is slightly inclined with respect to the vertical direction so that its diameter decreases toward the lower side, and the stepped face 45*f* is substantially horizontal. For this reason, by press-fitting the center braking member 45 into the center opening 49A of the peripheral braking plate 49 from below, the stepped face 45*e* of the center braking member 45 is snap-fitted in the center opening 49A, the fitting state is maintained by the inclination of the stepped face 45*e*, and the rim of the center opening 49A is pressed against the stepped face 45*f* disposed below.

In this embodiment, in a case in which the winding stem 40 is being rotated by the driving force of the mainspring 41 or a case in which the external force applied via the output gear 48 serving as the output device is less than or equal to a predetermined value, the center braking member 45 and the peripheral braking plate 49 are rotated together by the frictional force (static friction) of the above-described elastic fitted portion, thereby producing a predetermined braking force. In contrast, in a case in which the external force to be applied to the winding stem 40 excessively increases, or a case in which the braking force increases because the viscosity of the fluid 46 is increased due to a decrease in temperature, when a force more than the static frictional force is applied between the center braking member 45 and the peripheral braking plate 49, the center braking member 45 and the peripheral braking plate 49 slip each other, and the center braking member 45 is rotated by a dynamic frictional force, thereby reducing the braking force of the braking section. Consequently, when an excessive force is applied to the mainspring mechanism from the outside, or when the braking force excessively increases because the viscosity of the fluid 46 increases due to a decrease in temperature, the braking section, the winding stem 40, and the like are prevented from being damaged and broken.

The slip device as in this embodiment may be placed, for example, at the connecting portion between the rotating member, such as the winding stem, and the braking member, such as the braking plate. Alternatively, a clutch device which releases the transmission of rotation only in the mainspring winding direction may be substituted for the slip device as in this embodiment, or may be placed at the connecting portion between the rotating member and the braking member, as described above. The clutch device can prevent the braking section from being damaged and broken when the external force to be applied when winding the mainspring excessively increases, and also provides advantages substantially similar to those of the slip device.

[Fifth Embodiment]

Figure 12:
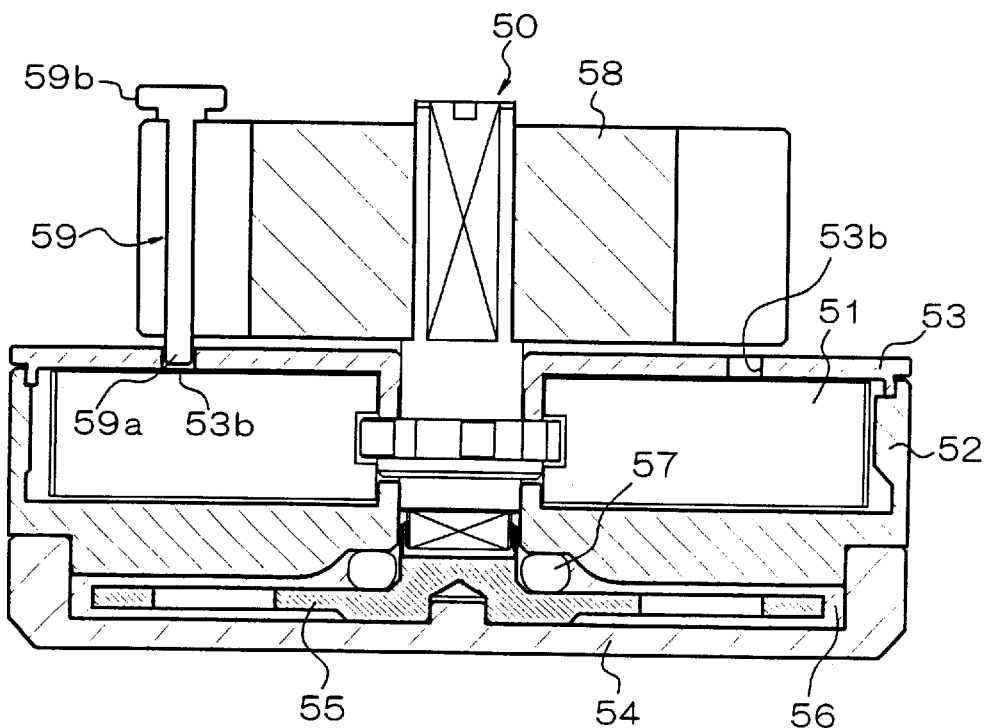
FIG. 12 is a longitudinal sectional view showing the structure of a fifth embodiment of the present invention.
Figure 13:
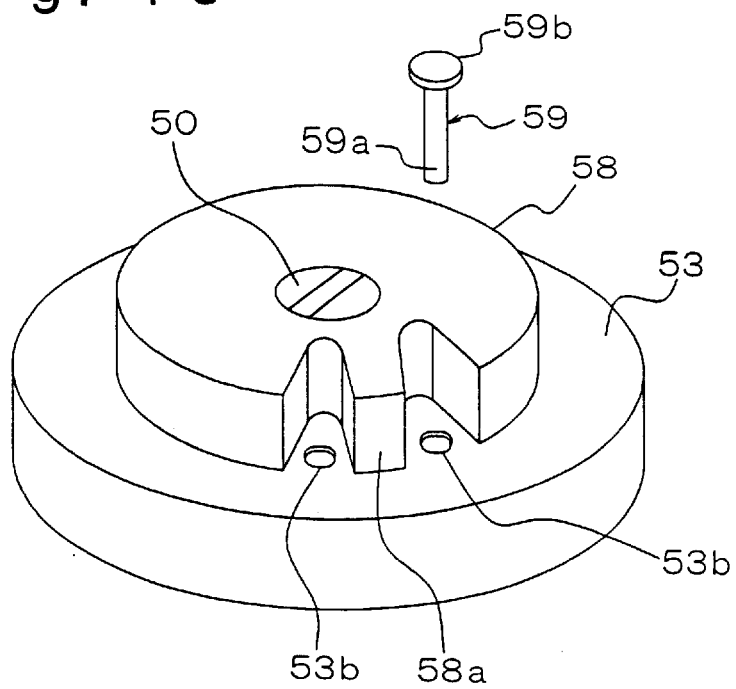
FIG. 13 is a general perspective view schematically showing the external appearance of the fifth embodiment.

Next, a fifth embodiment of the present invention will be described with reference to FIGS. 12 and 13. Since this embodiment includes a winding stem 50, a mainspring 51, a barrel drum 52, a braking case 54, a braking plate 55, and an output gear 58 similar to those in the first embodiment, descriptions thereof are omitted.

In this embodiment, a plurality of engaging apertures (or holes) 53*b* are formed along an arc having a predetermined radius centered on the axis of the winding stem 10 on a barrel lid 53 mounted at the top of the barrel drum 52. The engaging apertures 53*b* are arranged along the arc having the same diameter as that of a portion of the output gear 58 where teeth 58*a* are formed.

A regulating pin 59 having a leading end portion 59*a*, which can be inserted in the engaging apertures 53*b*, is provided. The regulating pin 59 has a head portion 59*b* having such a diameter that the head portion 59*b* can be engaged with both of the pair of adjoining teeth 58*a* of the output gear 58. As shown in FIG. 13, when the leading end portion 59*a* of the regulating pin 59 is inserted into one of the engaging apertures 53*b* formed on the barrel lid 53 so that it does not touch the teeth 58*a* of the output gear 58, the regulating pin 59 is supported in a state in which the head portion 59*b* thereof is in contact with the end faces of the adjoining teeth 58*a*, as shown in FIG. 12. In this state, the rotation of the output gear 58 is prevented by the regulating pin 59.

Since the rotation of the output gear 58 can be prevented by the regulating pin 59 in this embodiment, the winding state of the mainspring 51 can be maintained by mounting the regulating pin 59 in a state in which the mainspring 51 is appropriately wound up. Since the engaging apertures 53*b* in which the regulating pin 59 is inserted are formed at a plurality of positions, the rotation of the output gear 58 can be regulated at a plurality of regulating positions (positions based on the driving-force storing section), and a plurality of different winding states of the mainspring 51 can be maintained. For example, by forming a plurality of engaging apertures 53b at a pitch different from the formation pitch of the teeth 58a of the output gear 58, the winding state of the mainspring 51 maintained by the regulating pin 59 can be adjusted appropriately.

[Sixth Embodiment]

Figure 14:
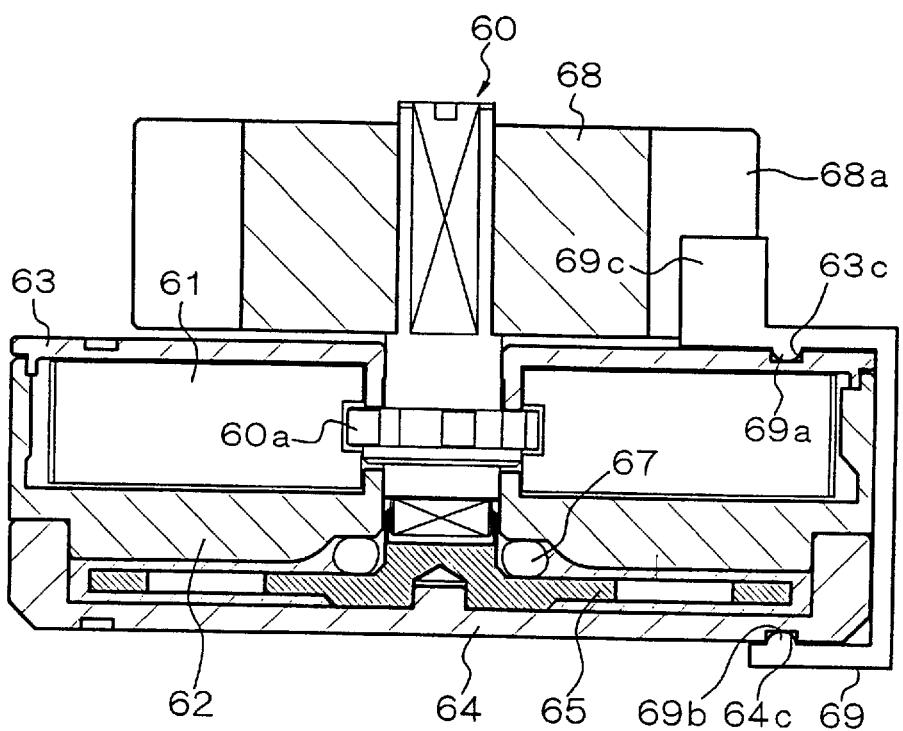
FIG. 14 is a longitudinal sectional view showing the structure of a sixth embodiment of the present invention.
Figure 15:
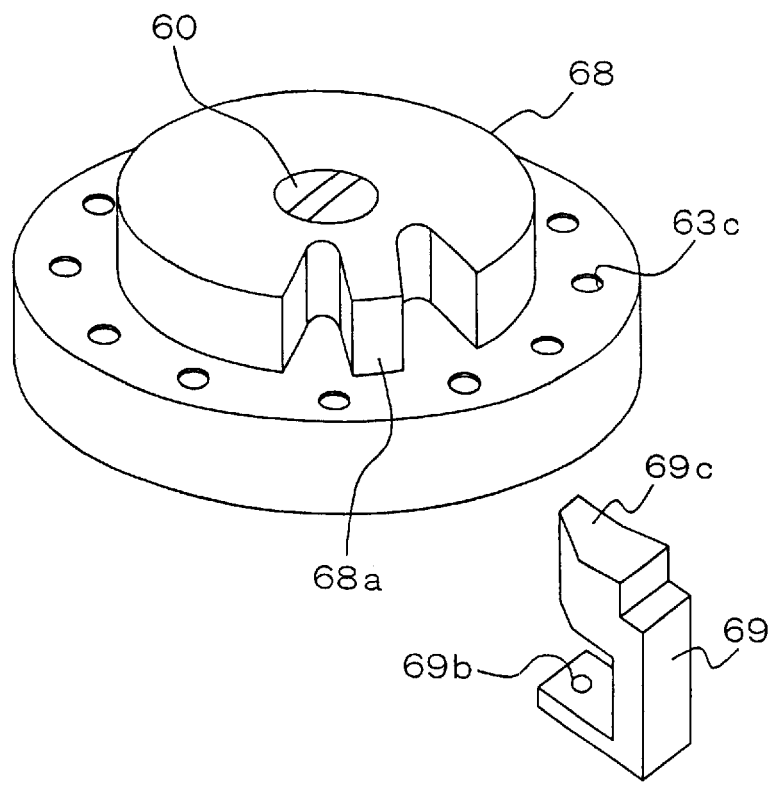
FIG. 15 is a general perspective view schematically showing the external appearance of the sixth embodiment.

Next, a sixth embodiment of the present invention will be described with reference to FIGS. 14 and 15. Since this embodiment includes a winding stem 60, a mainspring 61, a barrel drum 62, a braking case 64, a braking plate 65, and an output gear 68 similar to those in the first embodiment, descriptions thereof are omitted.

In this embodiment, a plurality of engaging apertures (or holes) 63c are formed on the upper surface of a barrel lid 63, and engaging apertures 64c are formed on the surface of the braking case 64. The engaging apertures 63c and the engaging apertures 64c are formed at corresponding positions, and engaging protuberances 69a and 69b of a regulating member 69 are engaged therewith. The regulating member 69 is formed in an angular U-shape as a whole, and has at its upper end a regulating portion 69c for regulating teeth 68a of the output gear 68.

When the regulating member 69 is engaged with the barrel lid 63 and the braking case 64, as described above, the regulating portion 69c regulates the output gear 68 and prevents the rotation thereof. In this case, it is also possible to regulate the rotation of the output gear 68 at a plurality of regulating positions (positions based on the driving-force storing section) and to maintain a plurality of different winding states of the mainspring 61, in a manner similar to that in the above fifth embodiment. In particular, since the regulating member 69 regulates the output member 68 in engagement therewith while it is engaged with a plurality of (two) different positions in the driving-force storing section and the braking section in this embodiment, it can be more reliably positioned, and the winding state of the mainspring can be more reliably maintained.

[Seventh Embodiment]

Next, a sixth embodiment of the present invention will be described with reference to FIGS. 16 and 17. Since this embodiment includes a winding stem 70, a mainspring 71, a barrel drum 72, a braking case 74, a braking plate 75, and an output gear 78 similar to those in the first embodiment, descriptions thereof are omitted.

In this embodiment, a plurality of engaging apertures (or holes) 73c are formed on the upper surface of a barrel lid 73. All the engaging apertures 73c are arranged on the outer peripheral side of the output gear 78. A regulating pin 79A having a leading end portion 79a to be inserted in the engaging apertures 73c, and a large-diameter head portion 79b is provided. A regulating lever 79B having an insertion hole 79c for passing the regulating pin 79A therethrough, and an engaging protuberance 79c to be engaged with a rotation-controlling groove 70c formed at the upper end of the winding stem 70 is provided.

Figure 16:
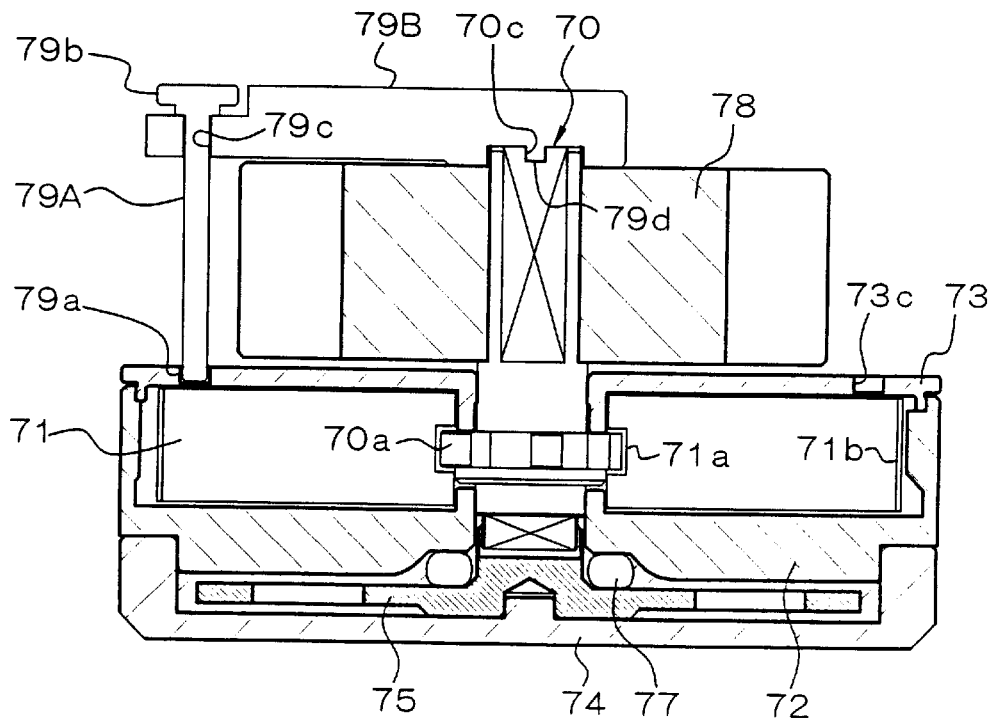
FIG. 16 is a longitudinal sectional view showing the structure of a seventh embodiment of the present invention.
Figure 17:
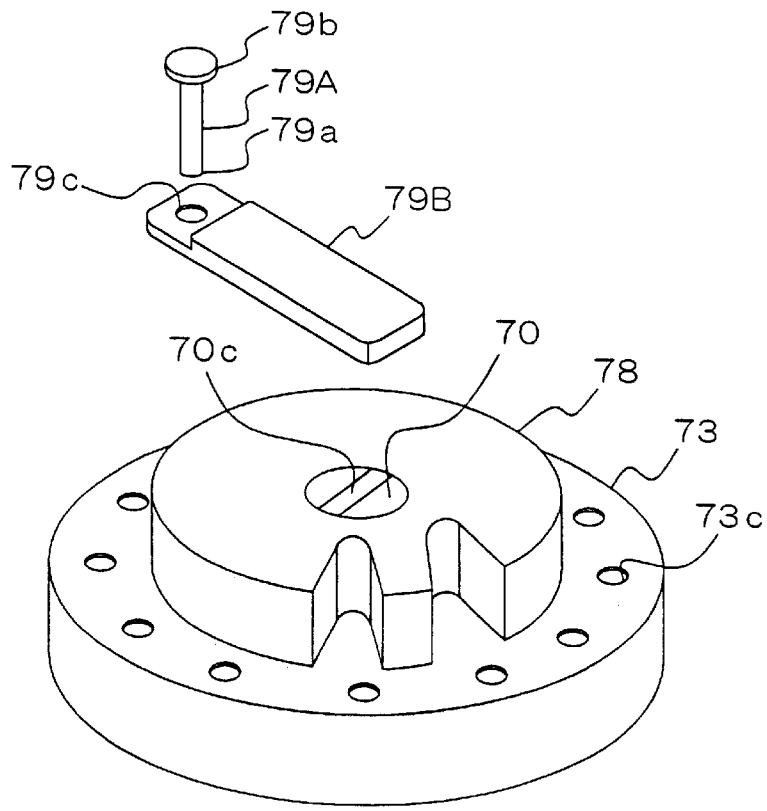
FIG. 17 is a general perspective view schematically showing the external appearance of the seventh embodiment.

As shown in FIG. 16, the rotation of the winding stem 70 can be regulated by the regulating pin 79A and the regulating lever 79B by inserting the leading end portion 79a of the regulating pin 79A in the engaging hole 73c of the barrel lid 73 and engaging the engaging protuberance 79d of the regulating lever 79B with the rotation-controlling groove 70c of the winding stem 70c in a state in which the regulating pin 79A is passed through the insertion hole 79c of the regulating lever 79B and the head portion 79b is engaged with the regulating lever 79B. Therefore, the mainspring 71 can be maintained in an appropriate winding state.

In the above-described fifth to seventh embodiments, in a case in which the above mainspring mechanism is loaded in various devices, it is preferable that the winding state of the mainspring be maintained by the above regulating device after the mainspring is wound up by using the rotation-controlling groove beforehand, and that the regulating device be removed or the regulating state be released when loading the mainspring mechanism into the devices. This makes it possible to reduce the variations in the set torque of the mainspring mechanism when loading the mechanism into the devices, and to easily perform the loading operation.

[Example of Shape of Winding Stem]

Figure 18:
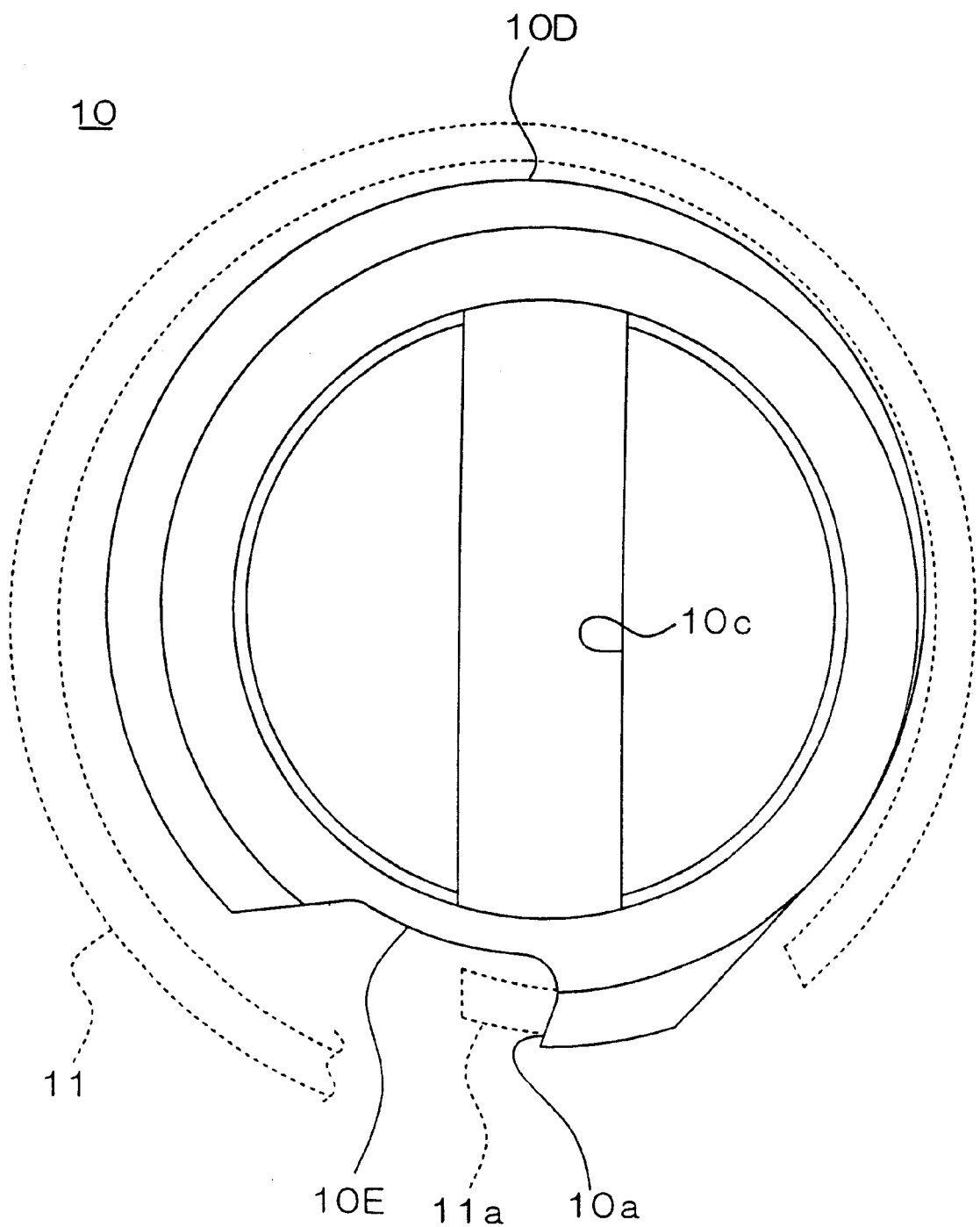
FIG. 18 is an enlarged plan view showing the detailed planar shape of a winding stem.

Next, an example of a shape of the winding stem which can be used in the above-described embodiments and the following embodiments will be described with reference to FIG. 18. FIG. 18 is a plan view of the winding stem 10. While the following description corresponds to the mainspring mechanism of the first embodiment, the winding stem may also be similarly used in other embodiments.

The winding stem 10 is shaped like a hook (claw) because the mounting portion 10a to be engaged with the inner end 11a of the mainspring 11 has a recess 10E, and has an outer peripheral surface 10D whose outer diameter gradually increases from the mounting portion 10a along the spiral shape of the mainspring 11 (for example, in the counterclockwise direction when the mainspring 11 extends counterclockwise from the inner end 11a, as shown in the figure). For example, the outer peripheral surface 10D is shaped like an Archimedes' spiral (the equiangular spiral $r=a\theta$; $r$ represents the radius, $a$ represents an arbitrary constant, and $\theta$ represents the angle). By forming such an outer peripheral surface 10D, the mainspring 11 is smoothly transformed, and a smooth driving characteristic is obtained.

[Eighth Embodiment]

Next, an eighth embodiment of the present invention will be described with reference to FIG. 19. Since a winding stem 80, a mainspring 81, a barrel drum 82, a barrel lid 83, a braking plate 85, a fluid 86, a sealing member 87, and an output gear 88 in this embodiment are basically similar to those in the first embodiment, descriptions thereof are omitted.

Figure 19:
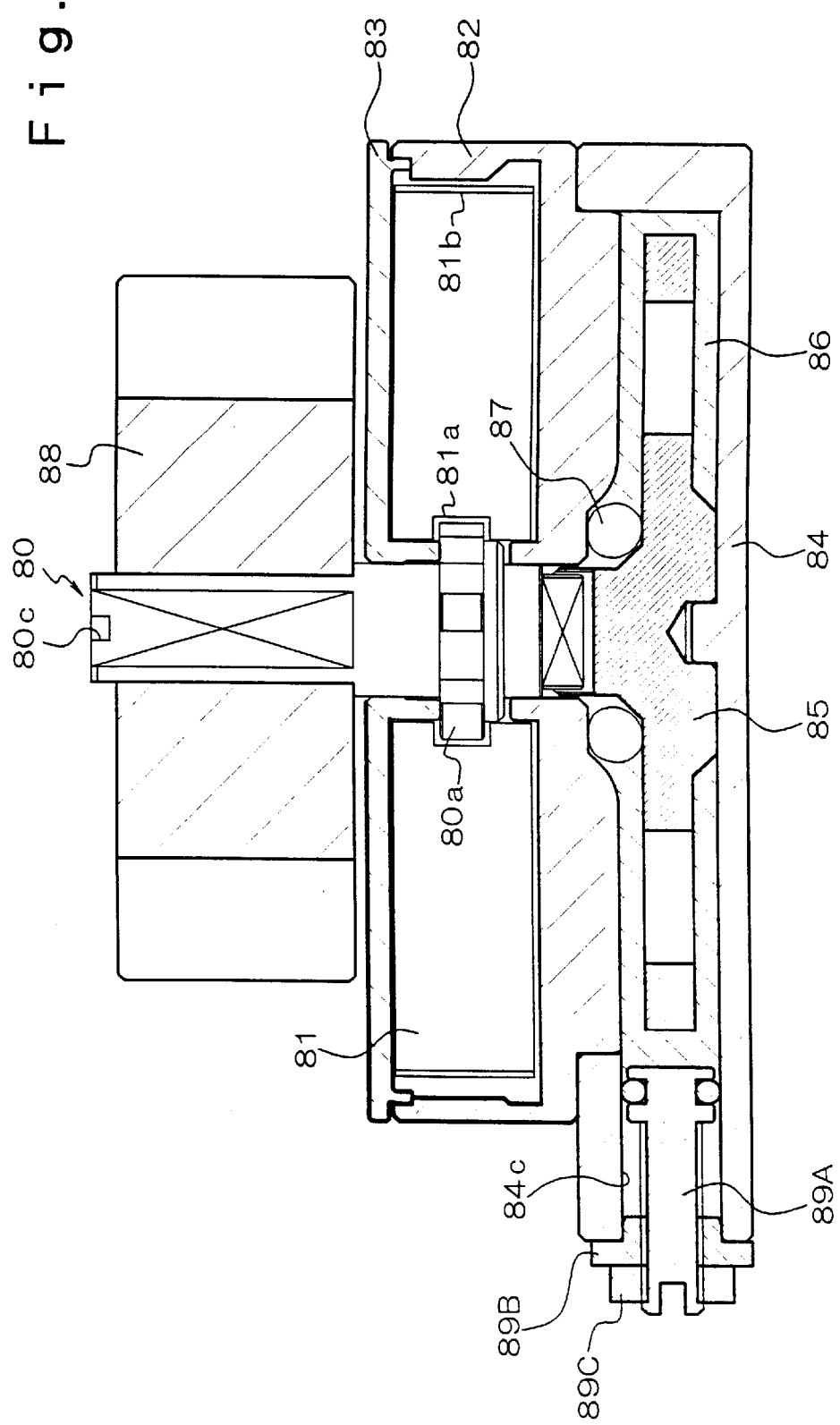
FIG. 19 is a longitudinal sectional view showing the structure of an eighth embodiment of the present invention.

A braking case 84 of this embodiment is different from those in the above embodiments in that it has a cylindrical portion 84c protruding to the outer periphery as shown in FIG. 19, and in that a piston 89A is slidably placed inside the cylindrical portion 84c. The piston 89A is screwed into a closing plug 89B fixed at the outer end of the cylindrical portion 84c. By being rotated, the piston 89A can be moved forward and backward in the axial direction of the cylindrical portion 84c. A locknut 89C is screwed on the piston 89A, and prevents the piston 89A from entering the inside of the braking case 84.

The interior of the braking case 84 on both the upper and lower sides of the braking plate 85 is filled with the fluid 86. The capacity of the space storing the fluid 86 (braking-member holding portion) is increased and decreased by the forward and backward movement of the piston 89A inside the cylindrical portion 84c. As a result, the area of the fluid 86 in contact with the surface of the braking plate 85 can be increased and decreased, and therefore, the braking force to be applied to the winding stem 80 can be adjusted by operating the piston 89A. More specifically, when the piston 89A is drawn out of the braking case 84 from the state shown in the figure, the capacity of the braking-member holding portion increases, the contact area between the fluid 86 and the braking plate 85 is decreased, the rotational resistance of the braking plate 85 decreases, and therefore, the braking force decreases. Conversely, when the piston 89A is pushed inward from the drawn state, as shown in the figure, since the capacity of the braking-member holding portion is reduced, the contact area between the fluid 86 and the braking plate 86 increases, and the braking force also increases.

[Ninth Embodiment]

Figure 20:
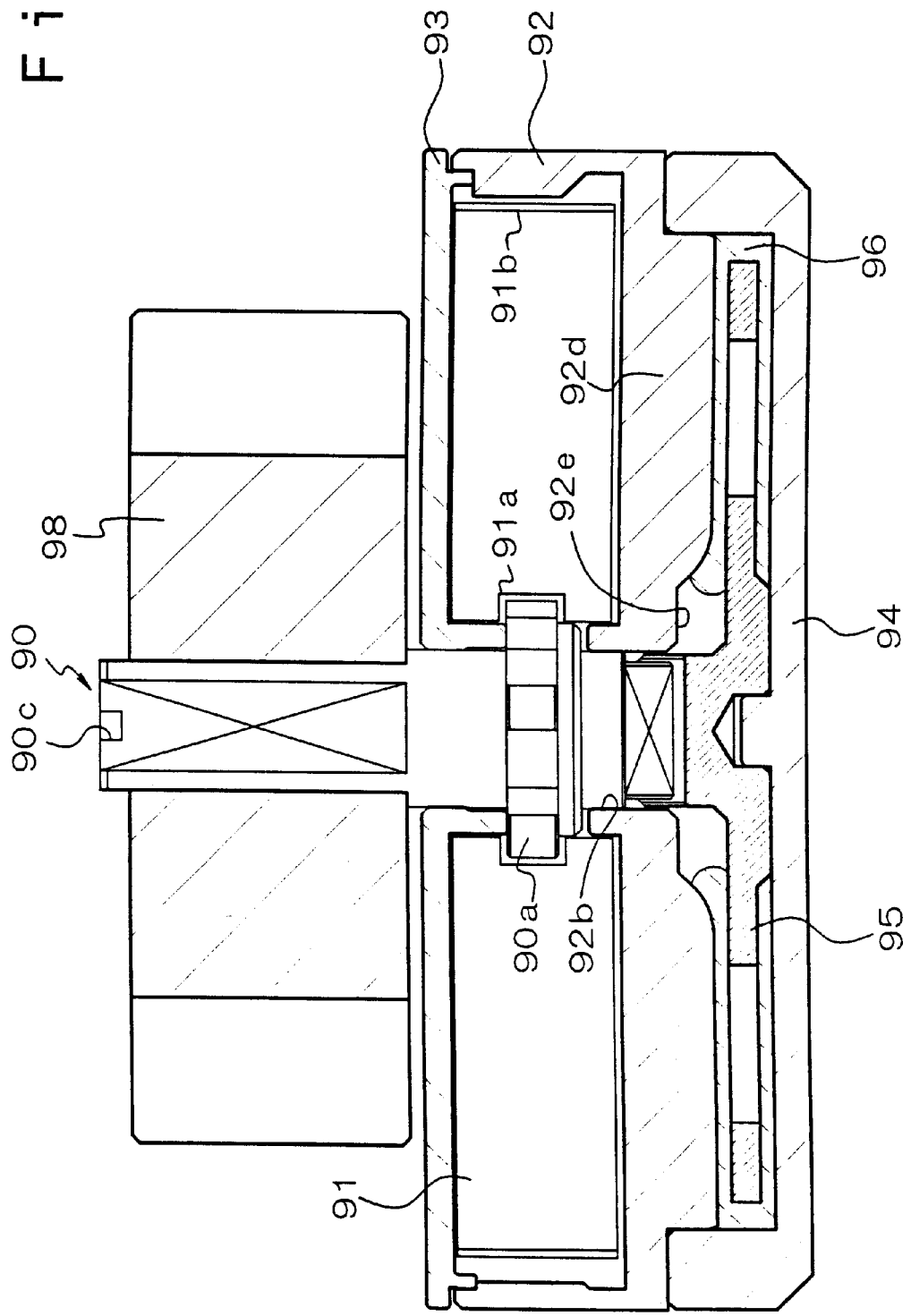
FIG. 20 is a longitudinal sectional view showing the structure of a ninth embodiment of the present invention.

Next, a ninth embodiment of the present invention will be described with reference to FIG. 20. Since a winding stem 90, a mainspring 91, a barrel drum 92, a barrel lid 93, a braking case 94, a braking member 95, and a fluid 96 in this embodiment are basically similar to those in the first embodiment, descriptions thereof are omitted.

While this embodiment includes components similar to those in the first embodiment, the above-described sealing member is not placed between the barrel drum 92 and the braking member 95. A bottom surface 92d of the barrel drum 92 is provided with a recessed portion 92e having a surface which recedes upward toward a center hole 92b away from the surface of the braking plate 95. The distance between the surface of the braking member 95 and the bottom surface 92d of the barrel drum 92 gradually increases toward the connecting portion between the winding stem 92 and the braking member 95, that is, toward the boundary between the recessed portion 92e and the surface at almost the center of the braking plate 95.

More specifically, since the recessed portion 92e is formed in the braking-member holding portion, the distance between the upper surface of the braking plate 95 and the barrel drum 92d increases on the inner peripheral side. The distance between the bottom surface 92d and the braking plate 95 is substantially fixed in an area of the braking plate 95 where a braking portion is placed, except for the center portion. While the fluid 96 is filled so that it is in contact with the upper and lower sides of the braking portion of the braking plate 95, it does not exist around the center portion of the braking plate 95. The fluid 96 is disposed only in the braking portion with a small space because of its surface tension, and will not enter the increased space between the recessed portion 92e and the surface at almost the center of the braking plate 95.

In this embodiment, since the fluid 96 is prevented by the recessed portion 92e from entering the center portion of the braking plate 95, as described above, a sealing member, such as a gasket, and a complicated structure for sealing are not needed, and unnecessary rotational resistances due to the sealing member and the sealing structure (resistance components which do not have any effect of reducing variations in rotational speed) can be reduced. Moreover, the structure of the braking section can be simplified.

The sealing method using the surface tension of the fluid as in this embodiment is also applicable to all the embodiments mentioned in this description. The leak-preventing effect of the surface tension of the fluid is effective when the viscosity of the fluid is not so high. Since the action of the surface tension of the fluid 96 is weakened when the viscosity is high, the fluid 96 may leak toward the winding stem 90 along the bottom surface of the barrel drum 92. Therefore, in such a case, it is preferable to prevent the fluid from leaking by mounting a sealing member such as a gasket.

[Tenth Embodiment]

Figure 21:
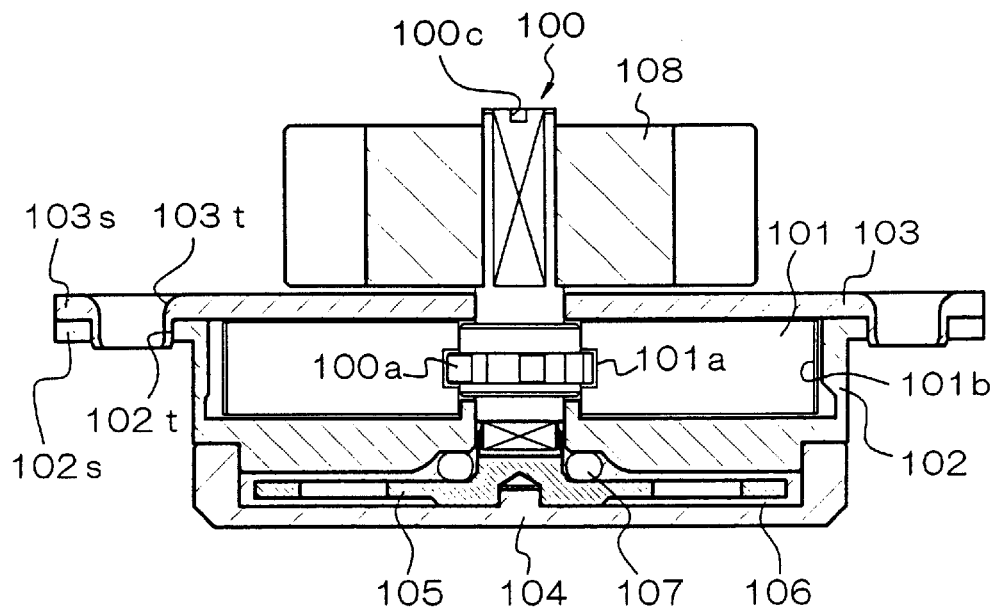
FIG. 21 is a longitudinal sectional view showing the structure of a tenth embodiment of the present invention.
Figure 22:
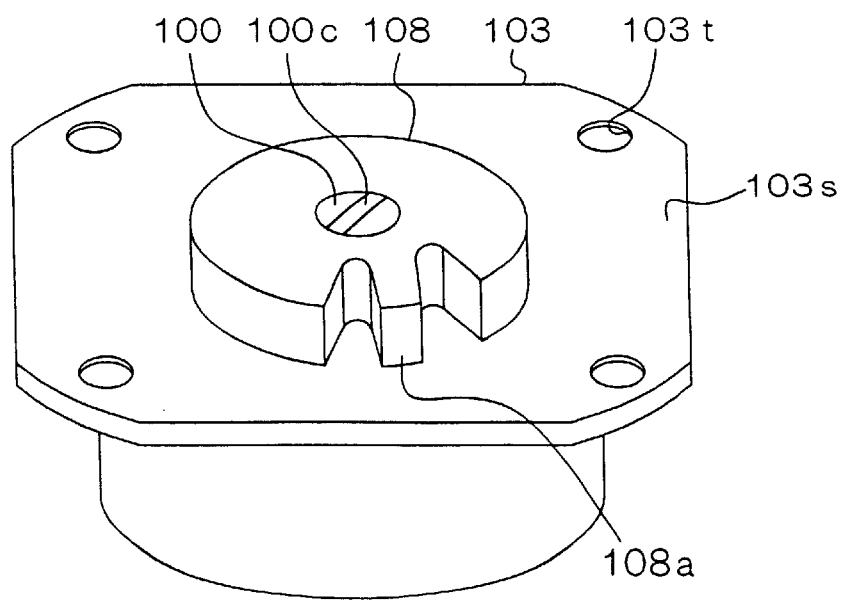
FIG. 22 is a general perspective view schematically showing the external appearance of the tenth embodiment.

Next, a tenth embodiment of the present invention will be described with reference to FIGS. 21 and 22. Since this embodiment includes a winding stem 100, a mainspring 101, a braking case 104, a braking plate 105, a fluid 106, a sealing member 107, and an output gear 108 similar to those in the first embodiment, descriptions thereof are omitted.

In this embodiment, a barrel drum 102 and a barrel lid 103 connected thereto have flange portions 102s and 103s, respectively, which protrude toward the outer periphery and which are placed one on the other. The flange portion 102s has insertion holes 102t, and the flange portion 103s has mounting holes 103t passed through the insertion holes 102t. The mounting holes 103t are used for fixing to various devices (not shown) with bolts or fixing screws.

While the mainspring mechanism of this embodiment is mounted on another member or various devices at the mounting holes 103t which are formed integrally with the barrel drum 102 and the barrel lid 103 constituting the driving-force storing section, since the barrel drum 102 and the barrel lid 103 receive the largest force in the mainspring mechanism, they are essentially made of high-rigidity materials, and allow the mainspring mechanism to be reliably mounted with high rigidity. In particular, in the portions where the mounting holes 103t are formed, since the flange portion 102s of the barrel drum 102 and the flange portion 103s of the barrel lid 103 are placed one on the other, greater rigidity can be ensured.

Since the driving-force storing section of this embodiment is adapted to be mounted in another member and various devices, the mounting position thereof in another member and various devices can be constantly fixed. Therefore, for example, in a case in which the mechanism is assembled into a device or the like while the winding state of the mainspring 101 is set in a predetermined state, the driving-force storing section including the mainspring 101 is mounted in a fixed position, and as a result, the winding state of the mainspring can be prevented from varying after assembly.

[Eleventh Embodiment]

Figure 23:
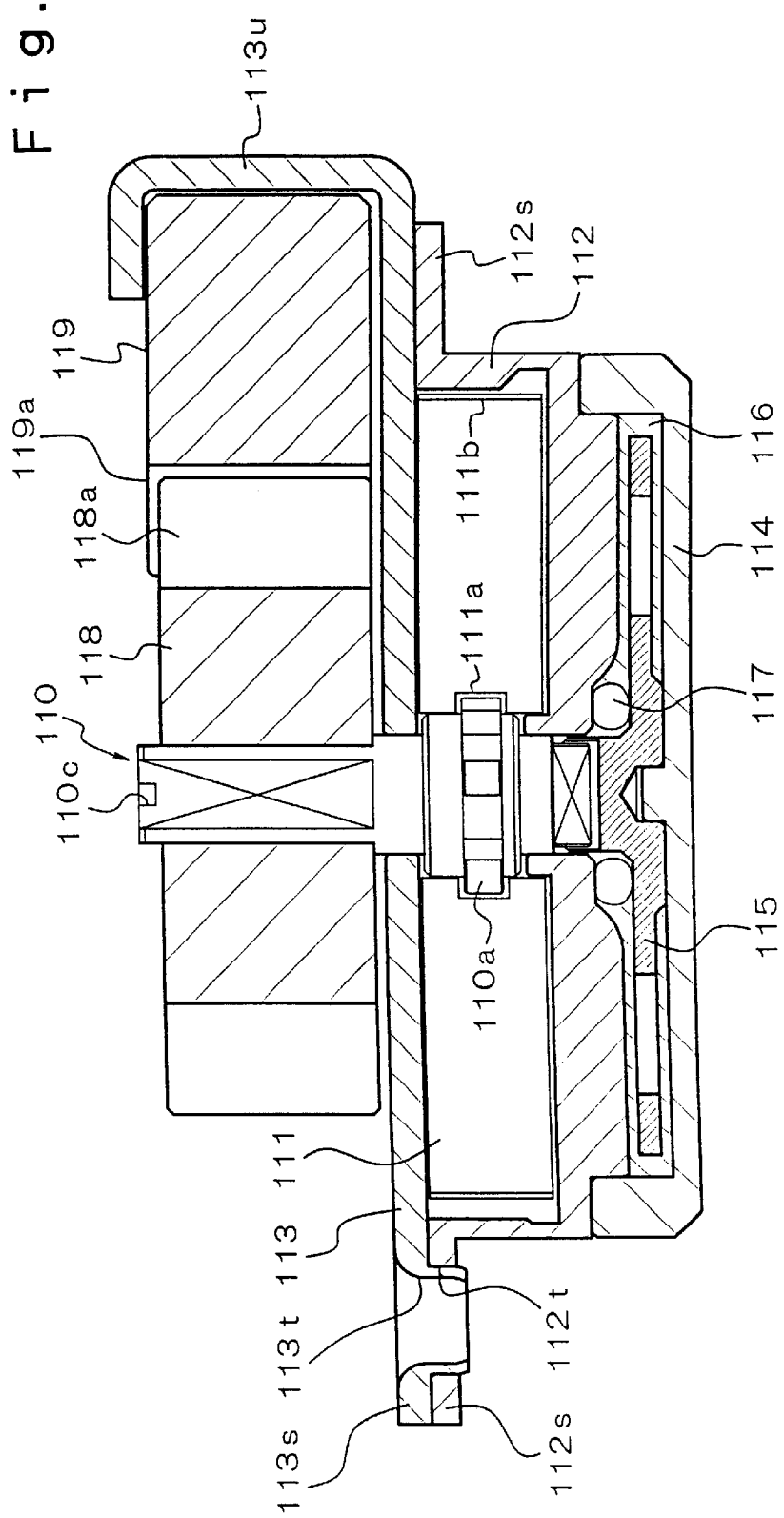
FIG. 23 is a longitudinal sectional view showing the structure of an eleventh embodiment of the present invention.

Next, an eleventh embodiment of the present invention will be described with reference to FIG. 23. Since this embodiment includes a winding stem 110, a mainspring 111, a barrel drum 112, a barrel lid 113, a braking case 114, a braking plate 115, a fluid 116, a sealing member 117, and an output gear 118 substantially similar to those in the tenth embodiment, descriptions thereof are omitted.

In this embodiment, a part of a flange portion 113 of the barrel lid 113 extends upward to form a holding frame 113u of nearly angular U-shaped cross section. A rack 119 meshed with the output gear 118 is held in the holding frame 113u and is guided by the holding frame 113u so that it can move in the direction orthogonal to the plane of the figure.

In this embodiment, when the rack 119 is moved in the direction orthogonal to the plane of the figure, the output gear 118 rotates, and the mainspring 111 is wound up via the winding stem 110. In a state in which the mainspring 111 is wound up, the output gear 118 is rotationally driven via the winding stem 110, so that the rack 119 is moved in the direction orthogonal to the plane of the figure. That is, this embodiment includes the rack and the pinion, and can be incorporated as a direct-acting mainspring module in another product, component, or the like without changing the structure thereof.

[Twelfth Embodiment]

Figure 24:
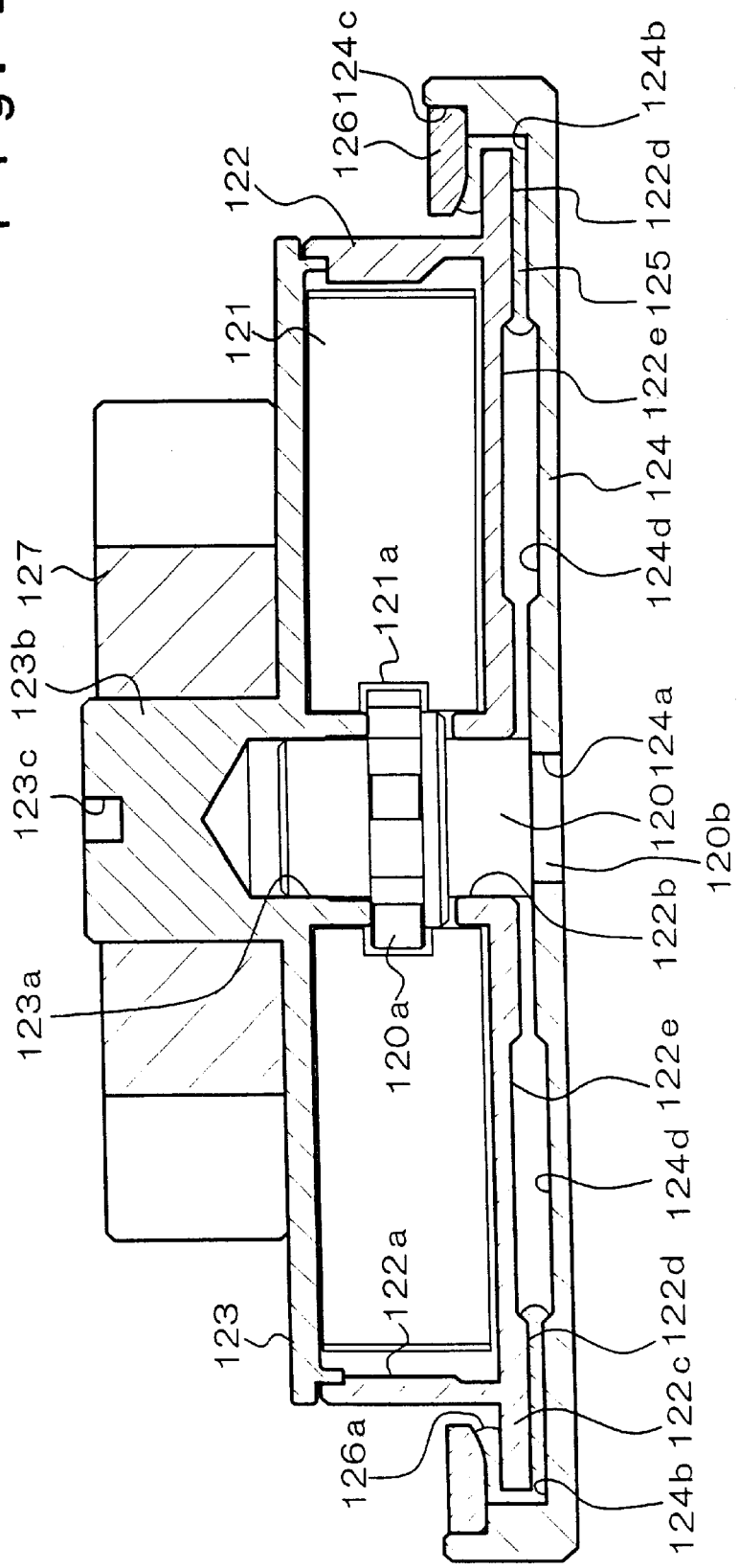
FIG. 24 is a longitudinal sectional view showing the structure of a twelfth embodiment of the present invention.
Figure 25:
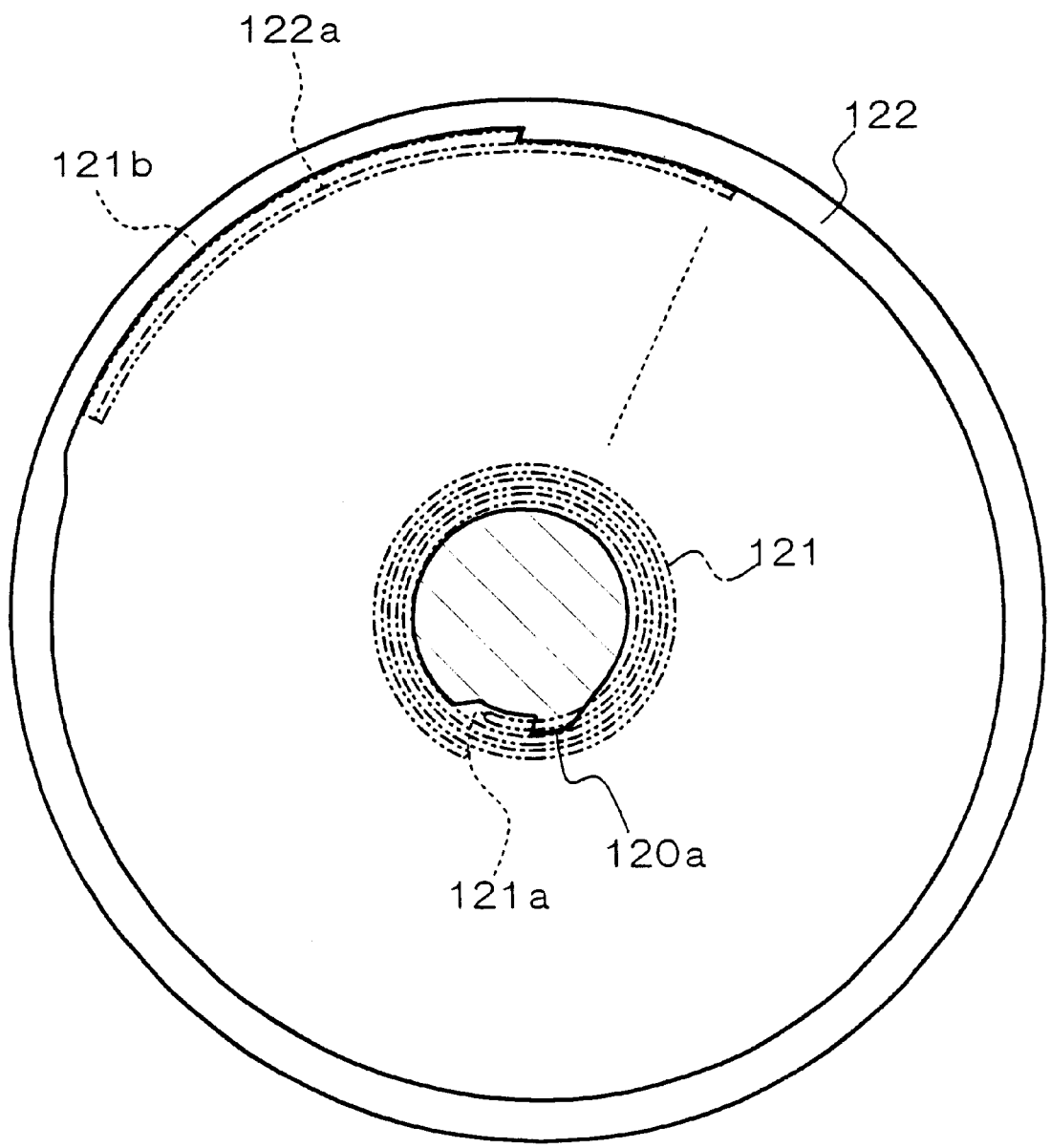
FIG. 25 is a plan[]view showing a state in which a mainspring is loaded in a mainspring case in the twelfth embodiment.
Figure 26:
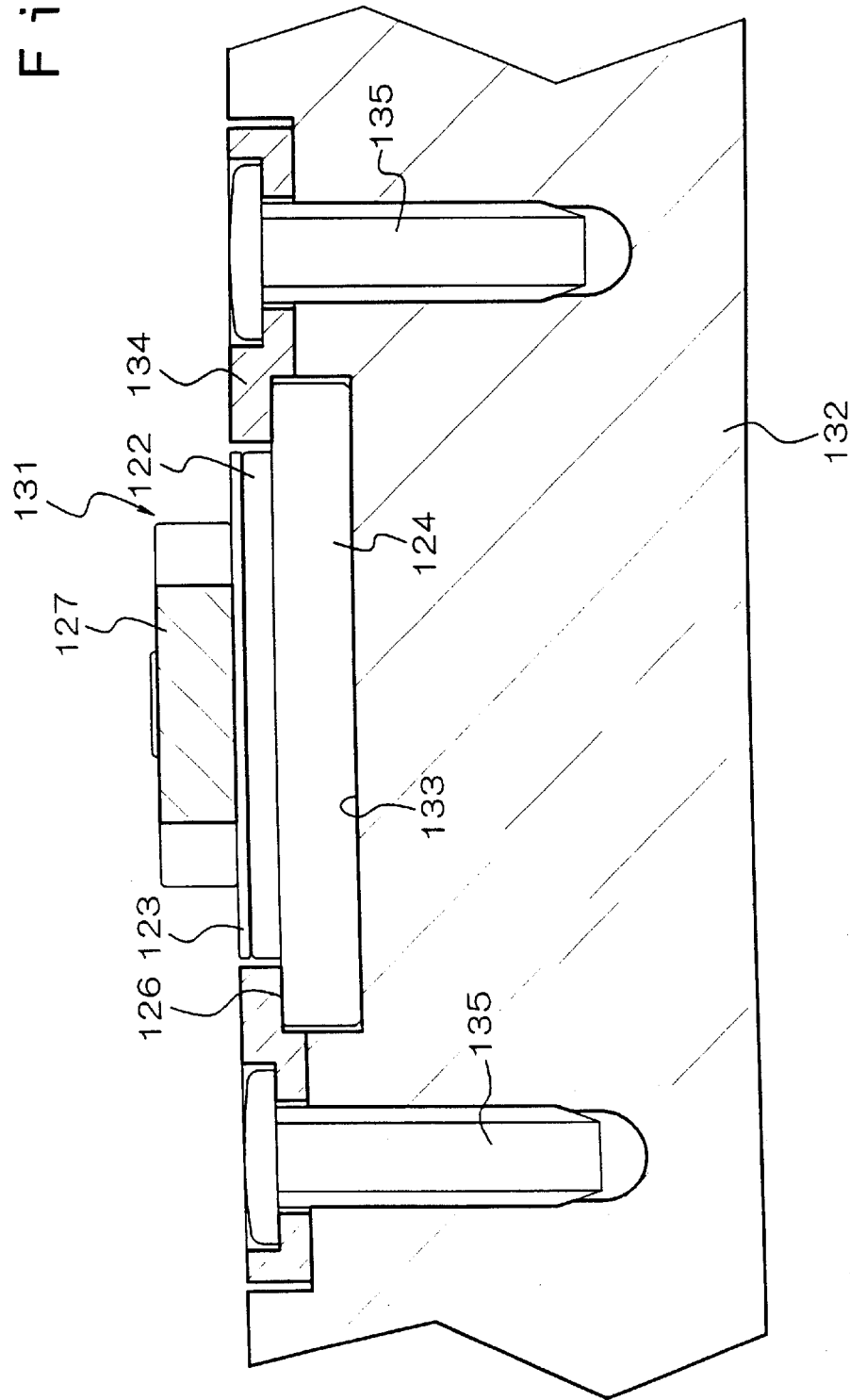
FIG. 26 is an assembly sectional view showing a state in which the mainspring mechanism of the twelfth embodiment is mounted in a device.
Figure 27:
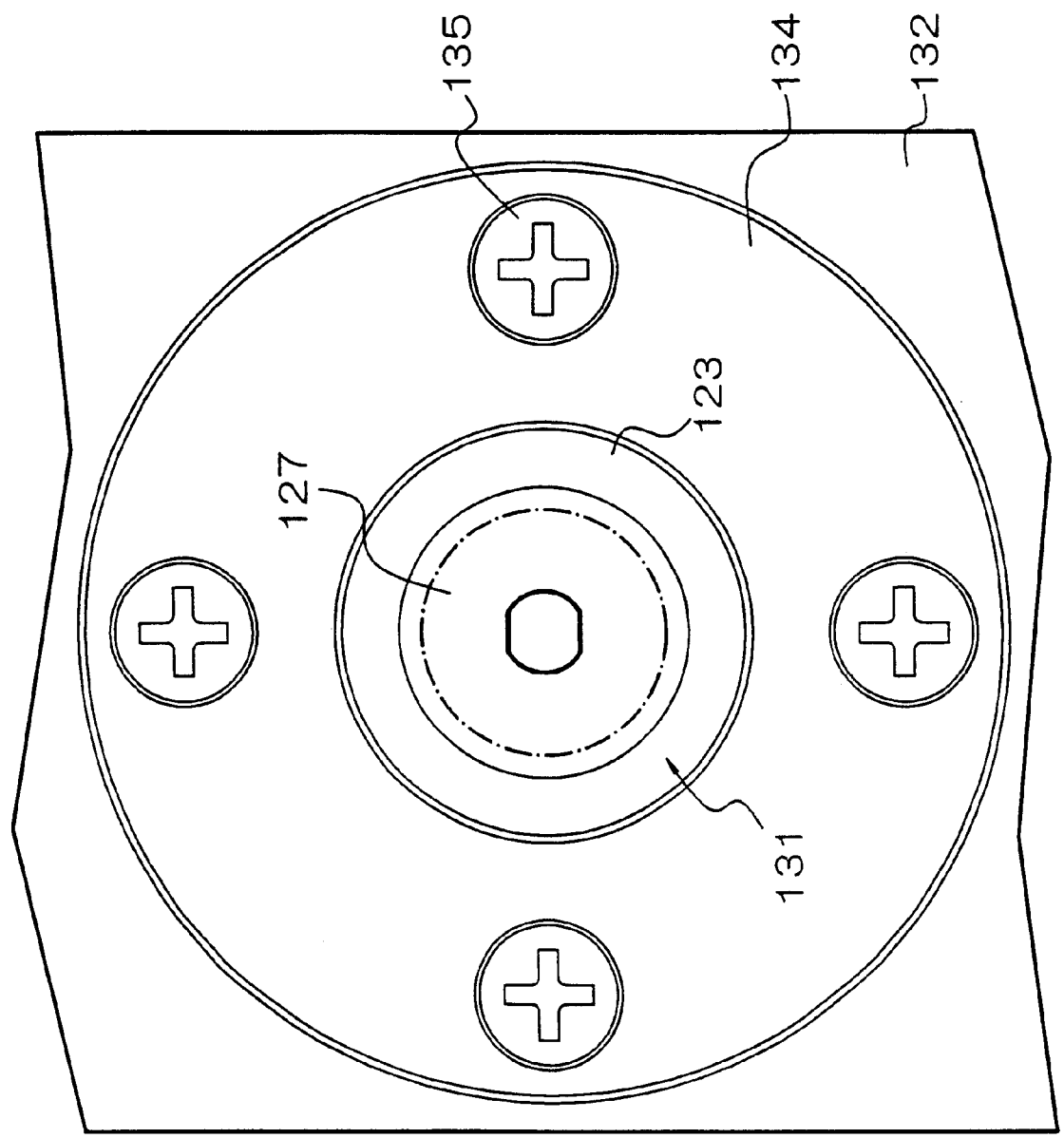
FIG. 27 is a plan view showing the state in which the mainspring mechanism of the twelfth embodiment is mounted in the device.

FIG. 24 is a sectional view showing a twelfth embodiment of the present invention, FIG. 25 is a plan view showing a state in which a mainspring is placed in a mainspring case (barrel drum) in the first embodiment, FIG. 26 is an assembly sectional view showing a state in which the mainspring mechanism of the twelfth embodiment is assembled in a device, and FIG. 27 is a plan view showing that state.

This embodiment includes a columnar winding stem 120 forming a center member, a spiral mainspring 121 with an inner end mounting portion 121a shaped like a square hole and connected to a mainspring mounting portion 120a of the winding stem 120, and a barrel drum 122 and a barrel lid 123 constituting a mainspring case for holding the mainspring 121 therein. The barrel drum 122 and the barrel lid 123 corotate, and rotatably support the winding stem 120. The mainspring 121 is enclosed by the barrel drum 122 and the barrel lid 123. An outer end 121b of the mainspring 121 is engaged with a cutout portion 122a formed on the inner periphery of the barrel drum 122, and the rotation thereof is thereby regulated. The winding stem 120 is supported by a center hole 122b of the barrel drum 122 and a center hole 123a of the barrel lid 123 in rotational contact therewith. An engaging portion 120b of the winding stem 120 and an engaging hole 124a of a braking case 14 are fixedly press-fitted together while the rotation thereof are regulated.

At the bottom end of the barrel drum 122, the saucer-shaped braking case 124 projects from below so as to wrap around a braking wing portion 122c projecting on the outer periphery of the barrel drum 122. A fluid 125, such as oil, fills the space between a bottom surface 122d of the barrel drum 122 and a holding recess 124b of the braking case 124. When the braking wing portion 122c and the bottom surface 122d of the barrel drum 122 rotate in the fluid 125, they receive a predetermined rotational resistance resulting from a fluid-solid flow (viscosity) resistance produced among the braking wing portion 122c and the barrel drum bottom surface 122d, the holding recess 124b of the braking case 124, and the fluid 125. The fluid 125 fills the space defined by the braking case 124, the barrel drum bottom surface 122d, and a braking case lid 126. A lid press-fitting portion 124c projects on the upper and outer periphery of the braking case 124, and the braking case lid 126 is fixedly press-fitted thereinto. It can be readily conceived to easily soak the braking wing portion 122c into the fluid 125 during assembly and to increase the rotational resistance produced between the braking wing portion 122c of the barrel drum 122 and the fluid 125 by forming a plurality of openings (not shown) in the braking wing portion 122c of the barrel drum 122 or by forming teeth in the braking wing portion 122c around its circumference.

The braking case lid 126 has an opening 126a formed so that the gap with respect to the braking wing portion 122c of the barrel drum gradually increases toward the inner side. For this reason, the fluid 125 stays in the gap formed between the braking wing portion 122c of the barrel drum 122 and the braking case lid 126 because of its surface tension, the interface of the fluid 125 is placed at the opening 126a of the braking case lid 126, and the fluid 125 will not leak out of the braking case lid 126.

By forming an upper long groove 122e on the inner side of the bottom surface 122d of the barrel drum 122 and forming a lower long groove 124d on the braking case 124, a surface tension similar to the above is produced so that the fluid 125 will not move toward the center. This can prevent the fluid 125 from entering the barrel drum 122.

The barrel lid 123 has a center protuberance 123b extending in the center. A gear 127 (a driving-force transmitting device, an output section, an output gear) is fixed on the center protuberance 123b while its rotation is regulated. A rotating-controlling groove 123c to which a tool, such as a flat-tip screwdriver, can be engaged is formed at the upper end of the center protuberance 123b.

In this embodiment, the mainspring 121 can be wound up by rotating the winding stem 120 and the barrel drum 122 relative to each other. The wound mainspring 121 stores rotational energy. When one of the winding stem 120 and the barrel drum 122 is released, it rotates in the direction opposite from the winding direction. Since the braking case 124 joined to the winding stem 120 in the rotating direction and the barrel drum 122 rotate relative to each other in response to the rotation, a rotational resistance is produced among the braking case 124, the braking case lid 126, and the barrel drum 122 via the fluid 125. In general, the rotational resistance monotonously increases with the rotational speed, and therefore, it acts to suppress variations in the rotational speed.

The braking case 124 is shaped like a flanged saucer. The outer peripheral portion thereof rises in the axial direction, and is fitted on the braking case lid 126. Assembly is performed by putting the fluid 125 into the braking case 124 along the outer peripheral portion of the saucer-shaped braking case 124, and then rotatably engaging the barrel drum 122 with the winding stem 120 so that the braking wing portion 122c is placed inside the outer peripheral portion of the braking case 124. During this assembly operation, the saucer-like shape of the braking case 124 makes filling with the fluid 125 easy, and the shapes of the upper long groove 122e, the lower long groove 124d, and the braking case lid 126 described above prevent the fluid 125 from leaking.

As described above, in this embodiment, since the fluid 125 is prevented from leaking by forming the opening 126a in the braking case lid 126, a sealing member, such as a gasket, and a complicated structure for sealing are unnecessary. This makes it possible to reduce unnecessary rotational resistances (resistance components which do not have any effect of reducing variations in rotational speed), and to simplify the structure.

It is preferable that a slipping attachment for preventing the mainspring 121 from being overwound be incorporated in the principal part of the mainspring mechanism constituted by the winding stem 120, the mainspring 121, and the barrel drum 122. The slipping attachment has a structure in which a curved spring separate from the mainspring is disposed at the outer end, and the mainspring 121 and the barrel drum 122 are connected in the rotating direction by the radial frictional force of the spring with respect to the barrel drum 122. In normal times, the spring is engaged with the inner peripheral surface of the barrel drum 122 by the frictional force, and therefore, the position of the outer end of the mainspring 121 is fixed. In this case, the above-described cutout portion 122a is not formed on the inner peripheral surface of the barrel drum 122. By applying a load greater than the frictional force to the spring, the spring slips and prevents the mainspring from being broken and yielding due to overwinding.

In this embodiment, since the driving-force storing section including the barrel drum 122 and the braking section including the braking wing portion 122c are placed at different positions so that they do not overlap in two dimensions, the thickness can be easily reduced, and the overall size can be made more compact. Furthermore, since the above configuration is a quite simple configuration which does not include any small and complicated components, and which includes only the minimum number of components, it is possible to reduce the cost of parts and the assembly cost, and to thereby reduce the production cost.

This embodiment has a configuration which is suitable for the case in which the braking case 124 is fixed and the gear 127 is used as the input-output shaft. For example, FIG. 26 is an assembly sectional view showing a state in which the mainspring mechanism of the twelfth embodiment is incorporated in a device, and FIG. 27 is a plan view showing the state. The braking case 124 of the mainspring mechanism 131 of this embodiment is held in a holding section 133 formed inside a plate 132 so that its rotation is regulated. A case cover 134 is placed in the plate 132 so as to press the top of the braking case lid 126 of the mainspring mechanism 131. The case cover 134 is fixed to the plate 132 by fastening screws 135, and the mainspring mechanism 131 is fixed via the braking case lid 126 thereof so that it is sandwiched between the holding section 133 of the plate 132 and the case cover 134. As shown in the figures, since this embodiment is easily incorporated in another member or device so that only the gear 127 protrudes outside, it can be stored in a compact state, and the space is easily prevented from being wasted.

[Thirteenth Embodiment]

Figure 28:
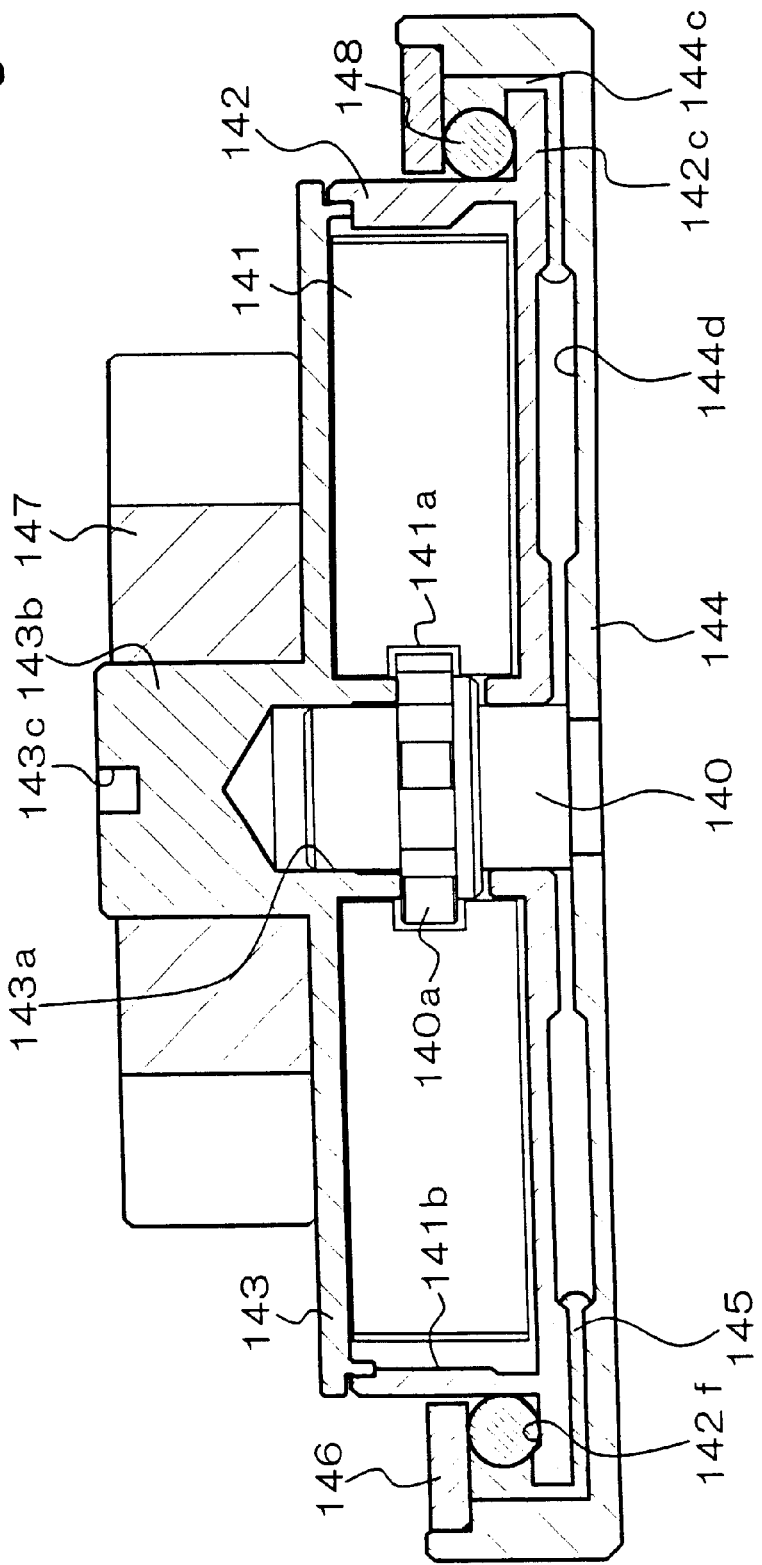
FIG. 28 is a longitudinal sectional view showing the structure of a thirteenth embodiment of the present invention.

Next, a mainspring mechanism according to a thirteenth embodiment of the present invention will be described with reference to FIG. 28. Since this embodiment includes a winding stem 140, a mainspring 141, a barrel lid 143, and an output gear 147 similar to those in the above-described twelfth embodiment, descriptions thereof are omitted.

While this embodiment includes components substantially similar to those in the first embodiment, the upper part of a braking wing portion 142c of a barrel drum 142 slightly rises on the outer periphery, and has a groove-shaped gasket holding portion 142f on the inner periphery. The gasket holding portion 142f has such a structure that a ring-shaped gasket 148 neatly fits therein. The gasket 148 is placed in a compressed state between the braking wing portion 142c and a braking case lid 146. In this embodiment, the gasket 148 prevents a fluid 145 from leaking through the gap of the braking case lid 146. For this reason, a portion corresponding to the opening 126a of the braking case lid 126 in the twelfth embodiment is not formed.

In this embodiment, since the gasket 148 is placed outside the thick-walled body portion of the barrel drum 142 and within the thickness of the main body of the mainspring mechanism, the thickness is easily reduced, and a compact structure is maintained.

This embodiment has a structure which is adapted for use under quite severe conditions (for example, the viscosity of the fluid 145 is high, or the temperature condition abnormally changes), and in which a braking case 144 is completely sealed.

[Fourteenth Embodiment]

Figure 29:
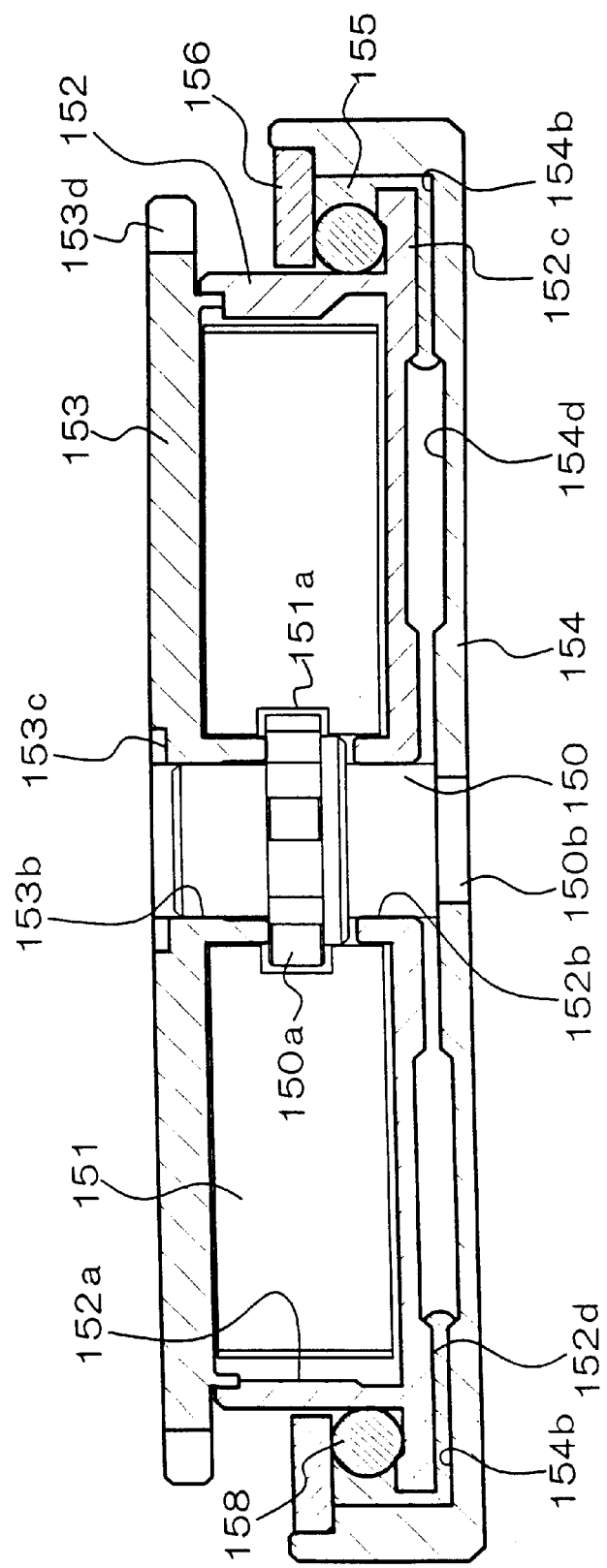
FIG. 29 is a longitudinal sectional view showing the structure of a fourteenth embodiment of the present invention.

Next, a mainspring mechanism according to a fourteenth embodiment of the present invention will be described with reference to FIG. 29. Since this embodiment includes a winding stem 150, a mainspring 151, and a fluid 155 similar to those in the twelfth embodiment and the thirteenth embodiment, and a barrel drum 152, a braking case 154, braking case lid 156, and a gasket 158 similar to those in the thirteenth embodiment, descriptions thereof are omitted.

In this embodiment, a barrel lid 153 is mounted on the barrel drum 152 similar to that in the thirteenth embodiment in a state in which the mainspring 151 is held in the barrel drum 152, and the mainspring 151 is thereby enclosed. The barrel lid 153 is different from the above-described barrel lids 123 and 143 in that the outer peripheral portion thereof is shaped like a flange so as to protrude outward from the outer edge of the barrel drum 152, and in that a peripheral gear portion 153d having teeth is formed in the outer peripheral portion. A rotation-controlling groove 153c functioning in a manner similar to that in the twelfth embodiment is formed at the top of the barrel lid 153 (that is, the rim of a center hole 153b for holding the winding stem 150 in the figure).

In this embodiment, as described above, the barrel lid 153 also functions as the output device (output section). More specifically, since the output device is formed on the outer periphery of the barrel lid 153, the mainspring mechanism can be made thinner. This allows the mainspring mechanism to be incorporated into a smaller space in the device.

While the gasket 158 is provided in this embodiment in a manner similar to that in the thirteenth embodiment, it may be omitted in a manner similar to that in the twelfth embodiment.

This embodiment is suitable for use in a case in which the braking case 154 is fixed to another member or device, in a manner similar to the incorporation manner in the twelfth embodiment shown in FIGS. 26 and 27. Alternatively, for example, by forming a member similar to the peripheral gear portion 153d, which is formed on the outer periphery of the barrel lid 153, on the outer periphery of the braking case 154, a use condition in which the winding stem 150 and the braking case 154 are combined and the barrel drum 152 is fixed can be readily thought of.

[Fifteenth Embodiment]

Next, a mainspring mechanism according to a fifteenth embodiment of the present invention will be described with reference to FIG. 30. This embodiment is similar to the above-described twelfth to fourteenth embodiments in that an inner end 161a of a mainspring 161 is connected to an inner end mounting portion 160a of a winding stem 160 and in that an outer end 161b of the mainspring 161 is engaged with a cutout portion 162a of a barrel drum 162 in the rotating direction.

While the braking section constituted by the braking wing portion and the like is disposed outside the mainspring in the driving-force storing section in the above twelfth to fourteenth embodiments, the braking section in this embodiment is disposed inside the mainspring 161 of the driving-force storing section.

In this embodiment, a braking member 166 is rotatably fitted in a bore 160b formed inside the winding stem 160, and a braking case 164 is fixedly press-fitted in the bottom of the winding stem 160. A braking wing portion 166a of the braking member 166 is placed in a braking space formed by the winding stem 160 and the braking case 164. A gasket 168 is interposed between the braking case 164 and the braking member 166 so as to enclose a fluid 165 stored in the braking space. The gasket may, of course, be easily omitted by adopting a structure similar to that in the twelfth embodiment. The winding stem 160 and the braking member 166 rotate relative to each other so that a rotational resistance is produced due to the viscosity.

A lower end 166b of the braking member 166, and a center hole 162b of the barrel drum 162 storing the mainspring 161 are fixed while their rotations are regulated. A barrel lid 163 is fixedly press-fitted in an upper peripheral end portion 162c of the barrel drum 162. The barrel lid 163 protrudes inward to such a degree that the mainspring 161 is not exposed to the outside, where a center hole 163a is formed.

The winding stem 160 has a center protuberance 160c, and an output 167 is fixed to the center protuberance 160c while its rotation is regulated. A rotation-controlling groove 160d with which a tool, such as a flat-tip screwdriver can be engaged, is formed at the upper end of the center protuberance 160c.

This embodiment is characterized in that the mainspring 161 of the driving-force storing section is disposed on the outer periphery of the braking section and is disposed at a different position (does not overlap) in two dimensions in the axial direction of the mainspring, in a manner different from that in the twelfth embodiment. This easily reduces the thickness, and achieves a compact structure.

Since this embodiment can be easily mounted so that only the output gear 167 protrudes outside, in a manner similar to that in the twelfth embodiment, it can be made compact, and the space is not wasted. This embodiment also adopts a configuration which is effective when the barrel drum 162 is fixed.

[Sixteenth Embodiment]

Figure 31:
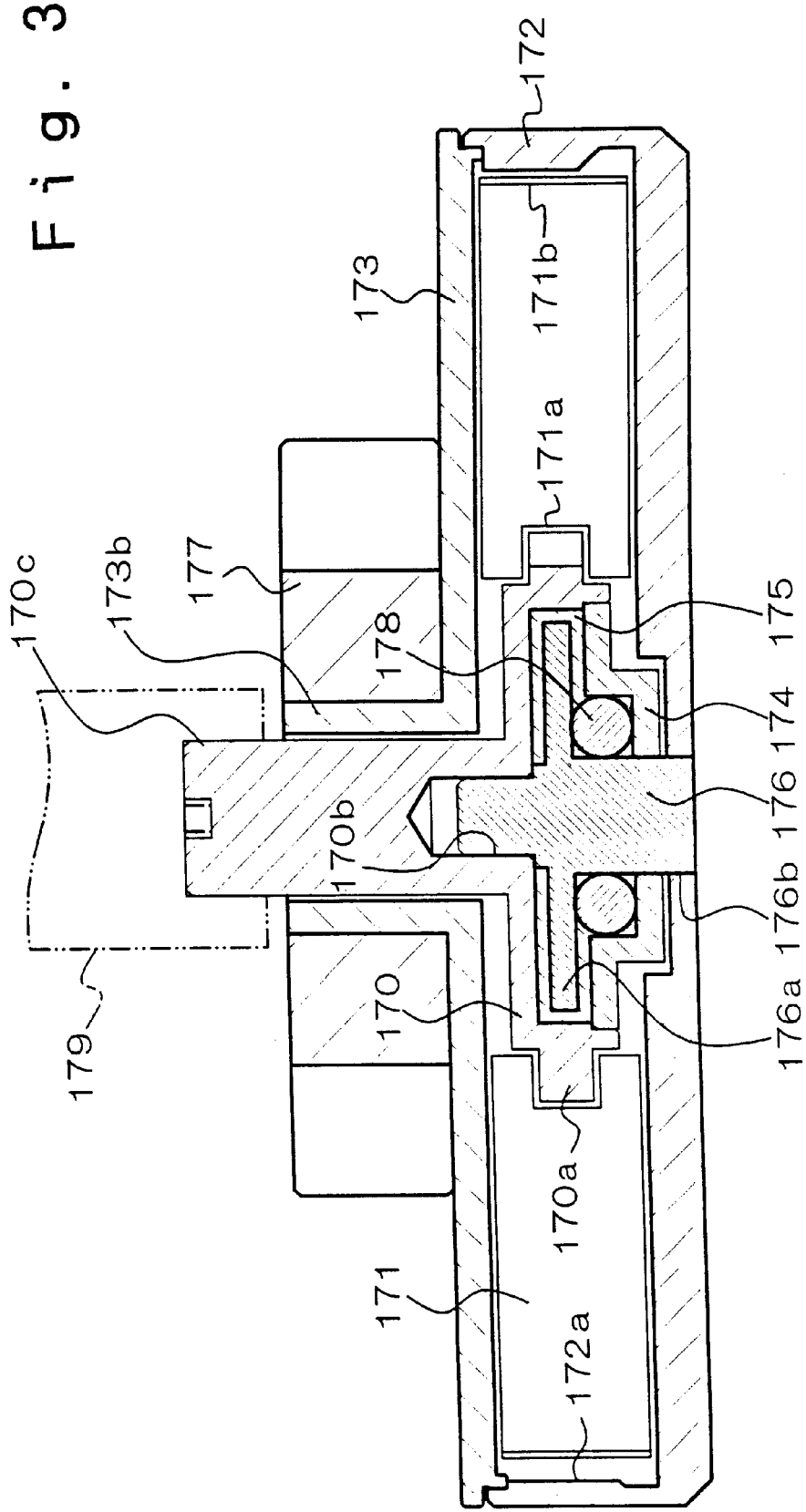
FIG. 31 is a longitudinal sectional view showing the structure of a sixteenth embodiment of the present invention.

Next, a mainspring mechanism according to a sixteenth embodiment of the present invention will be described with reference to FIG. 31. Since this embodiment includes a winding stem 170, a mainspring 171, a barrel drum 172, a braking case 174, a fluid 175, and a braking member 176 substantially similar to those in the fifteenth embodiment, descriptions thereof are omitted.

In this embodiment, a center protuberance 173b projecting upward is formed at the upper end of a barrel lid 173, and an output 177 is fixed to the center protuberance 173b while its rotation is regulated. A center protuberance 170c of the winding stem 170 is not rotationally supported by the barrel lid 173, protrudes upward from the upper surface of the gear 177, and is fixedly positioned while it is regulated in the rotating direction by a supporting member 179.

In this embodiment, since the center protuberance 170c formed at the upper end of the winding stem 170 is fixedly supported while it is regulated in the rotating direction by the supporting member 179, the barrel drum 172, the barrel lid 173, the output gear 177, and the like are rotationally driven by the driving force of the mainspring 171.

The center protuberance 173b of the barrel lid 173 and the output gear 177 in the above configuration may be omitted, and a portion projecting in a flange form may be formed on the outer periphery of the barrel drum 172, and may be provided with teeth. This reduces the thickness and the number of components, and simplifies the configuration.

In this embodiment, the output structure (output section) to which the driving force of the mainspring 171 is output is formed of the member connected to the outer end of the mainspring 171, such as the barrel drum 172 and the barrel lid 173, in a manner different from that of the fifteenth embodiment. This can extend the range of choices of fixing jigs, and can simplify the fixing method.

[Seventeenth Embodiment]

Next, a mainspring mechanism according to a seventeenth embodiment of the present invention will be described with reference to FIG. 32. Since this embodiment includes a winding stem 180, a mainspring 181, a barrel drum 182, a barrel lid 183, a braking case 184, a fluid 185, a braking case lid 186, and an output gear 187 basically similar to those in the twelfth embodiment shown in FIG. 24, descriptions of such similar components are omitted.

Figure 32:
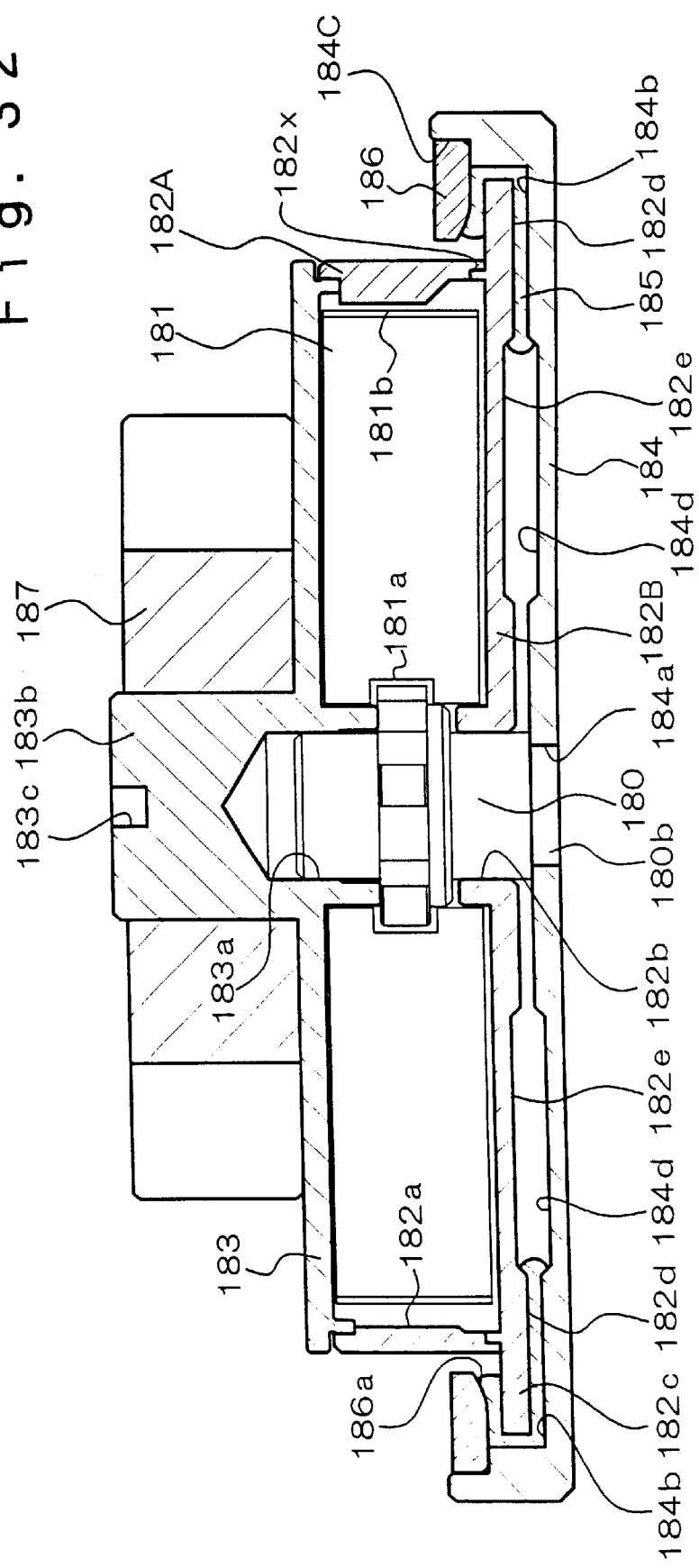
FIG. 32 is a longitudinal sectional view showing the structure of a seventeenth embodiment of the present invention.

In this embodiment, as shown in FIG. 32, the barrel drum 182 has a structure in which a peripheral case portion 182A and a bottom case portion 182B are fitted together at a fitting portion 182x. In the barrel drum 182, the peripheral case portion 182A and the bottom case portion 182B usually corotate because of a predetermined static frictional force of the fitting portion 182x. When a force greater than the static frictional force is applied therebetween, the fitting portion 182x slips, and the transmission of rotation therebetween is cut off.

According to the above-described configuration, in this embodiment, in a case in which the mainspring 181 is wound up by a rotational force to be applied to the barrel lid 183 and the output gear 187, when the rotational force excessively increases, the fitting portion 182x slips, the peripheral case portion 182A rotates to wind up the mainspring 181, but the bottom case portion 182B does not rotate. As a result, since a braking wing portion 182c also does not rotate, a braking force is not produced by the rotational resistance between the braking wing portion 182c and the fluid 185. Therefore, it is possible to prevent the driving-force storing section and the braking section from being damaged and broken due to a large load applied thereto resulting from an excessive force from the outside. The above configuration can also avoid, for example, a problem in that the viscosity of the fluid 185 is increased due to a decrease in temperature, the braking force excessively increases, and a large load is applied to the driving-force storing section and the braking section.

While the fitting portion 182x serving as the slipping portion is disposed out of contact with the fluid 185 in the above embodiment, when it is disposed in a portion in contact with the fluid 185, for example, at a location close to the braking wing portion 182c so that the slip surface is placed inside the fluid 185, the slip surface is lubricated with the fluid 185, and is cooled by the fluid 185 even when the temperature thereof increases due to the frictional force. Consequently, the slip is made smoother, and the slipping state can be stabilized.

While this embodiment is characterized in having the slip device in which the fitting portion 182x functions as the slip portion, as described above, a similar slip device is also applicable to other embodiments.

Figure 30:
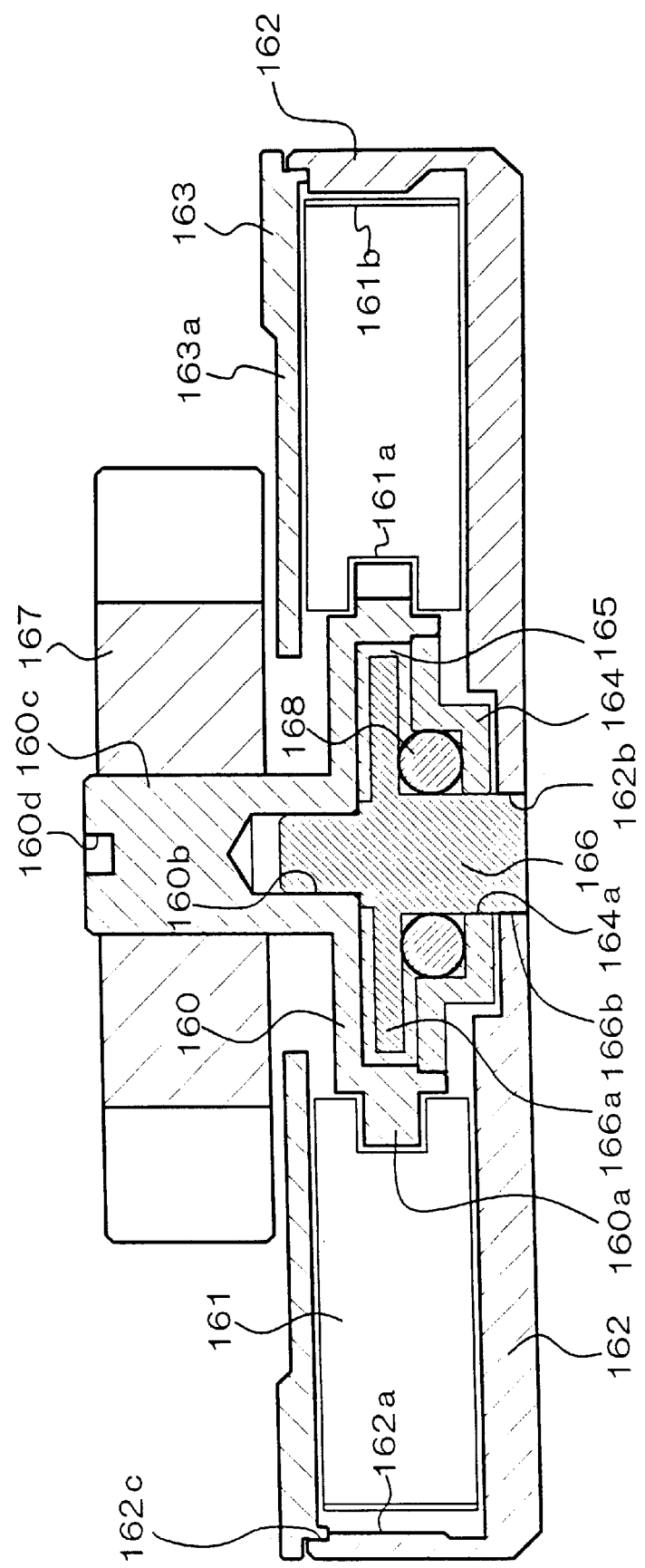
FIG. 30 is a longitudinal sectional view showing the structure of a fifteenth embodiment of the present invention.

A configuration is given as an example, which is the same as that in the fifteenth embodiment shown in FIG. 30 except that the connecting manner between the center hole 162b of the barrel drum 162 and the bottom end 166b of the braking member 166 is not regulated in the rotating direction, and that the center hole 162b and the bottom end 166b are fitted so as to slip in the rotating direction. In this case, since the barrel drum 162 and the braking member 166 are combined by the static frictional force at the fitting portion in normal operation, when the braking member 166 and the winding stem 160 rotate relative to each other, a resistance is produced between the braking wing portion 166a of the braking member 166 and the inner peripheral surface of the winding stem 160 via the fluid 165, thereby producing a braking force. However, in a case in which an excessive force is applied from the outside, or in a case in which the braking force excessively increases due to an increase in viscosity of the fluid because the temperature of the fluid is decreased with a decrease in environmental temperature when the braking section produces the braking force by using the viscosity resistance of the fluid, the barrel drum 162 and the braking member 166 slip each other, and a braking force is not produced. Therefore, it is possible to prevent the braking section and the winding stem from being damaged and broken, for example, when an excessive force is applied to the output gear 167 and the winding stem 160 from the outside or when the braking force is excessively increased due to a decrease in temperature.

[Eighteenth Embodiment]

Next, an eighteenth embodiment of the present invention will be described with reference to FIGS. 33 and 34. Since this embodiment includes a winding stem 190, a mainspring 191, a barrel lid 193, a braking case 194, a fluid 195, an output gear 197, and a gasket 198 similar to those in the sixteenth embodiment, descriptions thereof are omitted.

Figure 33:
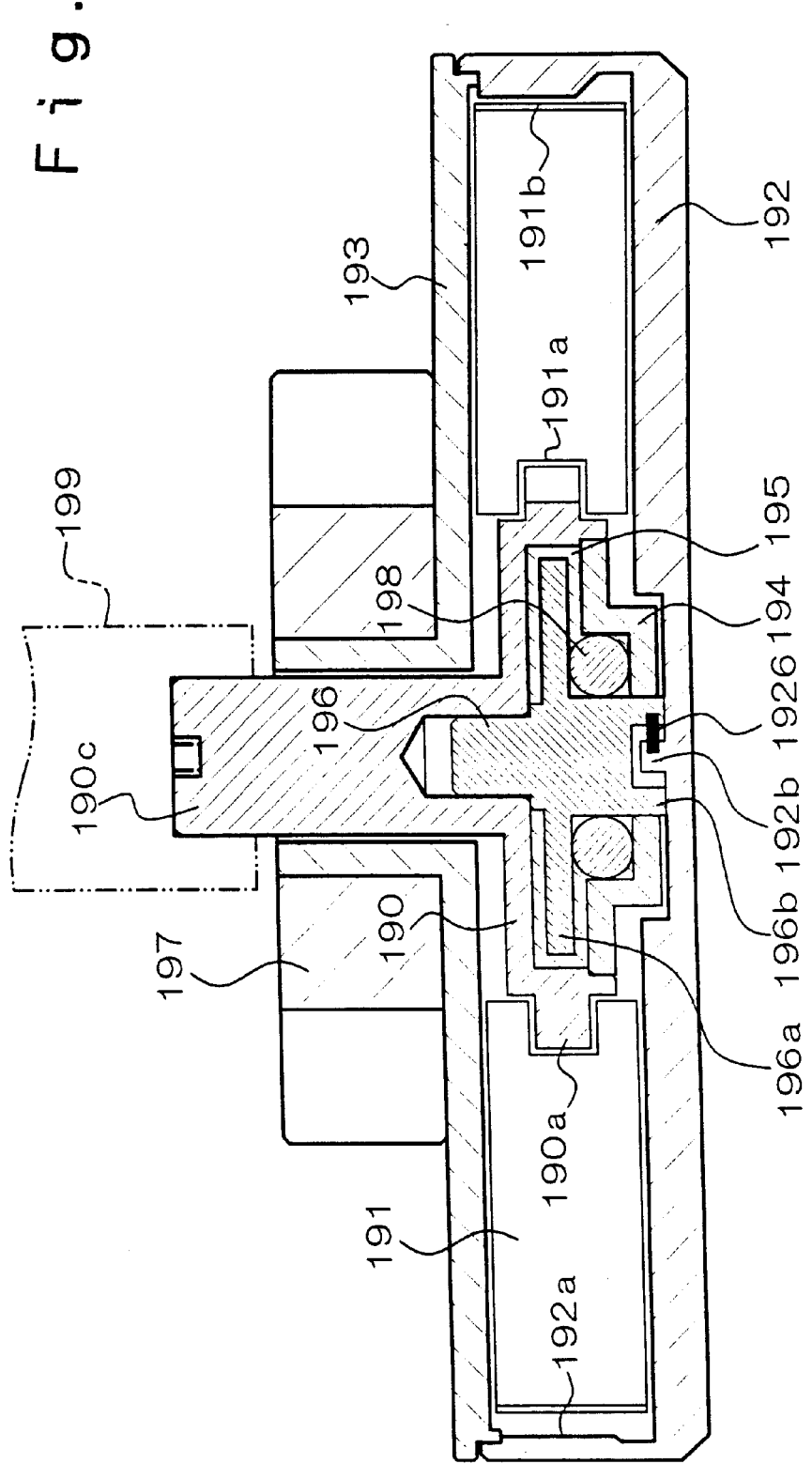
FIG. 33 is a longitudinal sectional view showing the structure of an eighteenth embodiment of the present invention.

In this embodiment, as shown in FIG. 33, a projecting shaft 192b projecting upward is formed at the bottom center of a barrel drum,192, and a projecting frame 196b placed around the projecting shaft 192b is formed at the lower end of a braking member 196. A clutch spring 1926 is mounted on the projecting shaft 192b, and the leading end of the clutch spring 1926 is engaged with the projecting frame 196b.

Figure 34:
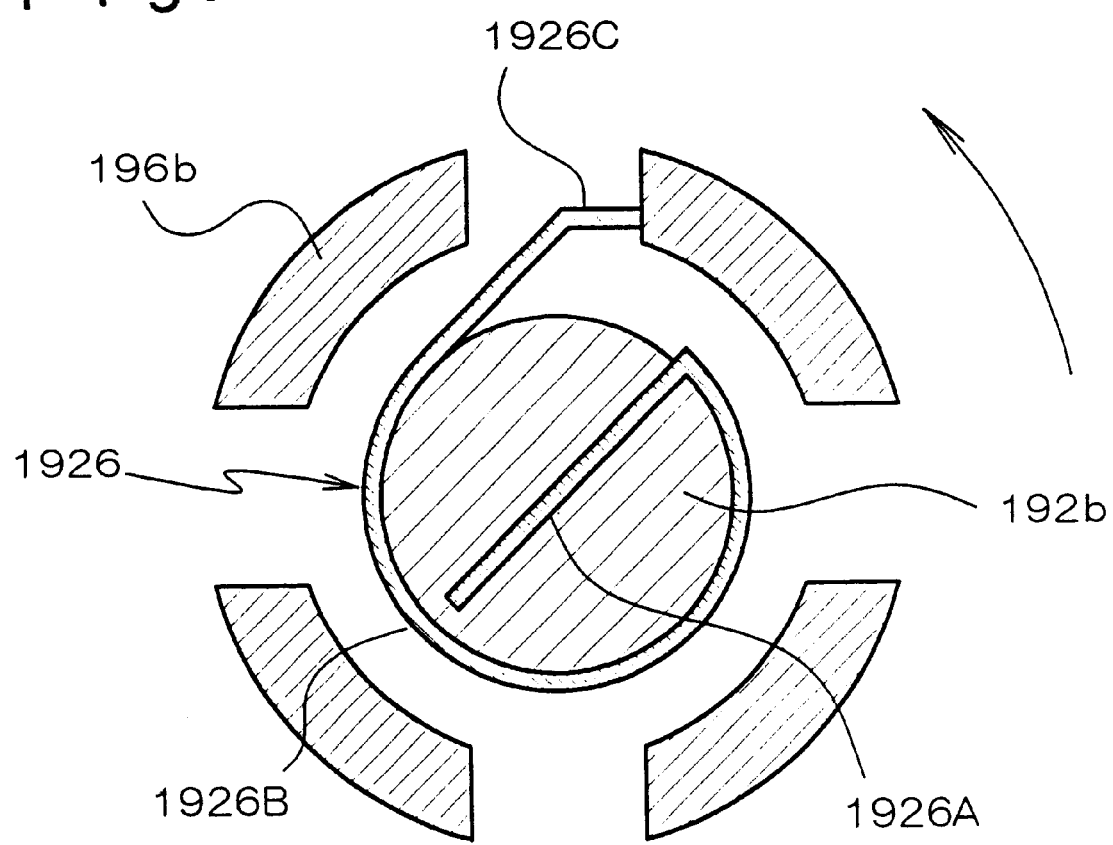
FIG. 34 is a transverse sectional view showing the structure of a rotation intermitting section in the eighteenth embodiment.

FIG. 34 is a transverse sectional view showing the structure of an engaging portion between the barrel drum 192 and the braking member 196. An inner end portion 1926A of the clutch spring 1926 is fixedly inserted in the projecting shaft 192b. The clutch spring 1926 has a curved portion 1926B which is bent from the inner end portion 1926A so as to surround the projecting shaft 192b. An outer end portion 1926C is formed at the leading end of the curved portion 1926B so that it projects away from the projecting shaft 192b to be engaged with the projecting frame 196b.

The barrel drum 192 having the projecting shaft 192b shown in FIG. 33 is rotatable counterclockwise in the figure (in the direction shown by the arrow in FIG. 34) relative to the braking member 196 having the projecting frame 196b. When the barrel drum 192 attempts to rotate clockwise in the figure, since the outer end portion 1926C of the clutch spring 1926 engages with the projecting frame 196b, the barrel drum 192 and the braking member 196 engage with each other in the rotating direction and rotate together.

As described above, in this embodiment, the projection shaft 192b, the projecting frame 196b, and the clutch spring 1926 constitute a one-way clutch serving as the rotation intermitting device in which the barrel drum 192 functions as a slip portion and does not transmit the rotation when being rotated in one direction, and is linked to the braking member 196 in the rotating direction so as to transmit the rotation to the braking member 196 when being rotated in the other direction.

In this embodiment, the mainspring 191 is wound up when the barrel drum 192 rotates in the one direction, and the barrel drum 192 is rotated in the other direction by the elasticity of the wound mainspring 191.

In this embodiment, when the barrel drum 192 is rotated in one direction via the output gear 197 and the barrel lid 193, the rotation is transmitted between the barrel drum 192 and the braking member 196. Therefore, the barrel drum 192 can wind up the mainspring 191 without receiving any braking torque.

In contrast, when the barrel drum 192 is rotated by the wound mainspring 191, the barrel drum 192 and the braking member 196 are connected in the rotating direction via the clutch spring 1926. Therefore, the barrel drum 192 slowly rotates while receiving a braking torque from the braking member 196.

Since this embodiment operates as described above, even when the mainspring 191 receives an excessive driving torque when being wound up, the internal mechanism can be prevented from being damaged and broken because the barrel drum 192 does not receive any braking torque. Furthermore, even when the viscosity of the fluid increases due to a decrease in temperature, the probability of damage and breakage of the internal mechanism will not increase, and the mainspring 191 can be easily wound up, regardless of the viscosity of the fluid.

In addition, this embodiment also provides the advantage that a compact driving device can be achieved since the rotation transmitting device including the clutch spring 1926 has a simple structure with the clutch spring positioned between the driving-force storing section constituted by the mainspring 191 and the barrel drum 192 and the braking section (formed inside the winding stem 190) including the braking member 196.

[Nineteenth Embodiment]

Figure 35:
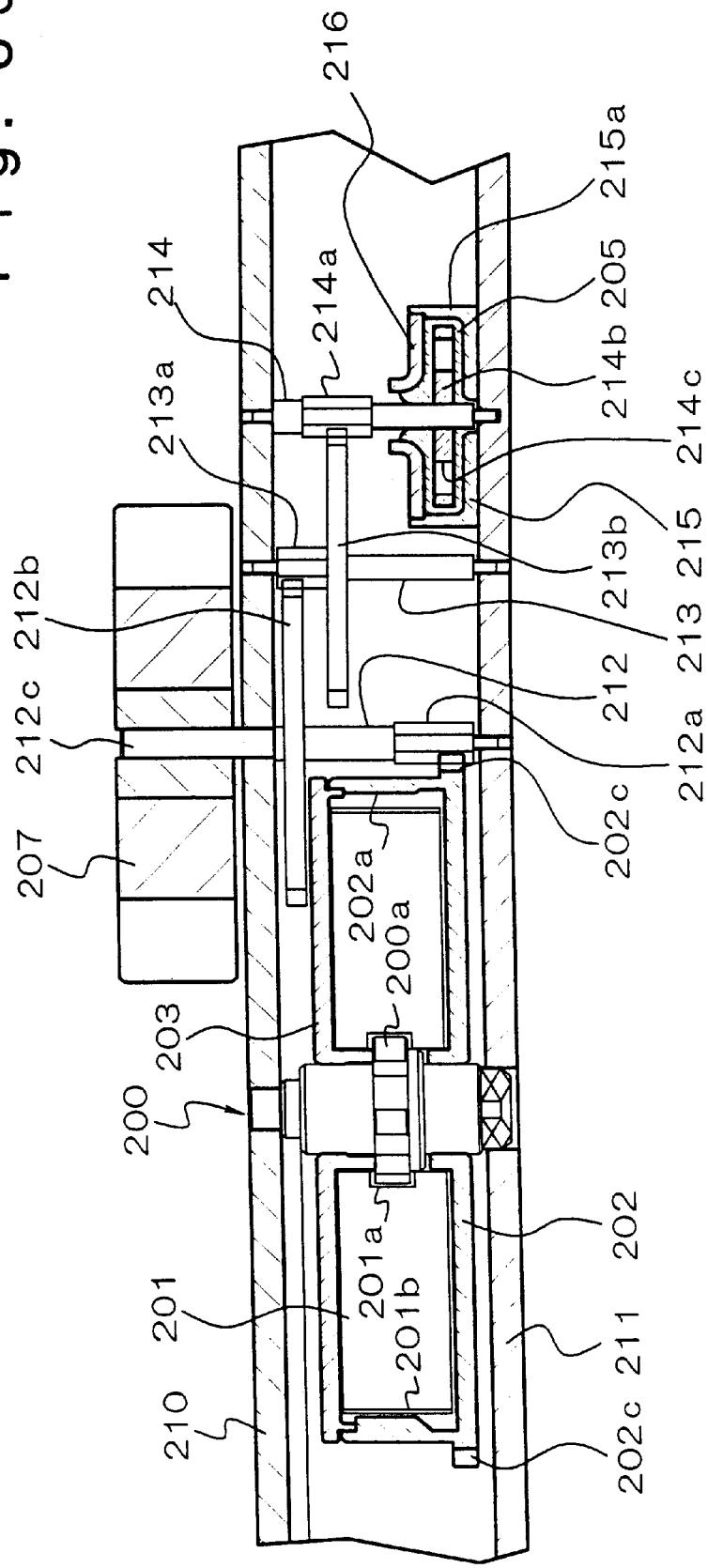
FIG. 35 is a longitudinal sectional view showing the structure of a nineteenth embodiment of the present invention.
Figure 36:
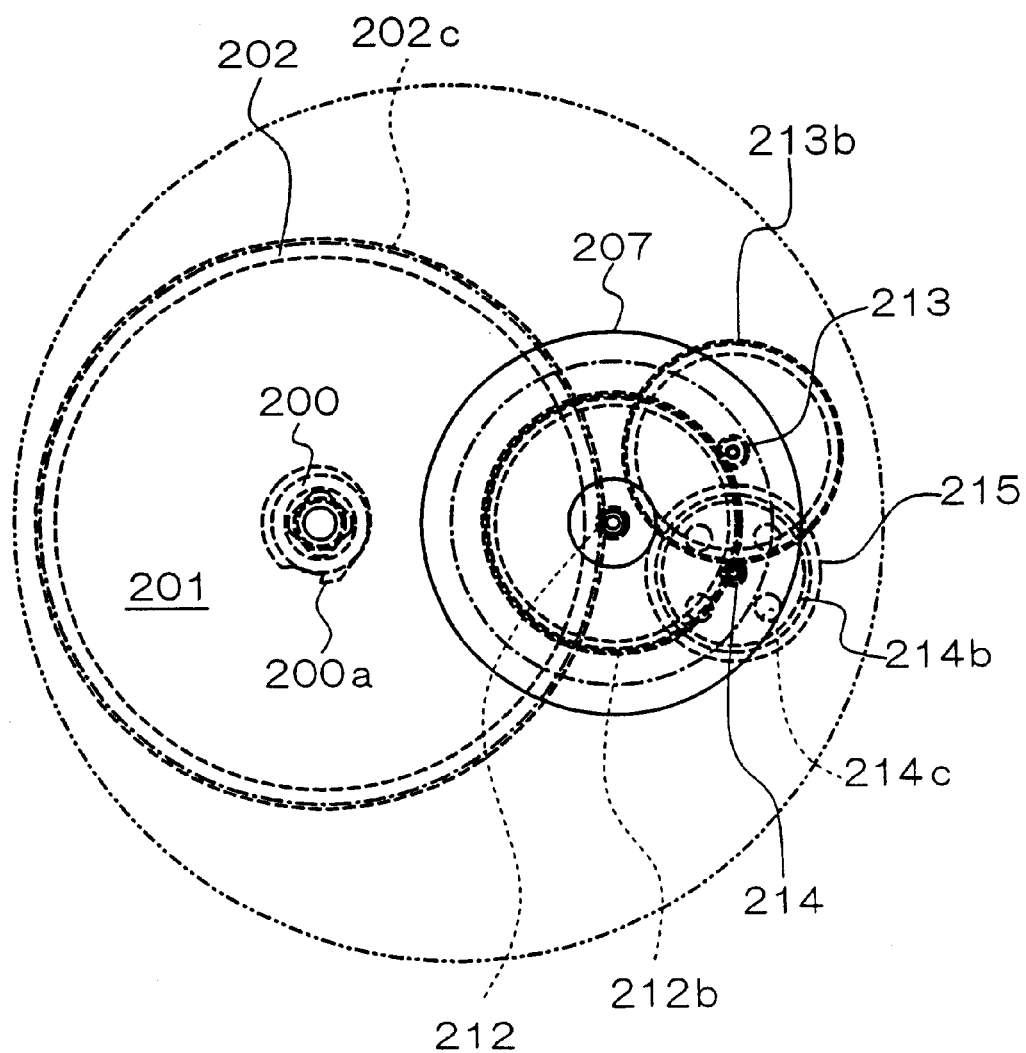
FIG. 36 is a plan layout view of the nineteenth embodiment.

Next, a nineteenth embodiment of the present invention will be described with reference to FIGS. 35 and 36. FIG. 35 is a longitudinal sectional view of this embodiment, and FIG. 36 is a plan layout view of this embodiment.

This embodiment has a driving-force storing section including a mainspring 201, a barrel drum (mainspring case) 202 having an outer-end mounting portion 202a fixedly engaged with an outer end 201b of the mainspring 201, and a barrel lid 203 fixedly fitted in the barrel drum 202. This embodiment also has a winding stem 200 serving as the rotating member having an inner-end mounting portion 200a fixedly attached to an inner end 201a of the mainspring 201. The winding stem 200 is sandwiched between a train wheel bridge 210 and a main plate 211, and is fixed while it is regulated in the rotating direction.

The barrel lid 203 is a lid which prevents the mainspring 201 from being exposed and prevents dust or the like from entering. A gear portion 202c having teeth on a flange-shaped portion is formed on the outer periphery of the barrel drum 202 serving as the mainspring case, and power is transmitted to a pinion 212a of a second gear 212 by the gear portion 202c. The power transmitted to the second gear 212 is transmitted to a gear 212b, and to a pinion 213a of a third gear 213. The power transmitted to the third gear 213 is transmitted to a gear 213b, and to a pinion 214a of a fourth gear 214 serving as the braking 70 member. A braking wing portion 214b is formed at the bottom of the fourth gear 214, and a braking case 215 is placed so as to surround the braking wing portion 214b. A braking case lid 216 is fixedly press-fitted in the top of an outer peripheral portion 215a of the braking case 215. The braking wing portion 214b has a plurality of openings 214c. The space between the braking case 215 and the braking case lid 216 is filled with a fluid 205 such as oil. The braking wing portion 214b of the fourth gear 214 receives a predetermined rotational resistance resulting from the viscosity resistance to the fluid 205.

By forming the openings 214c in the braking wing portion 214b, the braking wing portion 214b can be more easily soaked into the fluid 205, during the production process, and the rotational resistance produced between the braking wing portion 214b and the fluid 205 can be increased.

The center portion of the braking case lid 216 is curved upward, and extends upward at a small distance from the shaft portion of the fourth gear 214. Since the fluid 205 is held in a holding space defined by the braking case 215 and the braking case lid 216 by its surface tension, it will not leak upward through the gap between the braking case lid 216 and the fourth gear 214. Instead of thus using the surface tension of the fluid 205, the fluid 205 may be sealed by placing a sealing member, such as a gasket, between the braking case lid 216 and the fourth gear 214.

The above-described second gear 212 has an extended shaft 212c protruding upward from the train wheel bridge 210, and a gear 207 is fixed to the extended shaft 212c while its rotation is regulated. The gear 207 is used as an input-output device which transmits a rotational force applied from the outside to the second gear 212 so as to wind up the mainspring 201 via the barrel drum 202, and conversely, which receives from the second gear 212 a rotational driving force output from the mainspring 201, and outputs the force to the outside.

The fluid 205, the braking wing portion 214b, the braking case 215, and the braking case lid 216 constitute a braking section, and the rotational resistance of the braking wing portion 214b in the fluid 205 serves as a braking force. The braking force acts to prevent the components from being rotated by the rotational driving force output from the mainspring 201 and the rotational driving force applied from the outside via the gear 207. In such a configuration, while the rotational driving force output from the wound mainspring 201 is transmitted to the second gear 212 so as to rotate the second gear 212, the speed of the rotation is reduced by the braking force transmitted from the braking section via the fourth gear 214 and the third gear 213, and the force is output from the gear 207 connected to the second gear 212.

In this embodiment, since the second gear 212, the third gear 213, and the fourth gear 214 constitute a speed-increasing gear train so as to serve as the power transmitting device, the rotation by the rotational driving force of the mainspring 201 is transmitted to the braking section with its speed increased. Therefore, the braking wing portion 214b rotates at a higher speed than that of the barrel drum 202. Since the rotational resistance received by the braking wing portion 214b is increased in proportion to the square of the speed, a large braking force can be applied to the mainspring 201. Accordingly, a sufficient braking force can be ensured even when the braking section is made compact or even when the amount of the fluid 205 is small.

In this embodiment, since the braking force is increased by the speed-increasing gear train, as described above, the braking section can be made compact, and the size and thickness of the mainspring mechanism can be reduced easily. Since the driving-force storing section and the braking section are connected via the power transmitting device including the second gear 212, the third gear 213, and the fourth gear 214, they can be placed so that they do not overlap in two dimensions, as shown in the figure. As a result, the thickness can be substantially reduced, compared with the conventional structure in which the driving-force storing section and the braking section are stacked in the axial direction. Moreover, it is possible to easily perform assembly operation while adjusting the braking force.

In the present invention, the braking force may be adjusted by satin-finishing (roughening) the surface of the braking case in contact with the fluid.

[Twentieth Embodiment]

Figure 37:
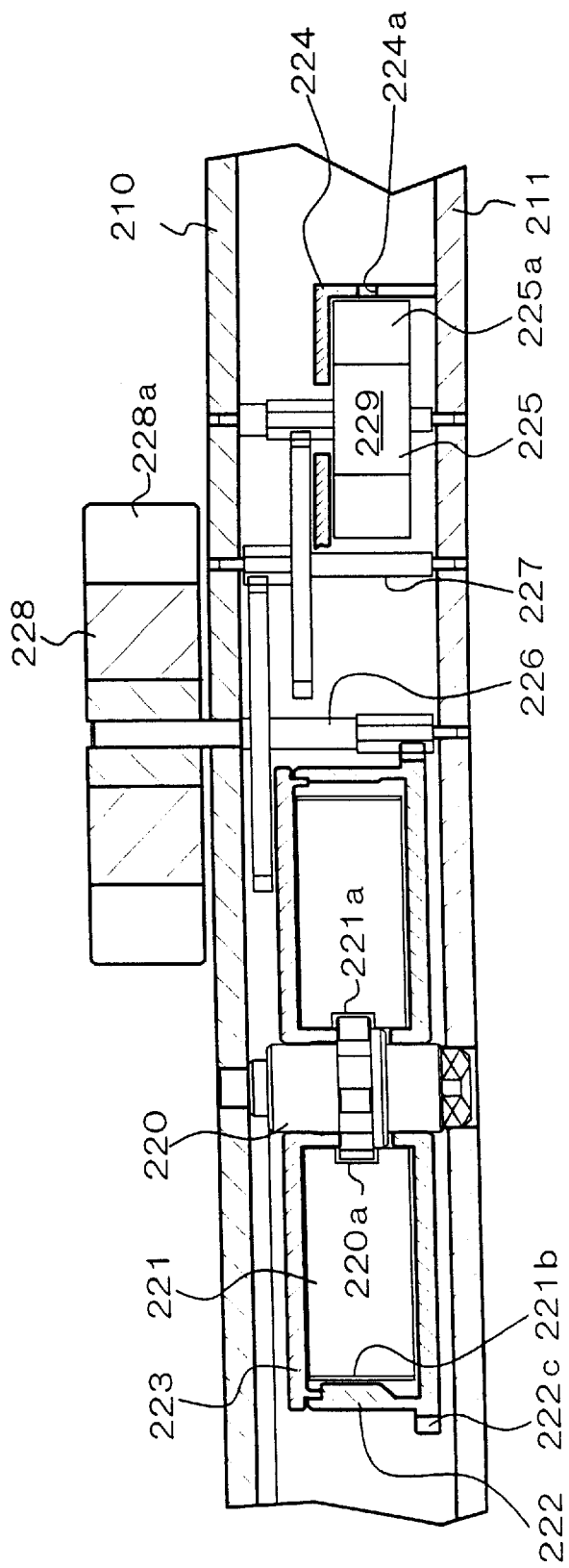
FIG. 37 is a longitudinal sectional view showing the structure of a twentieth embodiment of the present invention.
Figure 38:
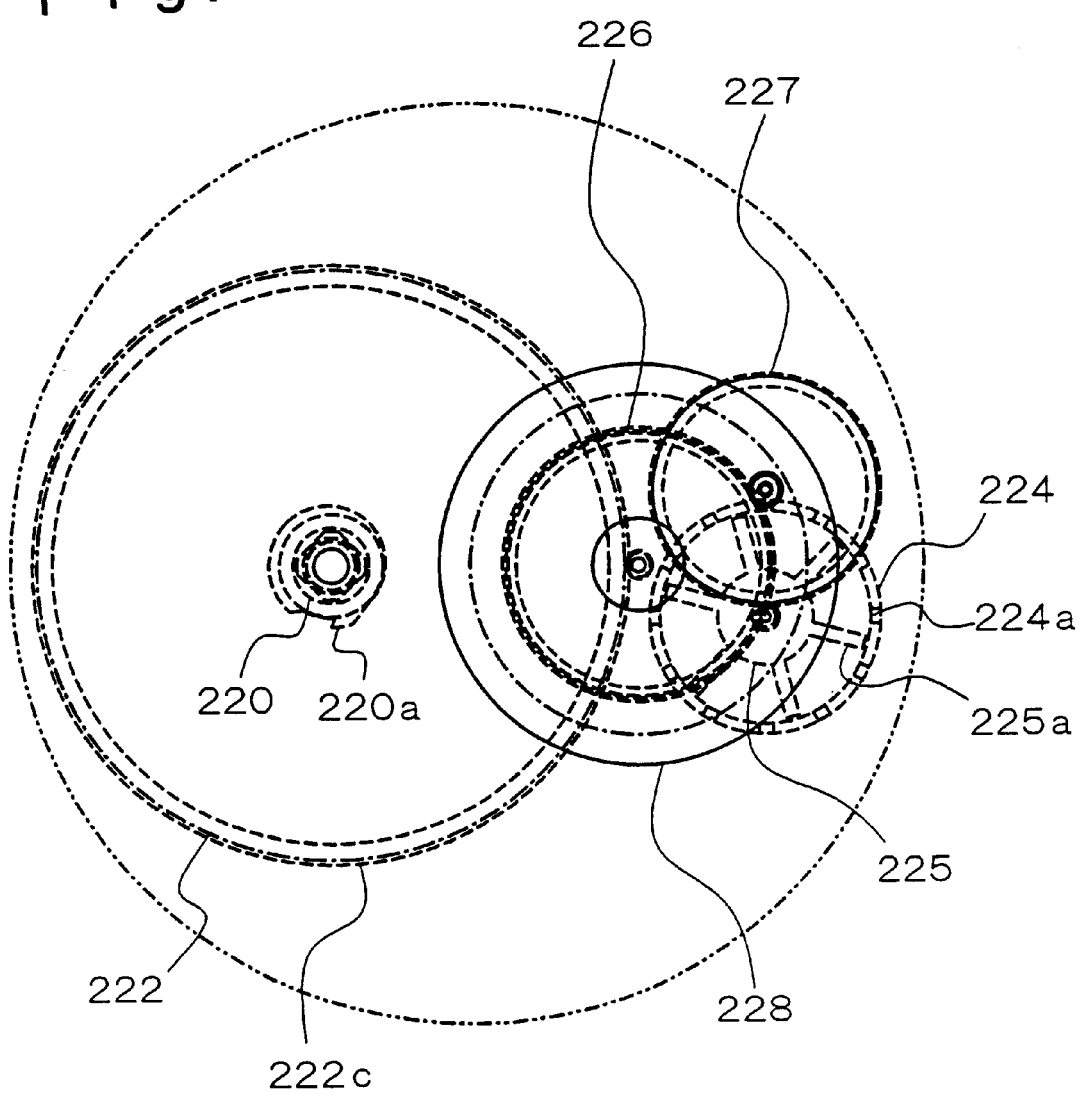
FIG. 38 is a plan layout view of the twentieth embodiment.

Next, a twentieth embodiment of the present invention will be described with reference to FIGS. 37 and 38. This embodiment includes a winding stem 220, a mainspring 221, a barrel drum 222, and a barrel lid 223 substantially similar to those in the above embodiments. An inner end 221a of the mainspring 221 is connected to a mounting portion 220a of the winding stem 220, and an outer end 221b of the mainspring 221 is connected to the barrel drum 222. The winding stem 220 is fixed while its rotation is regulated in the rotating direction by a train wheel bridge 210 and a main plate 211, and the barrel drum 222 and the barrel lid 223 are supported rotatably relative to the winding stem 220. A gear portion 222c is formed on the outer periphery of the barrel drum 222, and is meshed with a pinion of a second gear 226. A shaft portion of the second gear 226 protrudes outside through the train wheel bridge 210, and is fixedly mounted to an output gear 228 having teeth 228a. A gear portion of the second gear 226 is meshed with pinion of a third gear 227, and a gear portion of the third gear 227 is meshed with a pinion of a braking member 225. All of the second gear 226, the third gear 227, and the braking member 225 are rotatably supported by the train wheel bridge 210 and the main plate 211.

The braking member 225 has a plurality of braking wing portions 225a on the outer periphery. The braking member 225 is placed in a gas (for example, air) 229, and an air-current suppressing wall 224 is placed so as to surround the braking member 225. The air-current suppressing wall 224 has an arc-shaped or cylindrical portion for surrounding the braking member 225, and a planar portion placed adjacent to the braking wing portions 225a of the braking member 225 in the axial direction. The air-current suppressing wall 224 has one or more openings 224a.

In this embodiment, the mainspring 221 is connected to the braking member 225 having the braking wing portions 225a via the gear train in the rotating direction, and a braking force is produced by a gaseous resistance generated by the rotation of the braking member 225 in the gas 229 like a windmill. In this embodiment, since the driving force of the mainspring 221 is transmitted to the braking member 225 with the speed thereof increased, the mainspring 221 can be satisfactorily braked even when the braking force itself of the braking member 225 is somewhat weak.

In this case, the air-current suppressing wall 224 serves to prevent an air current produced by the rotation of the braking member 225 from diffusing around, and to increase the rotational resistance of the braking member 225, that is, the braking force. The air-current suppressing wall 224 has one or more openings 224a, and the rotational resistance of the braking member 225 is adjusted in accordance with the number, shape, and area of the openings 224a.

It is preferable to provide a distance adjusting device which can change the distance between the braking member 225 and the air-current suppressing wall 224 placed therearound. The braking force can be adjusted by the distance adjusting device. The distance adjusting device includes, for example, a plurality of mounting grooves formed on the main plate in which the bottom of the air-current suppressing wall 224 is fitted.

According to this embodiment, since it is unnecessary to adjust the amount of the fluid and to prevent the fluid from leaking, as in the above-described embodiments, the configuration is simplified, and assembly operation is facilitated. While the braking force varies with changes in viscosity of the fluid due to temperature changes in the above-described embodiments, this embodiment can reduce such variations in braking force due to changes in temperature.

[Twenty-first Embodiment]

Figure 39:
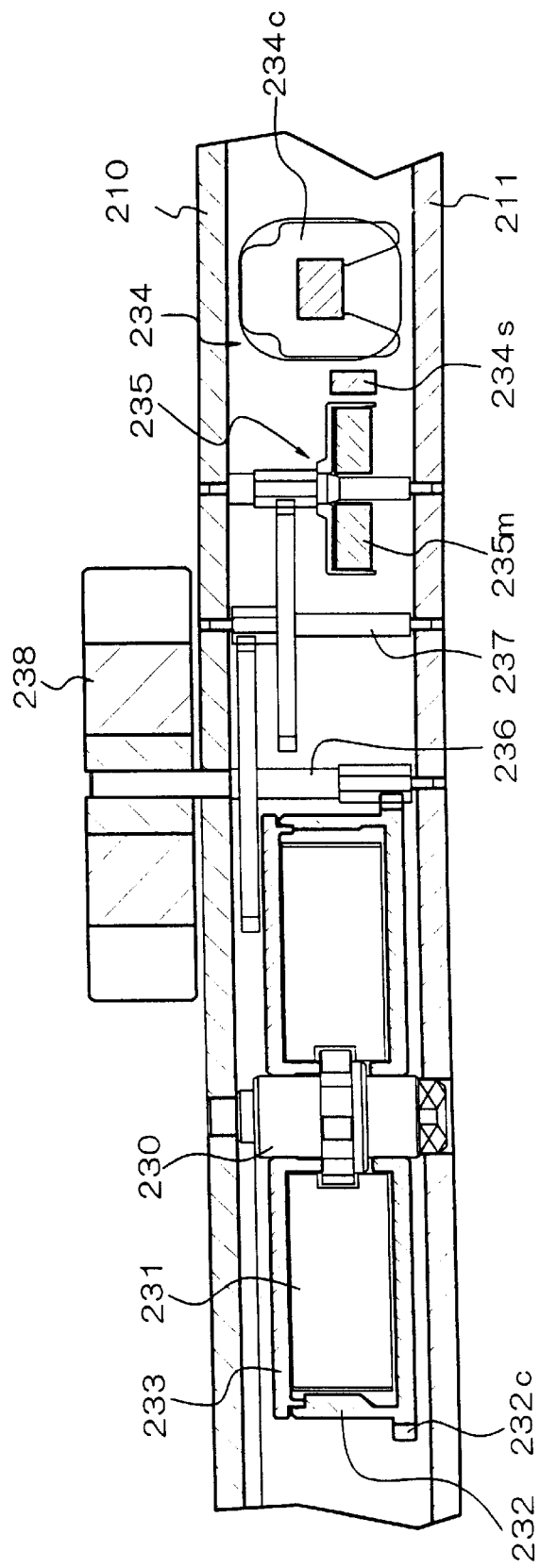
FIG. 39 is a longitudinal sectional view showing the structure of a twenty-first embodiment of the present invention.
Figure 40:
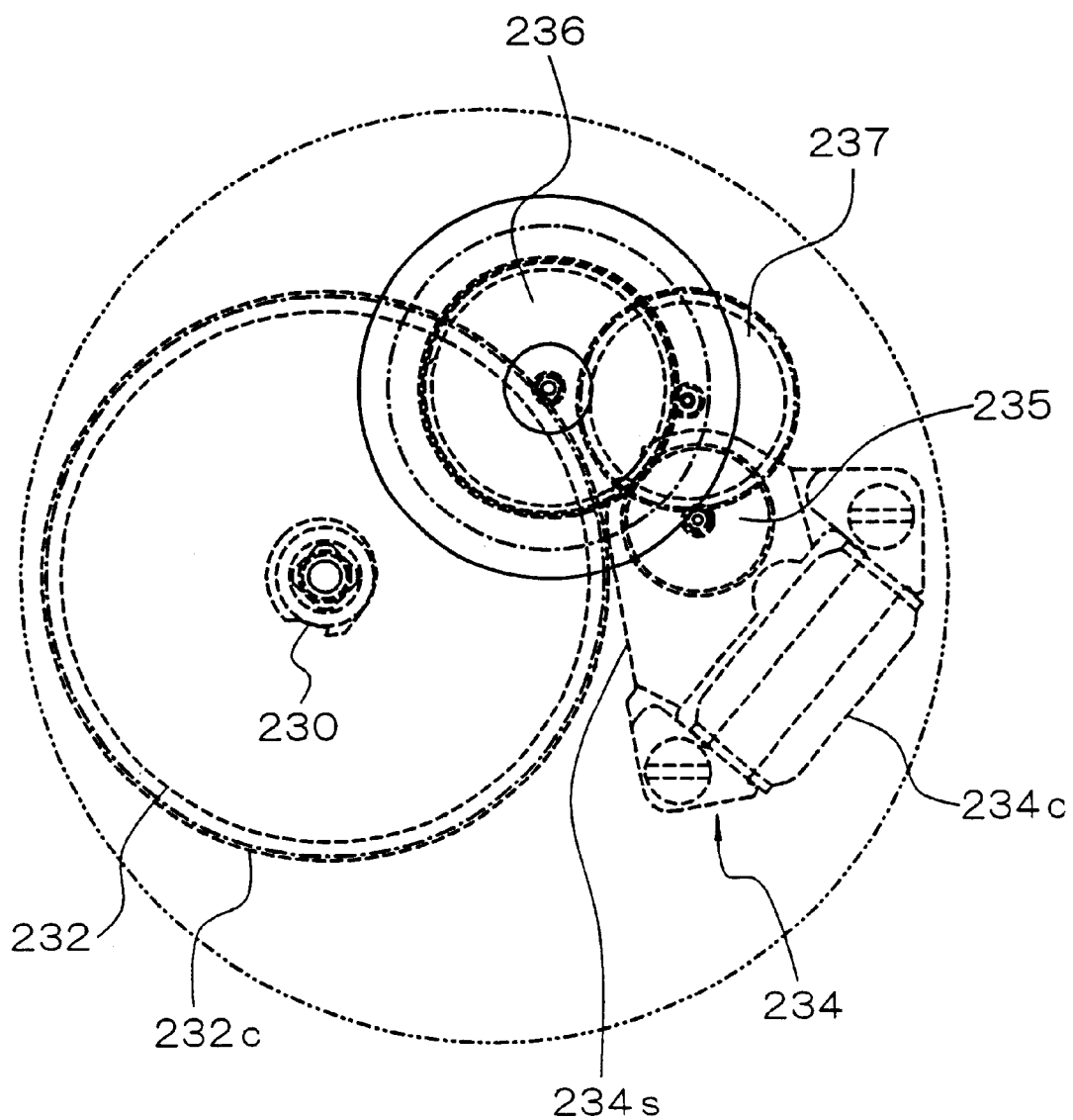
FIG. 40 is a plan view of the twenty-first embodiment of the present invention.

Next, a twenty-first embodiment of the present invention will be described with reference to FIGS. 39 and 40. Since this embodiment includes a winding stem 230, a mainspring 231, a barrel drum 232, a barrel lid 233, a second gear 236, a third gear 237, and an output gear 238 similar to those in the twentieth embodiment, descriptions thereof are omitted.

In this embodiment, a braking member 235 connected to the third gear 237 has a permanent magnet 235m magnetized so as to have different poles in the rotating direction. A stator 234c made of a high-permeability material (soft magnetic material) is placed around the braking member 235, and an electromagnetic induction member 234 having the stator 234s and a coil 234c including a core member connected to the stator 234s is provided. An electrical load (for example, an electrical resistor or a timepiece circuit) having an appropriate impedance is connected to the coil 234c.

In this embodiment, when the braking member 235 rotates, an induced electromotive force is generated in the coil 234c of the electromagnetic induction member 234, and generates an induced current in accordance with the electrical load. A rotational force corresponding to the energy to be consumed by the electrical load is applied to the braking member 235, and a braking force against the driving force of the mainspring 231 is generated.

In this embodiment, since any fluid, such as oil, is not used, assembly operation is facilitated. Moreover, it is unnecessary to finely adjust the braking force in accordance with the viscosity or amount of the fluid, and the braking force rarely varies due to changes in temperature.

In this embodiment, the braking force can be easily adjusted by a device for adjusting the electrical load, for example, a variable resistor serving as the electrical load.

Figure 41:
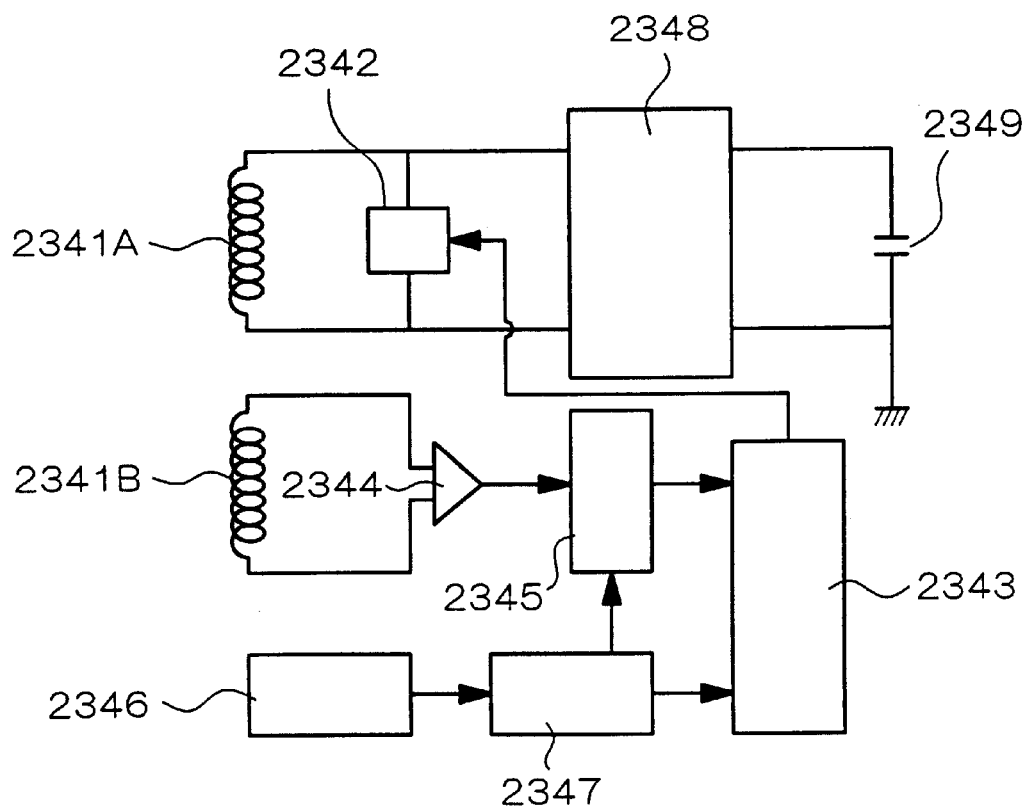
FIG. 41 is a general block diagram schematically showing a circuit configuration which is applicable to the twenty-first embodiment.

FIG. 41 shows a circuit configuration in which the electrical load is connected to the coil 234c. The coil 234c includes a main coil 2341A for power generation and braking, and a subcoil 2341B for detecting the number of revolutions of the braking member 235. A load circuit 2342 is connected to the main coil 2341A, and an output of the main coil 2341A is connected to a condenser 2349, such as a capacitor or a chemical secondary battery, via a boosting circuit 2348. The subcoil 2341B is connected to a comparator 2344, an output of the comparator 2344 is input to a synchronizing circuit 2345, and an output of the synchronizing circuit 2345 is input to a control circuit 2343. A reference signal output from a dividing circuit 2347, which operates in response to the output from an oscillating circuit 2346, is input to the synchronizing circuit 2345 and the control circuit 2343.

Figure 42:
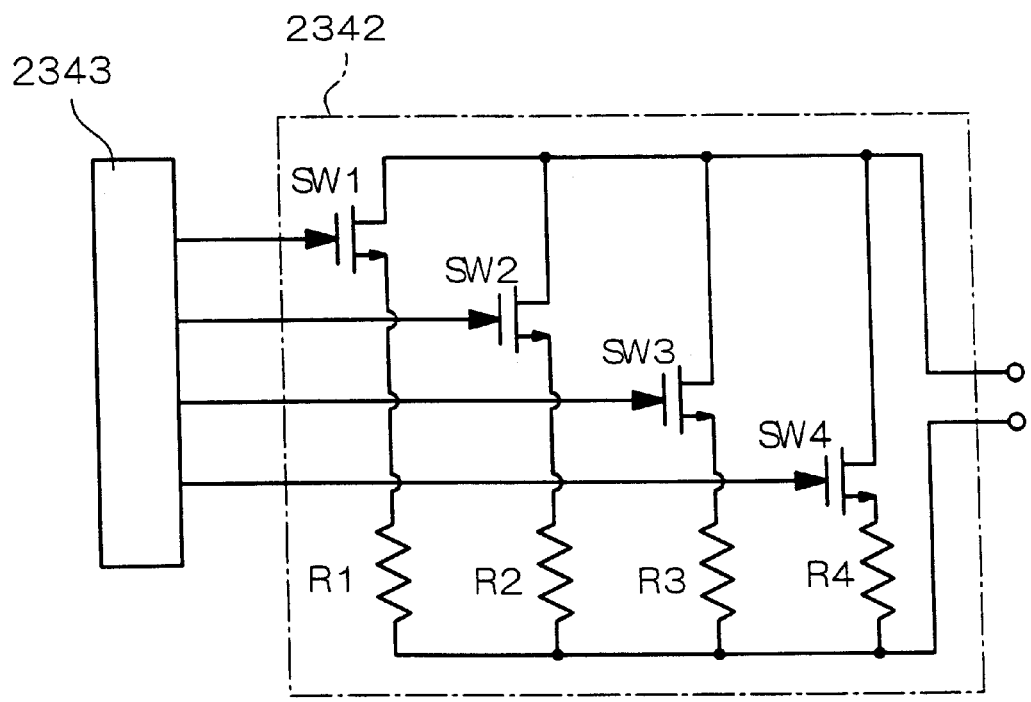
FIG. 42 is a general structural view schematically showing the configuration of a load circuit shown in FIG. 41.

The control circuit 2343 transmits a control signal to the load circuit 2342 so as to control the electrical load (impedance) of the load circuit 2342. FIG. 42 shows the general configuration of the load circuit 2342. In the load circuit 2342, a plurality of series circuits respectively including switches SW1 to SW4 made of a transistor or the like and electrical resistors R1 to R4 connected to the corresponding switches in-series are connected in parallel. By turning the switches SW1 to SW4 on and off in response to a control signal transmitted from the control circuit 2343, the total electrical load (impedance) of the load circuit 2342 can be finely changed.

Since a detection signal in synchronization with the rotating speed of the braking member 235 can be obtained from the comparator 2344 in accordance with the electromotive force generated in the subcoil 241B, the detection signal is transmitted to the control circuit 2343 in synchronization with the reference signal. The control circuit 2343 can compare the reference signal and the detection signal, and can adjust the electrical load of the load circuit 2342 based on the result of comparison. The rotating speed of the braking member 235 can be also controlled by the control circuit 2343 so as to be fixed.

[Twenty-second Embodiment]

Figure 43:
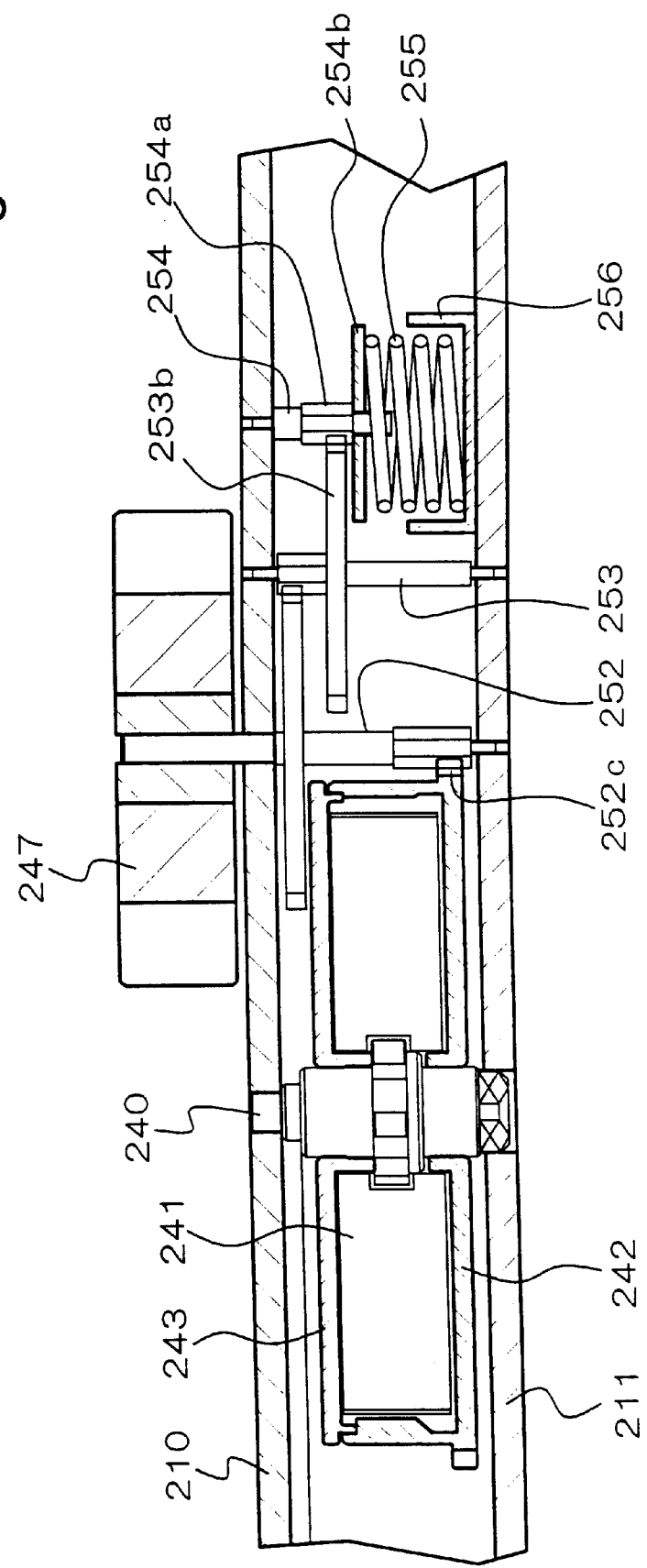
FIG. 43 is a longitudinal sectional view schematically showing the structure of a twenty-second embodiment of the present invention.

Next, a mainspring mechanism according to a twenty-second embodiment of the present invention will be described with reference to FIGS. 43 and 44. Since this embodiment includes a winding stem 240, a mainspring 241, a barrel drum 242, a barrel lid 243, a second gear 252, a third gear 253, an output gear 247, a train wheel bridge 210, and a main plate 211 similar to those in the above-described embodiments, descriptions thereof are omitted.

In this embodiment, a gear 253b of the third gear 253 is meshed with a pinion 254a of a fourth gear 254. A mounting plate 254b is formed at the bottom of the fourth gear 254 so that it is regulated with respect to the pinion 254a in the rotating direction. A coil spring 255 is fixedly mounted on the mounting plate 254b by, for example, welding. The lower end of the coil spring 255 is in sliding contact with the inner bottom surface of a holder 256 fixed on the main plate 211.

In the above configuration, the rotation produced by the rotational driving force of the mainspring 241 is sequentially transmitted to the second gear 252, the third gear 253, and the fourth gear 254 while the speed thereof is increased, and rotates the mounting plate 254b and the coil spring 255. Therefore, the lower end of the coil spring 255 and the inner bottom surface of the holder 256 slide against each other. Since a sliding resistance (frictional resistance) produced in this case serves as a braking force against the rotational driving force of the mainspring 241, the rotating speed of the output gear 247 is reduced.

Figure 44:
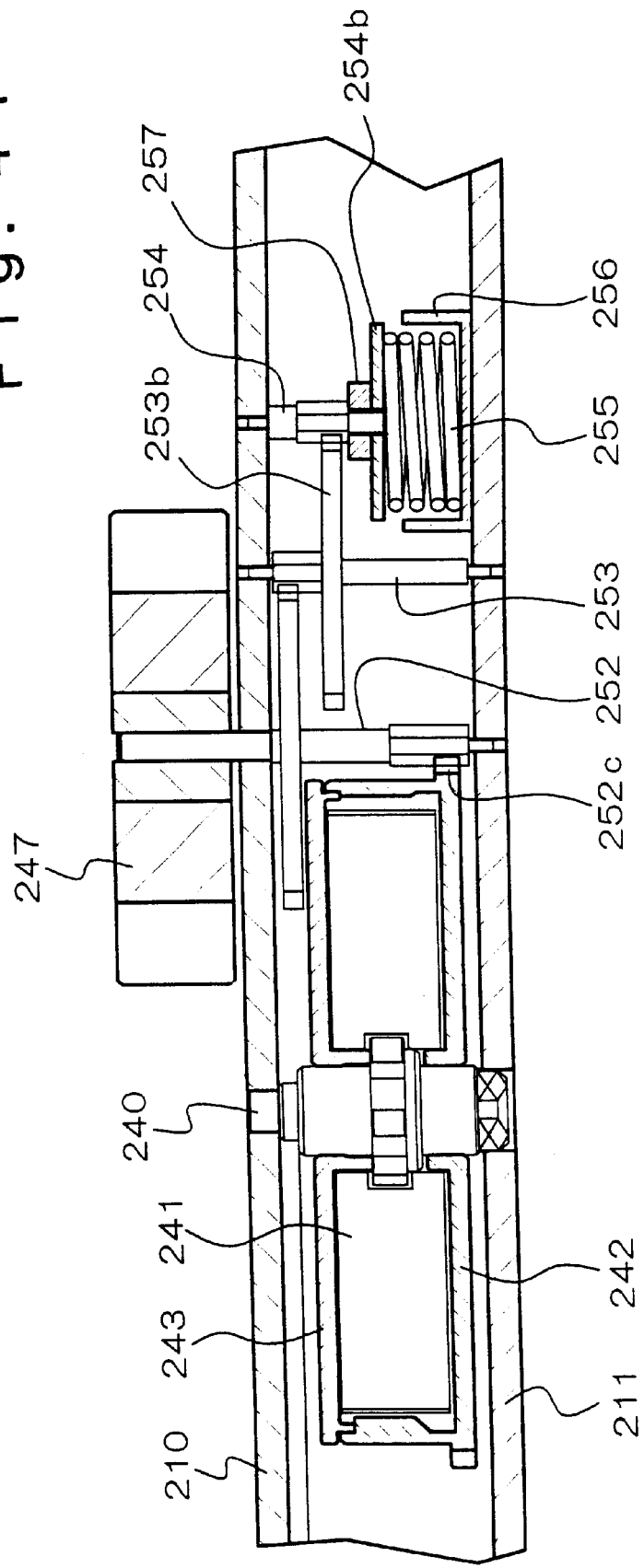
FIG. 44 is a longitudinal sectional view showing the structure of a twenty-third embodiment of the present invention.

In this embodiment, the compressed state of the coil-spring 255 can be changed by, for example, placing a spacer 257 between the pinion 254a and the mounting plate 254b, as shown in FIG. 44, thereby changing the sliding resistance (frictional resistance) between the coil spring 255 and the holder 256. While the spacer 257 for changing the position of the mounting plate 254b is used to change the compressed state of the coil spring 255 in the illustrated embodiment, the position of the mounting plate 254b may be changed by another appropriate device, such as a screwed structure.

In the embodiment, the frictional resistance may be reduced and the heat generated by the friction may be reduced by putting a liquid, such as oil or coolant, into the holder 256.

[Twenty-third Embodiment]

Figure 45:
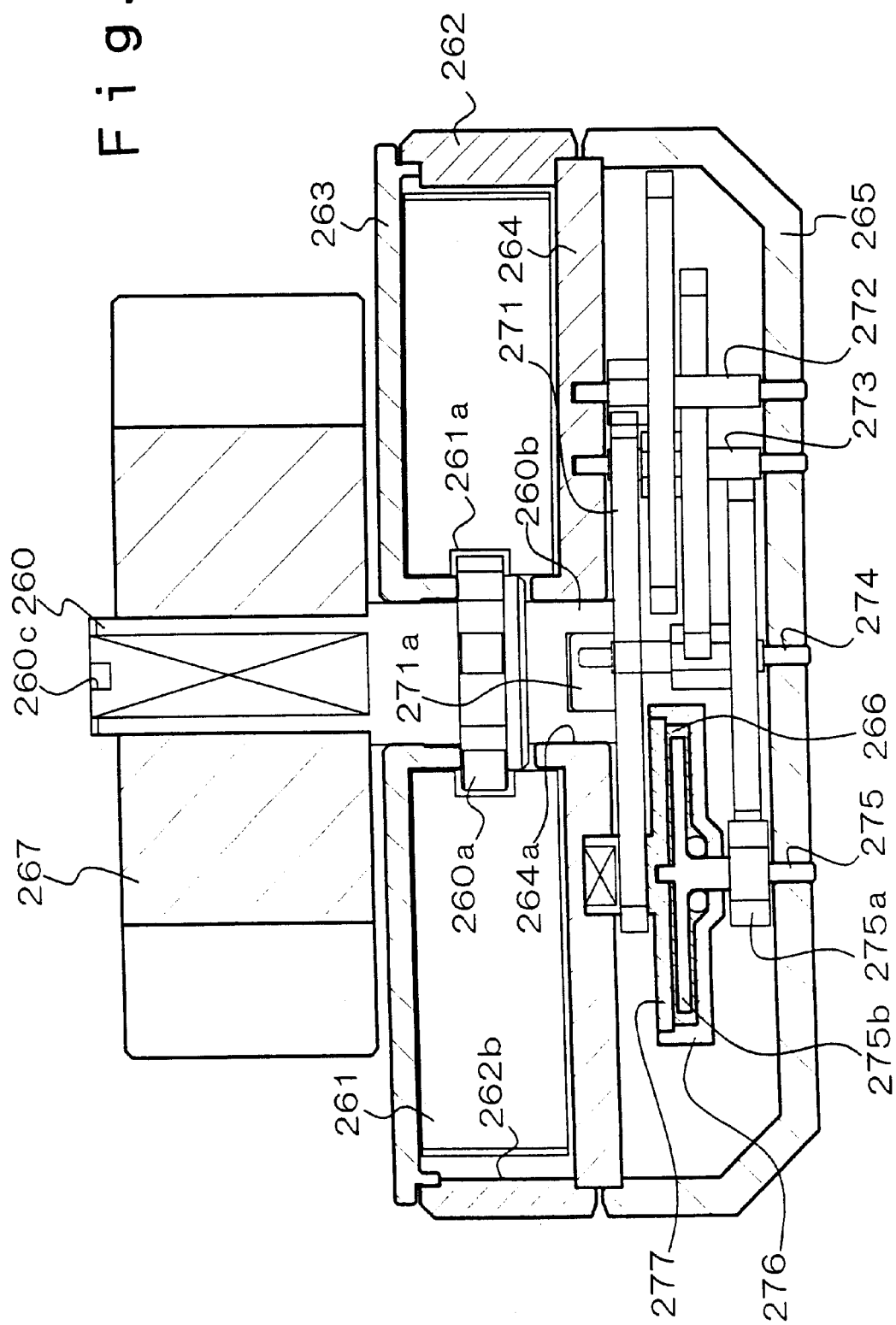
FIG. 45 is a longitudinal sectional view showing the structure of a twenty-fourth embodiment of the present invention.

Next, a mainspring mechanism according to a twenty-third embodiment of the present invention will be described with reference to FIG. 45. This embodiment includes a winding stem 260 serving as the rotating member, a mainspring 261 connected at an inner end 261a to a mounting portion 260a of the winding stem 260, a barrel drum 262 connected to an outer end 261b of the mainspring 261, a barrel lid 263 fitted in the barrel drum 262 from above, a partition plate 264 fitted in the barrel drum 262 from below, and a bottom plate 265 for rotatably supporting a gear train and a braking section between the bottom plate 265 and the partition plate 264. The winding stem 260 is rotatably supported by the barrel lid 263 and the partition plate 264.

A lower end portion 260b of the winding stem 260 is rotatably supported in a center hole 264a of the partition plate 264, and is connected to an engaging portion 271a of a connecting gear 271 so that it is regulated in the rotating direction. The upper part of the winding stem 260 is connected to a gear 267 so that it is regulated in the rotating direction. A rotating-controlling groove 260c which controls the rotation of the winding stem 260 and maintains the rotating position of the winding stem 260 by being engaged with a tool is formed at the upper end of the winding stem 260. The connecting gear 271 is meshed with a pinion of a second gear 272, a gear of the second gear 272 is meshed with a pinion of a third gear 273, a gear of the third gear 273 is meshed with a pinion of a fourth gear 274, and a gear of the fourth gear 274 is meshed with a pinion 275a of a braking shaft 275. By the transmission gear train with such a structure, the rotation of the winding stem 260 is increased in speed, and is finally transmitted to the braking shaft 275. The braking shaft 275 is provided with a braking plate 275b. The braking plate 275b is soaked in a fluid 266 which fills a braking space defined by a braking case 276 and a braking case lid 277. The braking case 276 and the braking case lid 277 are mounted on the partition plate 264 so that they are regulated in the rotating direction.

In this embodiment, the rotation of the winding stem 260 is increased in speed and is transmitted to the braking section (constituted by the braking plate 275b, the braking case 276, the braking case lid 277, the fluid 266, and the like) via the above transmission gear train. Therefore, the braking force of the braking section can be increased according to the speed increasing ratio of the transmission gear train. For this reason, a sufficient braking force can be ensured even when the braking section is made compact.

In this embodiment, since the transmission gear train and the braking section are placed so as to overlap with the driving-force storing section including the mainspring 261 in two dimensions, the planar shape is compact.

[Twenty-fourth Embodiment]

Figure 46:
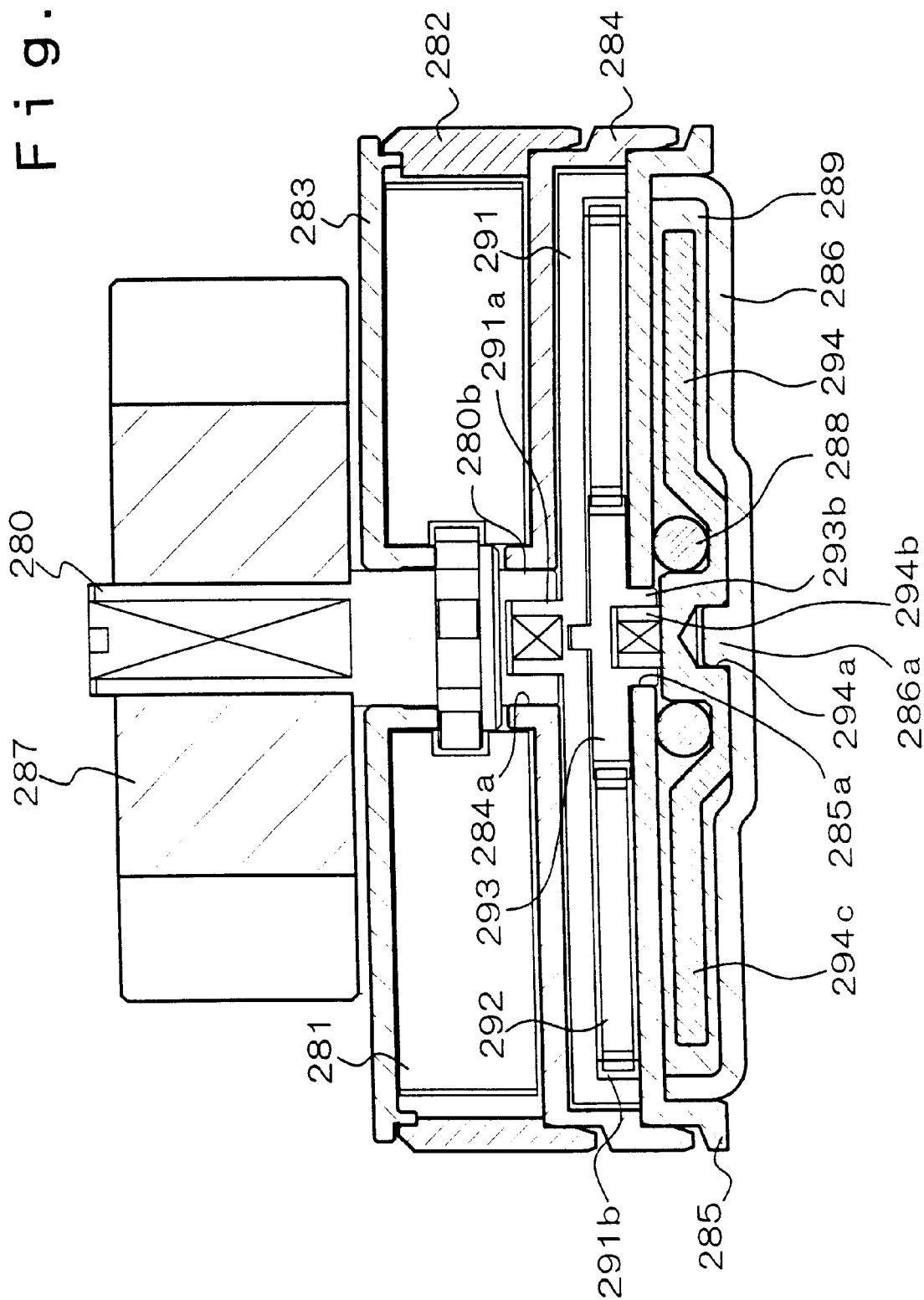
FIG. 46 is a longitudinal sectional view showing the structure of a twenty-fifth embodiment of the present invention.

Next, a mainspring mechanism according to a twenty-fourth embodiment of the present invention will be described with reference to FIG. 46. Since this embodiment includes a winding stem 280, a mainspring 281, a barrel drum 282, and an output gear 287 similar to those in the twenty-third embodiment, descriptions thereof are omitted.

In this embodiment, a gear case 284 is fixedly fitted in the barrel drum 282 from below, and a lower end portion 280b of the winding stem 280 is rotatably supported in a center hole 284a of the gear case 284. The lower end portion 280b of the winding stem 280 is connected to an engaging portion 291a of an internal gear 291 disposed inside the gear case 284 while it is regulated in the rotating direction. Inside teeth 291b of the internal gear 291 are meshed with one or more planet gears 292. The planet gear 292 is meshed with a sun gear 293 rotatably supported at the center of the internal gear 291, and an engaging portion 293b of the sun gear 293 is rotatably supported in a center hole 285a of an upper braking case 285.

The engaging portion of the sun gear 293 is connected to an engaging portion 294b of a braking plate 294 while it is regulated in the rotating direction. The braking plate 294 is placed in a fluid 289 which fills a braking space defined by the upper braking case 285 and a lower braking case 286 fixedly fitted in the upper braking case 285. A bore 294a is formed at the center of the braking plate 294, and rotatably holds an engaging projection 286a of the lower braking case 286 therein. A sealing member 288, such as a gasket, is interposed between the upper braking case 285 and the braking plate 294, and prevents the fluid 289 from leaking to the outside through the center hole 285a of the upper braking case 285.

The braking plate 294 has a braking wing portion 294c. When the braking plate 294 rotates, a viscosity resistance is produced between the braking wing portion 294c and the fluid 289, and this applies a rotational resistance to the braking plate 294. In this embodiment, when the winding stem 280 is rotated by the rotational driving force of the mainspring 281, the rotation is transmitted to the braking plate 294 via a transmission gear train constituted by the internal gear 291, the planet gear 292, and the sun gear 293. When the braking plate 294 rotates and receives the rotational resistance, the winding stem 280 receives a braking force.

In this case, if the planet gear 292 can freely revolve, the gear mechanism is loosely rotated by the revolution of the planet gear 292, the sun gear 293 and the braking plate 294 do not rotate, and therefore, the braking effect is not achieved. Accordingly, for example, by rotatably supporting the planet gear 292 at a predetermined position,in the gear case 284 or the upper braking case 285 so that the planet gear 292 is prevented from revolving, the gear train can operate in a manner similar to that of a normal speed-increasing gear train. Alternatively, the braking effect of the braking section may be achieved by limiting the revolution of the planet gear 292 by producing a frictional resistance between the planet gear 292 and the gear case 284 or the upper braking case 285.

In this embodiment, since the rotation of the winding stem 280 by the rotational driving force of the mainspring 281 is increased in speed and is transmitted to the braking plate 294 by the power transmitting device formed of the planet gear mechanism consisting of the internal gear 291, the planet gear 292 and the sum gear 293, the winding stem 280 receives a large braking force which is increased by the rotational resistance of the braking plate 294 in accordance with the speed increasing ratio, and the gear 287 is slowly driven by the braking force.

In this embodiment, the power transmitting device can be made compact and the speed increasing ratio can be increased by the structure of the planet gear mechanism. Therefore, sufficient braking force can be achieved even when the braking section is made compact or when the amount of fluid is minimal.

[Twenty-fifth Embodiment]

Figure 47:
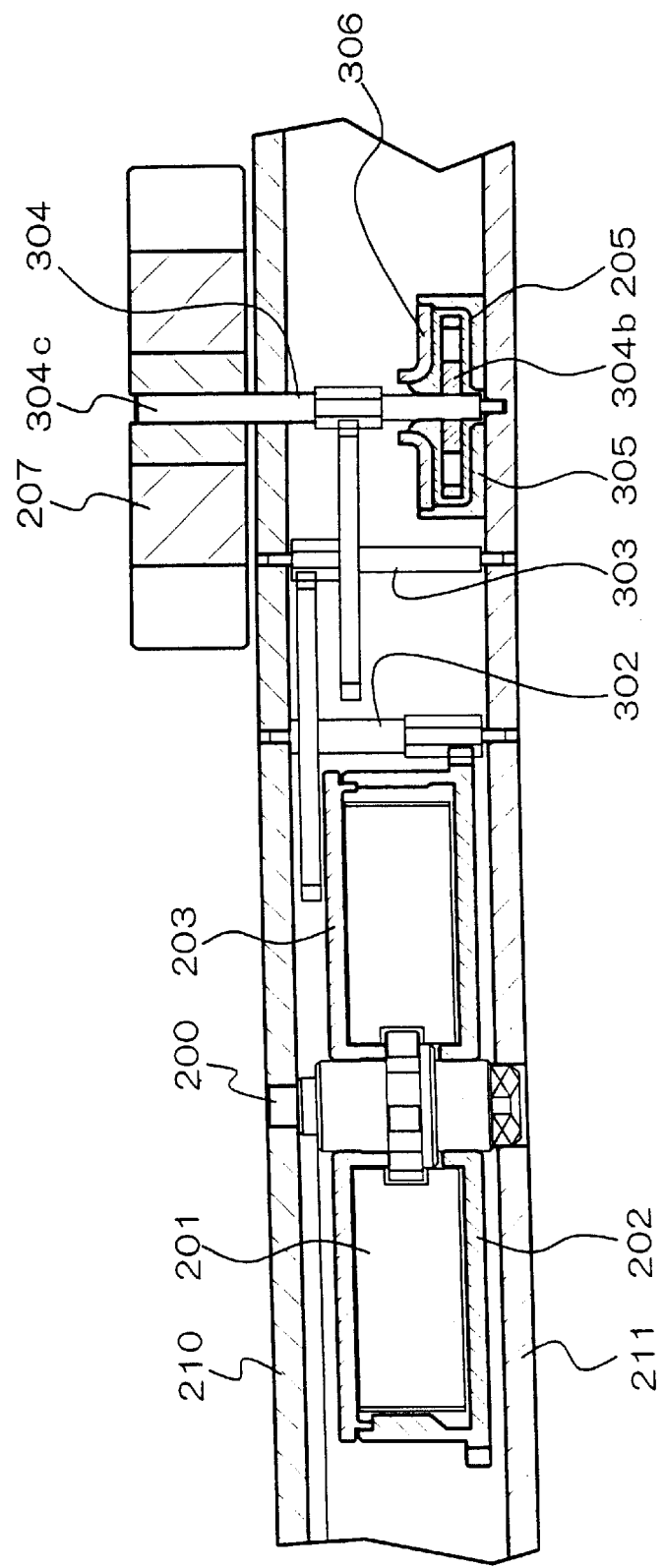
FIG. 47 is a longitudinal sectional view showing the structure of a twenty-sixth embodiment of the present invention.

Next, a mainspring mechanism according to a twenty-fifth embodiment of the present invention will be described with reference to FIG. 47. Since this embodiment includes a winding stem 200, a mainspring 201, a barrel drum 202, a barrel lid 203, a fluid 205, a gear 207, a train wheel bridge 210, a main plate 211, a second gear 302, a third gear 303, a fourth gear 304, a braking wing portion 304b, a braking case 305, and a braking case lid 306 which are basically identical to those in the nineteenth embodiment, descriptions thereof are omitted.

In this embodiment, the gear 207 is not connected to the second gear 302, but is connected to an extended shaft 304c of the fourth gear 304 while it is regulated in the rotating direction.

While the braking force against the rotational driving force of the mainspring 201 in this embodiment acts in a manner similar to that in the nineteenth embodiment, since an input-output shaft formed of the gear 207 is rotatably connected to the fourth gear 304, the driving speed can be increased. Such a configuration is suitable for a case in which high driving speed is required and the driving load is light.

[Twenty-sixth Embodiment]

Figure 48:
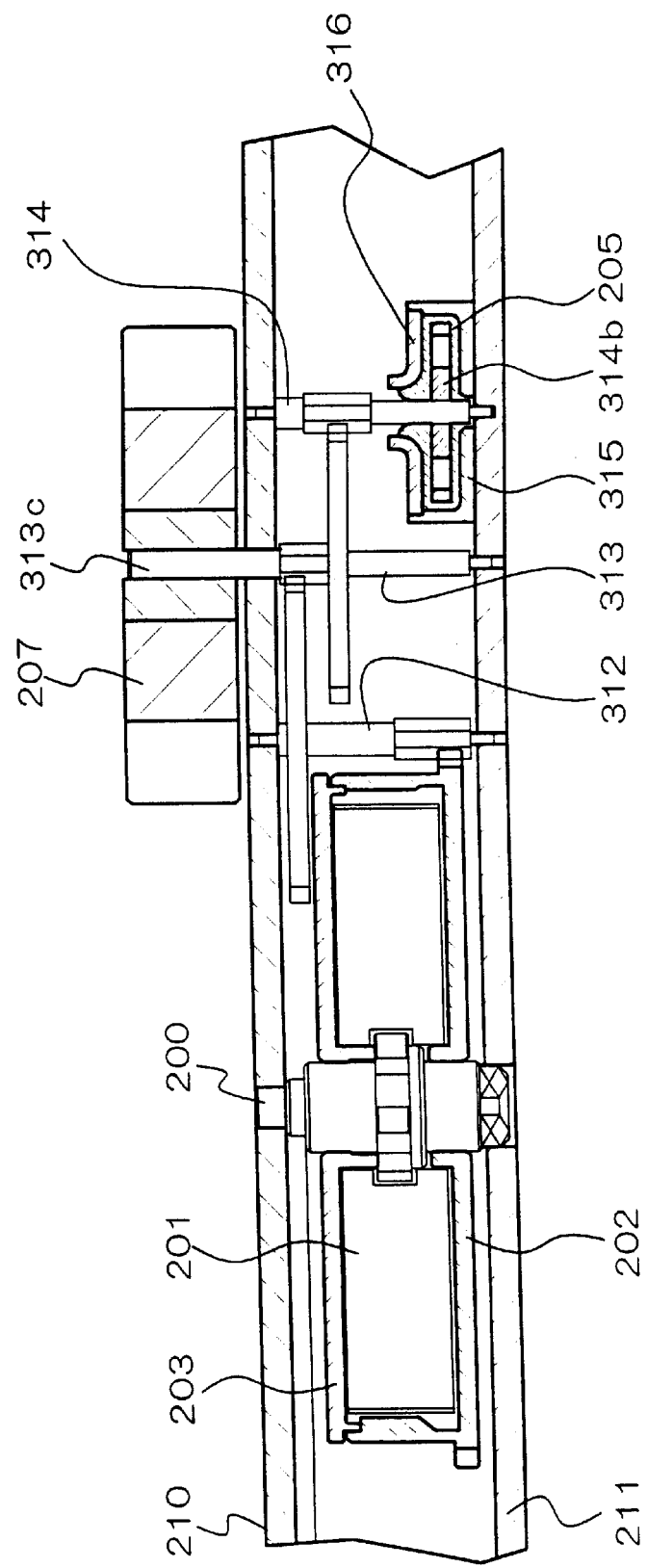
FIG. 48 is a longitudinal sectional view showing the structure of a twenty-seventh embodiment of the present invention.

Next, a mainspring mechanism according to a twenty-sixth embodiment of the present invention will be described with reference to FIG. 48. Since this embodiment includes a winding stem 200, a mainspring 201, a barrel drum 202, a barrel lid 203, a fluid 205, an output gear 207, a train wheel bridge 210, a main plate 211, a second gear 312, a third gear 313, a fourth gear 314, a braking wing portion 314b, a braking case 315, and a braking case lid 316 which are basically identical to those in the nineteenth embodiment, descriptions thereof are omitted.

In this embodiment, the output gear 207 is not connected to the second gear 312, but is connected to an extended shaft 313c of the third gear 313 while it is regulated in the rotating direction.

While the braking force against the rotational driving force of the mainspring 201 in this embodiment acts in a manner similar to that in the nineteenth embodiment, since an input-output shaft formed of the output gear 207 is rotatably connected to the third gear 313, required driving speed and driving force can be achieved. Such a configuration is suitable for a case in which a certain level of speed is needed and a certain amount of driving load exists.

As described in the nineteenth embodiment, the twenty-fifth embodiment, and the twenty-sixth embodiment, the input-output shaft (output device or output gear) of the mainspring mechanism may be connected to an arbitrary portion in the power transmitting device which increases or decreases the speed. Accordingly, since the rotational driving force of the mainspring with an appropriate driving speed and an appropriate driving torque can be obtained, various devices can be driven in an optimum manner.

[Twenty-seventh Embodiment]

Next, a mainspring mechanism according to a twenty-seventh embodiment of the present invention will be described. Since this embodiment has a configuration substantially similar to that in the nineteenth embodiment shown in FIG. 35, the following description will be given with reference to FIG. 35.

In this embodiment, a shaft portion and a braking wing portion 214b of a fourth gear 214 are separate, and both are connected in the rotating direction only by the frictional force. Therefore, when a force greater than the static frictional force between the shaft portion and the braking wing portion 214b of the fourth gear 214 is applied therebetween, the portions slip each other. Consequently, the braking force against the rotational driving force of a mainspring 201 will not exceed the static frictional force. After slipping is caused, the braking force corresponds to the dynamic frictional force between the shaft portion and the braking wing portion 214b of the fourth gear 214.

In this embodiment, for example, when an external torque is suddenly applied from the output gear 207, it is possible to prevent the driving-force storing section, the gear train, the braking section, and the like from being damaged and broken by an excessive mechanical load resulting from the external torque and the braking force of the braking section. This embodiment is quite effective particularly when the viscosity of the fluid 205 increases due to a decrease in temperature because the braking force also excessively increases and the components become more prone to damage and breakage.

In this embodiment, the slip device is formed between the shaft portion and the braking wing portion of the fourth gear 214, and the slip surface is placed inside the fluid 205. Therefore, seizing and wear can be reduced and the slip state can be stabilized by the lubricating and cooling effects of the fluid 205, and heat generation due to the slipping can be prevented.

The slip device may be disposed at any position in the course of the rotation transmitting path from the driving-force storing section to the braking section. In a case in which the input-output section (corresponding to the output gear 207 in the nineteenth embodiment) is disposed between the driving-force storing section and the braking section, it is preferable that the slip device be disposed between the input-output section and the braking section in order to reliably cut off the braking force. For example, in FIG. 35, it is preferable that the slip device be disposed at any position between the second gear 212 and the third gear 213, at the third gear 213, between the third gear 213 and the fourth gear 214, or at the fourth gear 214.

[Twenty-eighth Embodiment]

Next, a twenty-eighth embodiment of the present invention will be described with reference to FIGS. 49 and 50. Since this embodiment includes a winding stem 320, a mainspring 321, a barrel drum 322, a barrel lid 323, a partition plate 324, a bottom plate 325, an output 327, a connecting gear 331, a second gear 332, a third gear 333, a fourth gear 334, a braking shaft 335, a braking wing portion 335b, a braking case 336, and a braking case lid 337 which are basically and substantially similar to those in the twenty-third embodiment, descriptions of the similar components are omitted.

Figure 49:
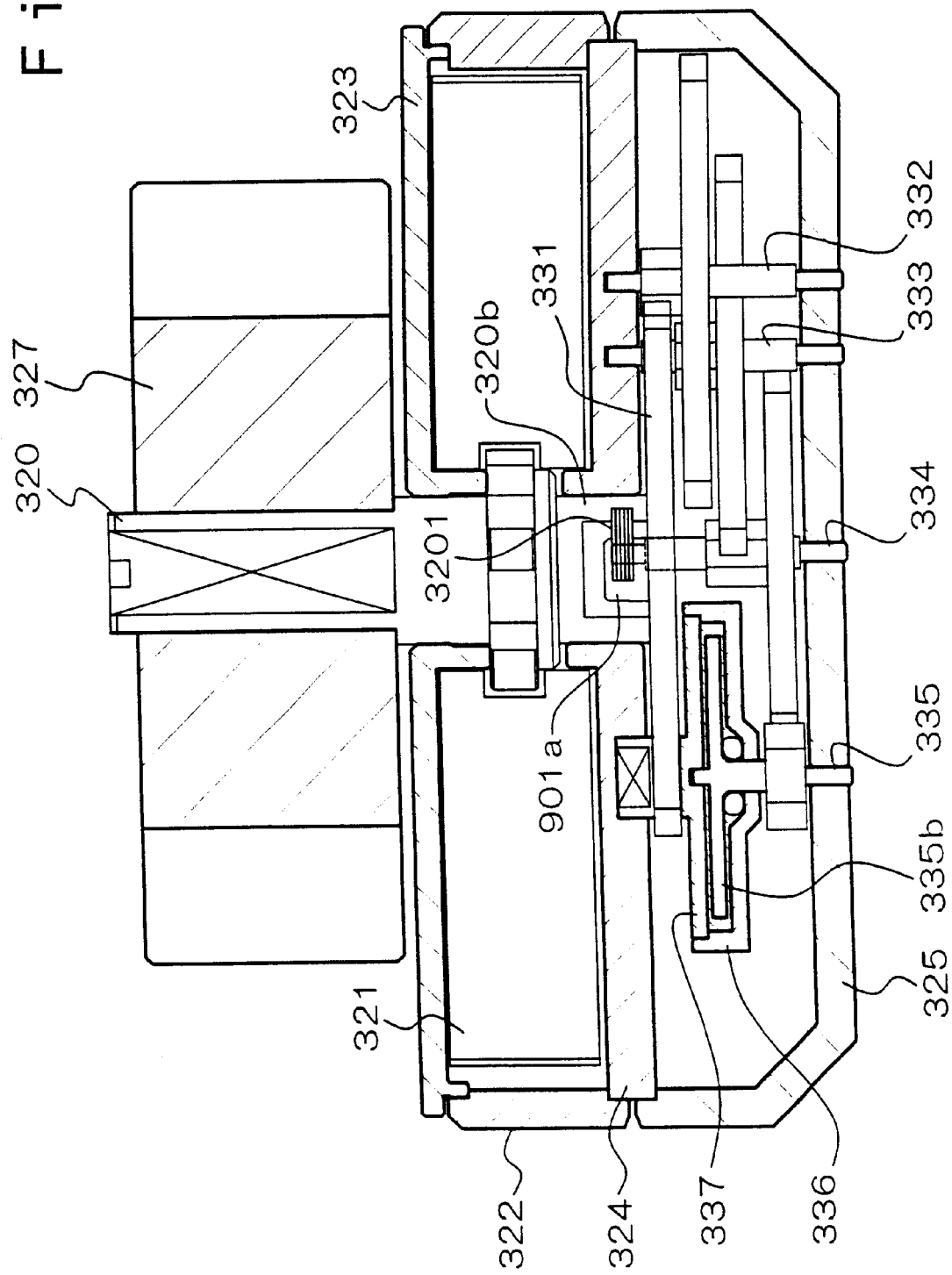
FIG. 49 is a longitudinal sectional view showing the structure of a twenty-eighth embodiment of the present invention.

In this embodiment, as shown in FIG. 49, a projecting frame 320b is formed at the lower end of the winding stem 320, and a projecting shaft 331a is formed at the center of the connecting gear 331. The projecting shaft 331a is placed inside the projecting frame 320b. A clutch spring 3201 is mounted on the projecting shaft 331a, and is engaged with the projecting frame 320b, thereby transmitting the rotation.

Figure 50:
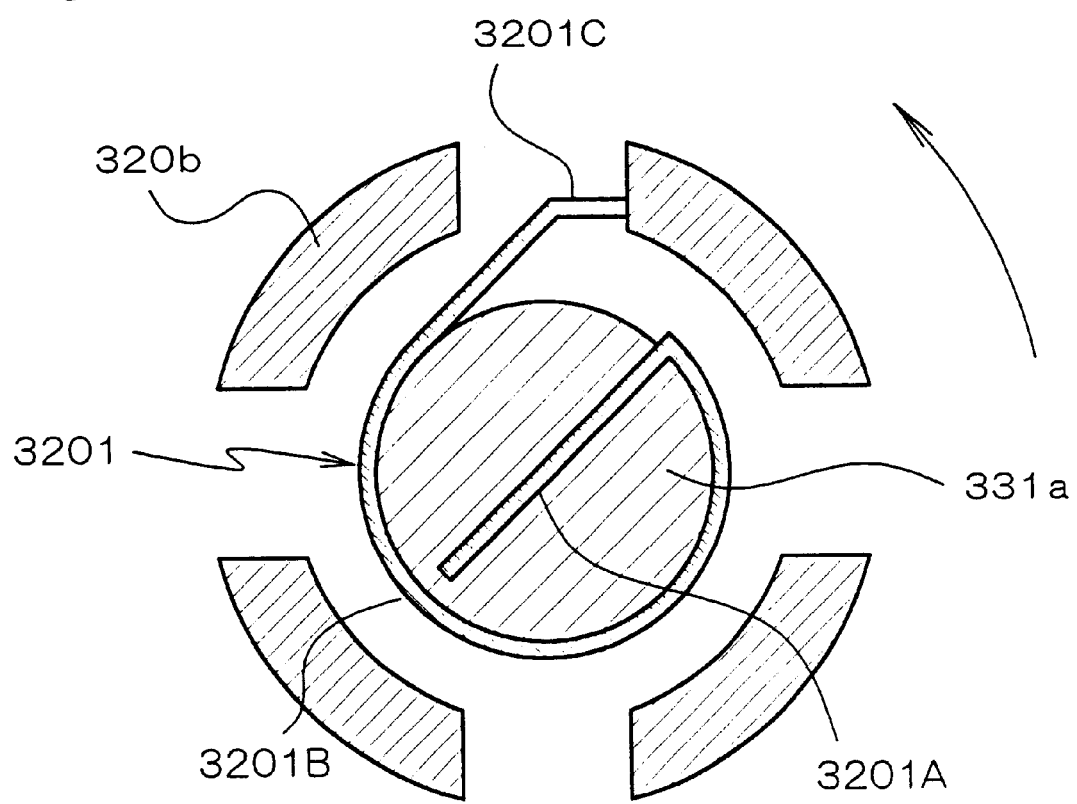
FIG. 50 is a transverse sectional view schematically showing a connecting structure between a rotating member (winding stem) and a braking member in the twenty-eighth embodiment.

FIG. 50 is a transverse sectional view showing the structure of the engaging portion between the winding stem 320 and the connecting gear 331. An inner end portion 3201A of the clutch spring 3201 is fixedly inserted in the projecting shaft 331a. The clutch spring 3201 has a curved portion 3201B which is bent from the inner end portion 3201A so as to surround the projecting shaft 331a. An outer end portion 3201C is formed at the leading end of the curved portion 3201B so that it projects away from the projecting shaft 331a to be engaged with the projecting frame 320b.

In FIG. 50, the connecting gear 331 having the projecting shaft 331a is rotatable in the counterclockwise direction in the figure (shown by the arrow in the figure) relative to the winding stem 320 having the projecting frame 320b. When the connecting gear 331 attempts to rotate clockwise in the figure, since the outer end portion 3201C of the clutch spring 3201 engages with the projecting frame 320b, the connecting gear 331 and the winding stem 320 engage in the rotating direction, and rotate together.

As described above, in this embodiment, the projecting shaft 331a, the projecting frame 320b, and the clutch spring 3201 constitute a one-way clutch serving as the rotation intermitting device in which the winding stem 320 functions as a slip portion and does not transmit the rotation when being rotated in one direction, and is linked to the connecting gear 331 in the rotating direction so as to transmit the rotation to the braking section when being rotated in the other direction.

In this embodiment, when the winding stem 320 rotates in the one direction, the mainspring 321 is wound up. The winding stem 320 is rotationally driven in the other direction by the elasticity of the wound mainspring 321.

In this embodiment, when the winding stem-320 is rotationally driven in one direction via the output gear 327, the rotation is not transmitted between the winding stem 320 and the connecting gear 331. Therefore, the winding stem 320 can wind up the mainspring 321 without receiving any braking torque.

In contrast, when the winding stem 320 is rotationally driven in the other direction by the wound mainspring 321, the winding stem 320 and the connecting gear 331 are linked in the rotating direction via the clutch spring 3201. Therefore, the winding stem 320 slowly rotates while receiving a braking torque from the braking section.

Since this embodiment operates as described above, even when an excessive driving torque is applied when the mainspring 321 is wound up, the inner mechanism can be prevented from being damaged and broken because the winding stem 320 does not receive any braking torque. Even when the viscosity of the fluid increases due to a decrease in temperature, the probability that the inner mechanism will be damaged and broken does not increase, and the mainspring 321 can be easily wound up, regardless of the viscosity of the fluid.

In addition, this embodiment also provides the advantage that a compact driving device can be achieved since the rotation intermitting device including the clutch spring 3201 has a simple structure with the clutch spring 1926 positioned between the driving-force storing section constituted by the mainspring 321 and the barrel drum 322 and the braking section including the braking wing portion 335b.

[Twenty-ninth Embodiment]

Figure 51:
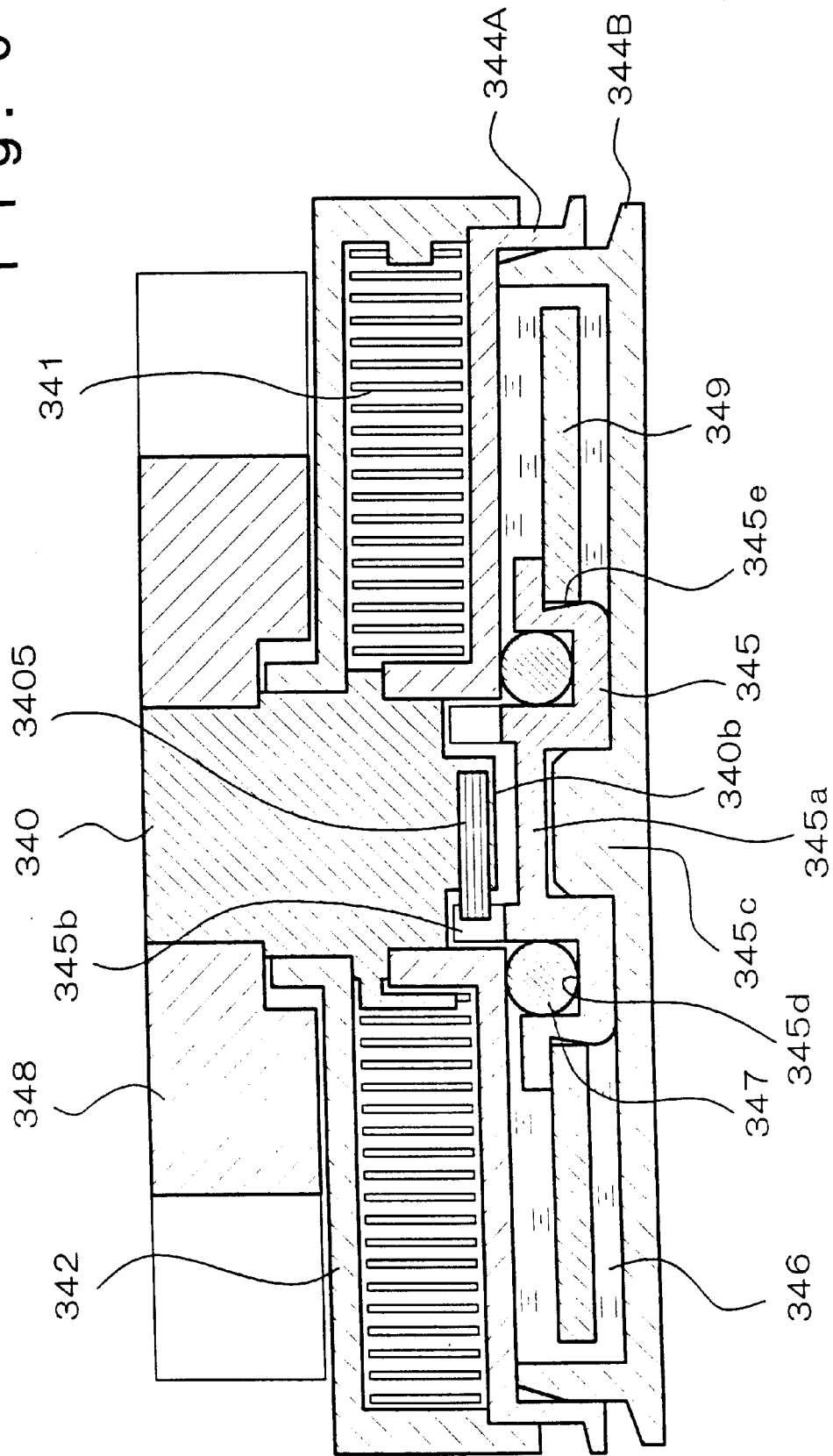
FIG. 51 is a longitudinal sectional view showing the structure of a twenty-ninth embodiment of the present invention.

Next, a mainspring mechanism shown in FIG. 51 according to a twenty-ninth embodiment of the present invention will be described. This embodiment includes a winding stem 340, a mainspring 341, a barrel drum 342, an upper braking case 344A, a lower braking case 344B, a center braking member 345, a fluid 346, a sealing member 347, an output gear 348, and a peripheral braking plate 349, and these components basically have structures substantially similar to those in the fourth embodiment.

In this embodiment, a projecting shaft 340b is formed at the lower end of the winding stem 340 serving as the rotating member, and a clutch spring 3405 is mounted on the projecting shaft 340b. The clutch spring 3405 is engaged with a projecting frame 345b formed in a center portion 345a of the center braking member 345, and controls the engaging manner of the winding stem 340 and the center braking member 345 in the rotating direction, as will be described later.

Figure 52:
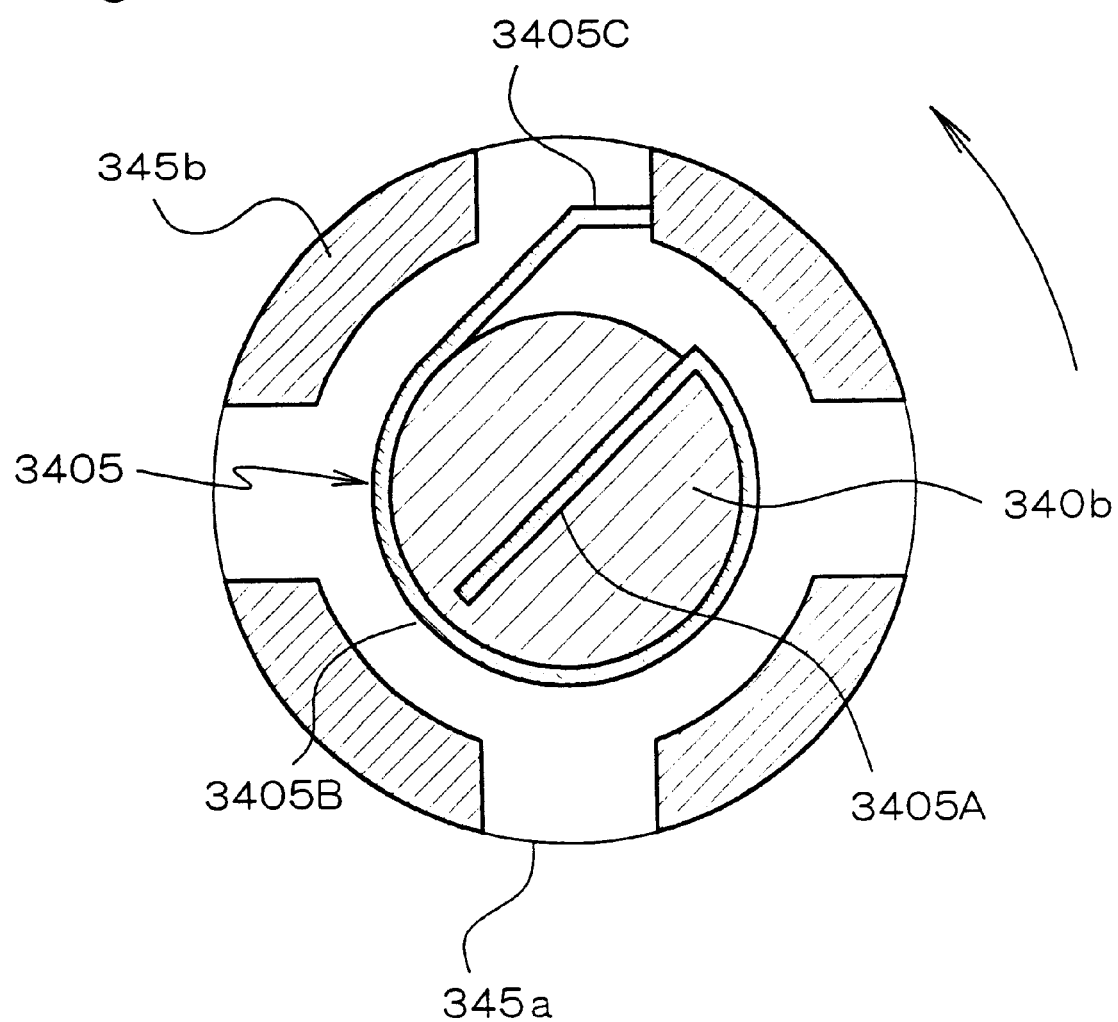
FIG. 52 is a transverse sectional view schematically showing a connecting structure between a rotating member (winding stem) and a braking member in the twenty-ninth embodiment.

FIG. 52 is a transverse sectional view showing the connecting portion of the projecting shaft 340b and the projecting frame 345b with the clutch spring 305 therebetween. As shown in this figure, an inner end portion 3405A of the clutch spring 3405 is fixedly inserted in the projecting shaft 340b. The clutch spring 3405 has a curved portion 3405B bent from the inner end portion 3405A so as to surround the projecting shaft 340b. An outer end portion 3405C is formed at the leading end of the curved portion 3405B so that it projects away from the projecting shaft 340b to be engaged with the projecting frame 345b.

In FIG. 52, the winding stem 340 having the projecting shaft 340b is rotatable in the counterclockwise direction in the figure (shown by the arrow) relative to the center braking member 345 having the projecting frame 345b. When the winding stem 340 attempts to rotate clockwise in the figure, since the outer end portion 3405C of the clutch spring 3405 engages with the projecting frame 345b, the winding stem 340 and the center braking member 345 engage with each other in the rotating direction, and rotate together.

As described above, in this embodiment, the projecting shaft 340b, the projecting frame 345b, and the clutch spring 3405 constitute a one-way clutch serving as the rotation intermitting device in which the winding stem 340 functions as a slip portion and does not transmit the rotation when being rotated in one direction, and is linked in the rotating direction so as to transmit the rotation when being rotated in the other direction.

In this embodiment, when the winding stem 340 rotates in the one direction, the mainspring 341 is wound up. The winding stem 340 is rotationally driven in the other direction by the elasticity of the wound mainspring 341.

In this embodiment, when the winding stem 340 is rotationally driven in one direction via the output gear 348, the rotation is not transmitted between the winding stem 340 and the center braking member 345. Therefore, the winding stem 340 can wind up the mainspring 341 without receiving any braking torque.

In contrast, when the winding stem 340 is rotationally driven by the wound mainspring 341, the winding stem 340 and the center braking member 345 are linked in the rotating direction via the clutch spring 3405. Therefore, the winding stem 340 slowly rotates while receiving the braking torque from the peripheral braking plate 349.

Since this embodiment operates as described above, even when an excessive driving torque is applied when the mainspring 341 is wound up, the inner mechanism can be prevented from being damaged and broken because the winding stem 340 does not receive any braking torque. Even when the viscosity of the fluid increases due to a decrease in temperature, the probability that the inner mechanism will be damaged and broken does not increase, and the mainspring 341 can be easily wound up, regardless of the viscosity of the fluid.

In addition, this embodiment also provides the advantage that a compact driving device with a quite simple structure can be achieved by the rotation intermitting device including the clutch spring 3405 while the driving-force storing section constituted by the mainspring 341 and the barrel drum 342 and the braking section including the center braking member 345 and the peripheral braking plate 349 are combined.

[Thirtieth Embodiment]

Next, a description will be given of the general configuration of a mainspring mechanism having a winding-number regulating device according to a thirtieth embodiment of the present invention with reference to FIG. 53. The configuration of this mainspring mechanism is also applicable to all of the above-described mainspring mechanisms.

Figure 53:
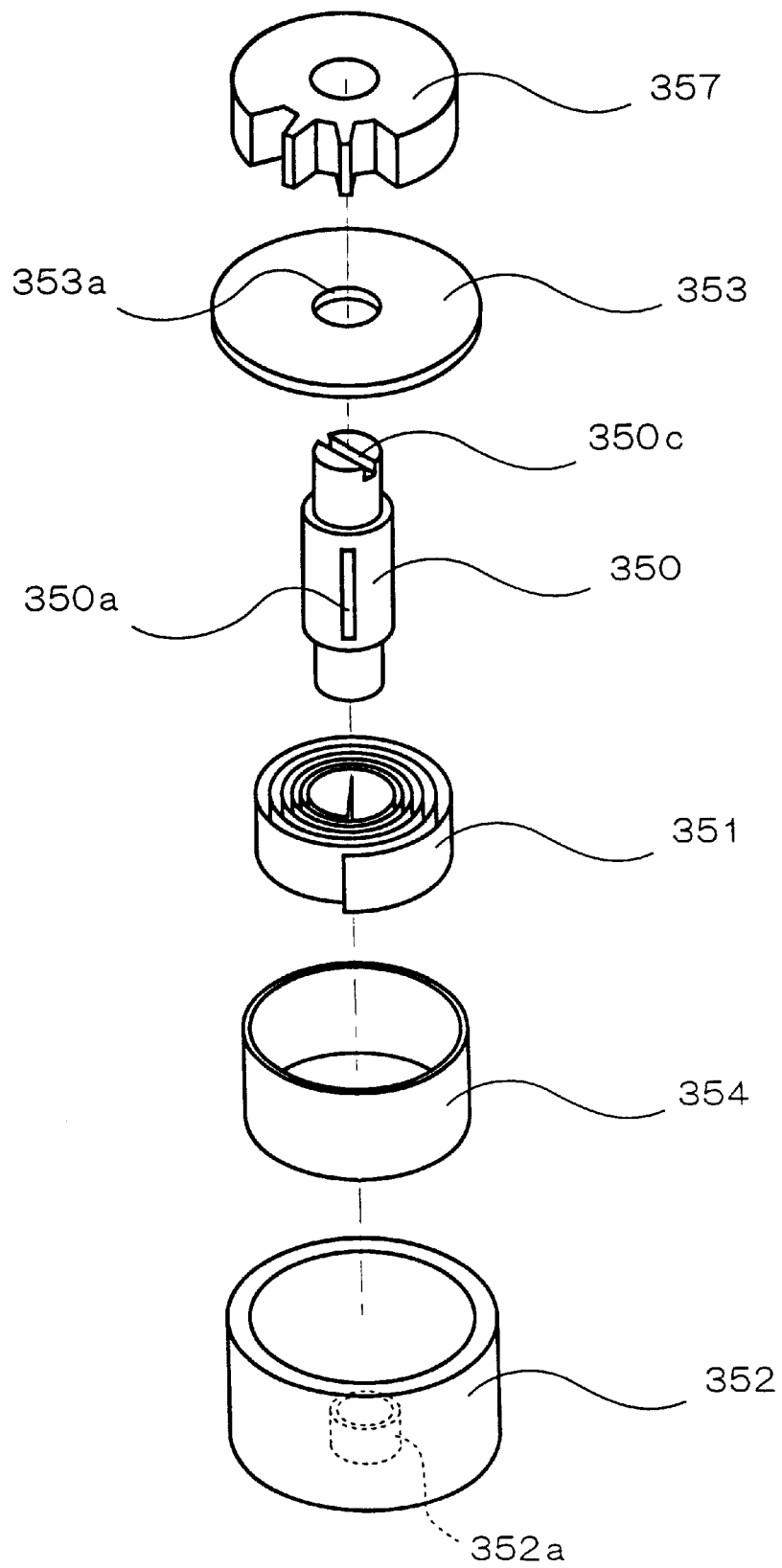
FIG. 53 is a longitudinal sectional view showing the structure of a thirtieth embodiment of the present invention.

FIG. 53 is a general exploded perspective view showing the principal part of the mainspring mechanism. An output gear 357 is engaged with a winding stem 350 serving as the rotating member or the center member, and the winding stem 350 is rotatably held at the center position by an upper lid (barrel lid) 353 and a mainspring holding portion (barrel drum) 352. As the output gear 357, another member, such as a pulley, may be freely selected according to the object to be output. The output gear 357 may be engaged with a member corresponding to an output gear, such as a rack or a belt. A shaft holding portion 353a of the upper lid 353 and a shaft holding portion 352a of the mainspring holding portion 352 which rotatably hold the winding stem 350 may be formed of a rotary bearing or an oilless bearing, or may be coated with oil and be subjected to a nondiffusion process or the like to achieve fluid lubrication. By this placement of the bearings, an increase in load and a decrease in output due to friction can be avoided.

Furthermore, a mainspring 351 is held in the mainspring holding portion 352. The mainspring 351 is connected to the winding stem 350 at an inner end, and is engaged with a sliding cylindrical member 354 at an outer end. The winding stem 350 has a slit 350a, as shown in the figure. By engaging the inner end of the mainspring 351 with the slit 350a, the mainspring 351 and the winding stem 350 are connected in the rotating direction. Instead of such an engaging method, a claw formed on the outer periphery of the winding stem 350 and a hole formed at the inner end of the mainspring 351 may be engaged with each other. In this case, by designing the sectional shape of the rotation axis like an Archimedes' spiral, a more stable torque can be extracted from the mainspring, and the mainspring can be wound up with a uniform stress and without any gap as in theory. This can avoid stress concentration, and increases the durability of the mainspring 351.

The outer peripheral surface of the sliding cylindrical member 354 is in contact with the inner wall of the mainspring holding portion 352. The sliding cylindrical member 354 slips onto the mainspring holding portion 352 when a force greater than a predetermined force is applied to the mainspring holding portion 352, and is engaged with the mainspring holding portion 352 in the rotating direction by friction when a force less than the predetermined force is applied. That is, the frictional engagement between the outer peripheral surface of the sliding cylindrical member 354 and the inner peripheral surface of the mainspring holding portion 352 form a winding-number regulating device.

When the sliding cylindrical member 354 is provided as described above, since the mainspring holding portion 352 and the sliding cylindrical member 354 are usually connected in the rotating direction by frictional force, the mainspring 351 is wound up by the relative rotation of the winding stem 350 and the mainspring holding portion 352. When the mainspring 351 is wound up to a certain degree, the torque thereof is increased by the static frictional force between the sliding cylindrical member 354 and the mainspring holding portion 352. As a result, slipping occurs therebetween, and the mainspring 351 cannot be wound up further. Therefore, the mainspring 351 can be put into a predetermined winding state by being simply wound up since the winding regulating member regulates the degree of winding of the mainspring 351. This eliminates the necessity of controlling the winding state of the mainspring by adjusting the degree of winding, and prevents the mainspring 351 from being overwound. Consequently, the mainspring can be prevented from being broken, and the lifetime thereof can be extended.

[Thirty-first Embodiment]

Next, another example of a mainspring mechanism having a winding-number regulating device will be described as a thirty-first embodiment with reference to FIG. 54. Since this mainspring mechanism includes a winding stem 360, an upper lid (barrel lid) 363, and an output gear 367 similar to those in the thirtieth embodiment, descriptions thereof are omitted.

Figure 54:
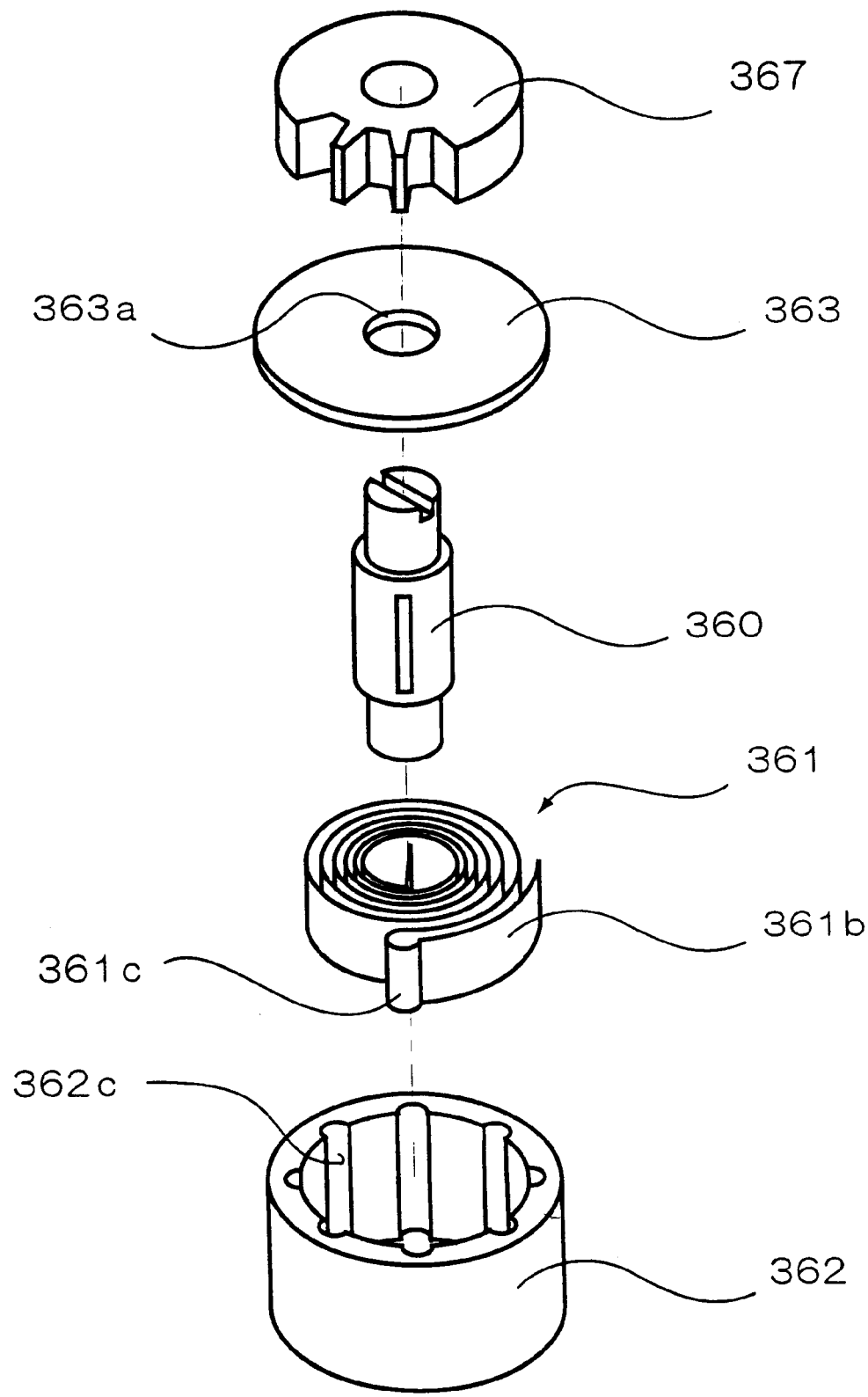
FIG. 54 is a longitudinal sectional view showing the structure of a thirty-first embodiment of the present invention.

As shown in FIG. 54, a folded portion 361b is formed on the outer periphery of a mainspring 361 by folding a portion of the mainspring 361 adjacent to the outer end. A curved portion for forming the folded portion 361b is a cylindrical portion 361c shaped nearly like a cylinder. On the other hand, a plurality of concave grooves 362c extending in the axial direction are formed on the inner peripheral surface of a mainspring holding portion (barrel drum) 362, and are arranged in the circumferential direction. The concave grooves 362c have the shape corresponding to the cylindrical portion 361c so that they can be fitted therein.

In a state in which the mainspring 361 is hardly wound up, the cylindrical portion 361c of the mainspring 361 is pressed against the inner peripheral surface of the mainspring holding portion 362 by the elasticity of the mainspring. Therefore, the cylindrical portion 361c and the concave groove 362c are fitted together, and the outer end of the mainspring 361 and the mainspring holding portion 362 are connected in the rotating direction. When the mainspring 361 is wound up, the pressing force between the cylindrical portion 361c and the concave groove 362c is reduced. When the mainspring 361 is finally placed into a predetermined winding state, the cylindrical portion 361c is disengaged from the concave groove 362c and moves over the inner peripheral surface of the mainspring holding portion 362. Consequently, the mainspring 361 cannot be wound further.

[Thirty-second Embodiment]

Figure 55:
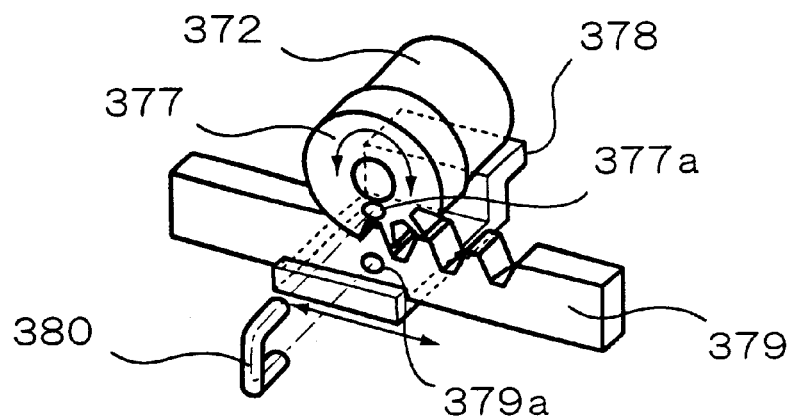
FIG. 55 is a general perspective view showing the structure of a thirty-second embodiment of the present invention.

Next, a mainspring mechanism according to a thirty-second embodiment of the present invention will be described with reference to FIG. 55. As shown in FIG. 55, the mainspring mechanism of this embodiment has a configuration similar to that in the thirtieth embodiment or the thirty-first embodiment, in which a frame member 378 fixed to a mainspring holding portion 372, and a rack 379 meshed with an output gear 377 and guided by the frame member 378 are added.

In this mainspring mechanism, the output gear 377 connected to a mainspring (not shown) has an engaging hole 377a, and the rack 379 also has an engaging hole 379a. A nearly angular U-shaped fixing member (holding member) 380 can be inserted into the engaging holes 377a and 379a.

When the fixing member 380 is inserted in the engaging holes 377a and 379a, the positional relationship between the output gear 377 and the rack 379 is limited, and the rotation of the output gear 377 is prevented. Therefore, even when the mainspring held in the mainspring holding portion 372 of the mainspring mechanism is wound up, the winding state can be maintained.

The configuration of the above mainspring mechanism except for the rack may be the same as any of the configurations in the first to twenty-ninth embodiments. Furthermore, the holding structure in this embodiment may be applied to the mainspring mechanism having the rack according to the eleventh embodiment shown in FIG. 23.

[Thirty-third Embodiment]

Figure 56:
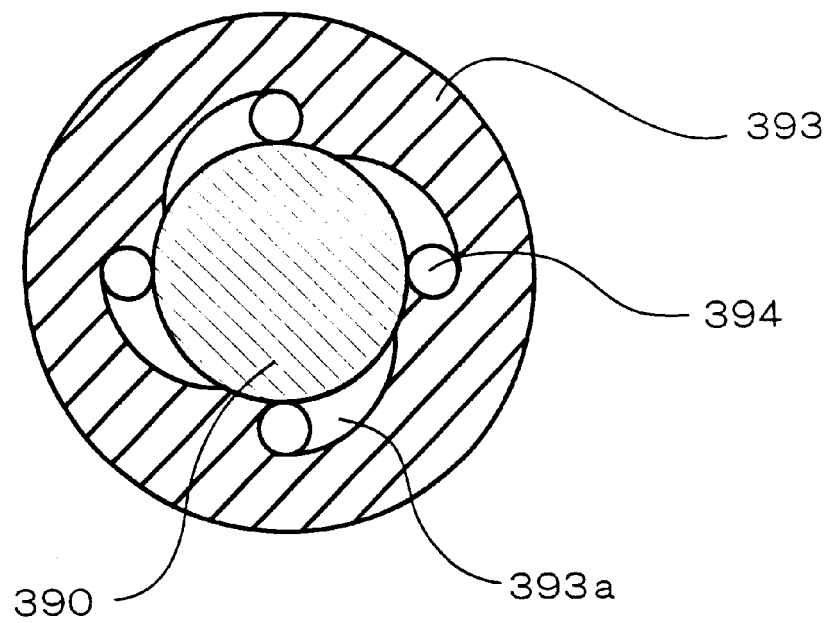
FIG. 56 is a transverse sectional view showing the structure of a one-way clutch in a thirty-third embodiment of the present invention.

Next, a mainspring mechanism according to a thirty-third embodiment of the present invention will be described with reference to FIG. 56. The mainspring mechanism of this embodiment has a configuration almost the same as that in the thirtieth embodiment shown in FIG. 53 or the thirty-first embodiment shown in FIG. 54, in which a one-way clutch 393 shown in FIG. 56 is incorporated in the shaft holding portion of the output gear 357 or 367. The one-way clutch 393 allows a shaft material 390 to be passed therethrough, and has a plurality of inner grooves 393a on the inner peripheral surface opposing the shaft material 390. The inner grooves 393a are shaped so that the depth thereof gradually increases, as viewed in the clockwise direction in the figure. A ball 394 is stored in each of the inner grooves 393a.

When the shaft material 390 rotates clockwise in the figure, the balls 394 are placed at the deepest positions in the inner grooves 393a, as shown in the figure, and the shaft 390 is allowed to rotate. In contrast, when the shaft material 390 rotates counterclockwise in the figure, the balls 394 attempt to move toward the shallow portions in the inner grooves 393a by the friction with the shaft material 390. Therefore, the shaft material 390 is tightened from around by the balls 394, and is prevented from rotating.

The above one-way clutch 393 is mounted in the shaft holding portion of the output gear 357 or 367 of the mainspring mechanism shown in FIG. 53 or 54 so that it is placed between the shaft portion and the winding stem 350 or 360, and the winding stem 350 or 360 is set so as to rotate relative to the one-way clutch 393 in the counterclockwise direction, as viewed from the upper side of FIG. 53 or 54 and not to rotate in the clockwise direction. In this case, when the mainspring 351 or 361 is wound up by rotating the winding stem 350 or 360 with a tool (screwdriver) fitted in the rotation-controlling groove 350c, the output gear 357 or 367 and the winding stem 350 or 360 are not connected in the rotating direction. Therefore, for example, even when the output gear 357 or 367 is meshed with another member or device, the mainspring 351 or 361 can be wound up smoothly. Conversely, when a driving force is output from the mainspring 351 or 361, since the one-way clutch 393 connects the winding stem 350 or 360 and the output gear 357 or 367 in the rotating direction, the output gear 357 or 367 can be rotationally driven, and another member or device can be driven via the output gear 357 or 367.

[Thirty-fourth Embodiment]

Next, a device having the mainspring mechanism of the present invention will be described as a thirty-fourth embodiment with reference to FIGS. 57 and 58. An electronic device 400 of this embodiment comprises a main body 410 having an operating section 411 and a display section 412, and a cover 420 slidably mounted on the main body 410, as shown in FIG. 57.

a. A mainspring mechanism 413 is incorporated in the main body 410, and a part of a gear 414 serving as the output section and connected to the mainspring mechanism 413 is exposed to the outside. Side face portions 415 are formed on both sides of the operating section 411 of the main body 410 so as to be in sliding contact with a part of the cover 420 (side frame portions 422 which will be described later). Holding projections 415a retractably protrude from the pair of side face portions 415, respectively, so as to hold the cover 420 in a closed state. The holding projections 415a normally protrude from the side face portions 415, as shown in the figure, and retract therein so as to release the cover 420 when unlock buttons 416 are pressed. As shown in FIG. 58, holding hooks 415b protrude from the pair of side face portions 415, respectively, so as to hold the cover 420 so that the cover 420 will not fall off the main body 410.

On the other hand, the cover 420 is structured so as to cover the entire operating surface of the operating section 411, and includes a rack portion 421 to be meshed with the gear 414, and a pair of side frame portions 422 opposing the side face portions 415. As shown in FIG. 58, concave grooves 422a are formed on the inner surfaces of the pair of side frame portions 422, respectively, so as to accommodate the holding projections 415a and the holding hooks 415b. Ribs 422b are formed at some points in the concave grooves 422a. When the cover 420 is slid and assembled onto the main body 410, the ribs 422b press and cross the holding projections 415. Consequently, the ribs 422b are retained by the holding projections 415a, and the cover 420 is locked in the closed state.

Figure 57:
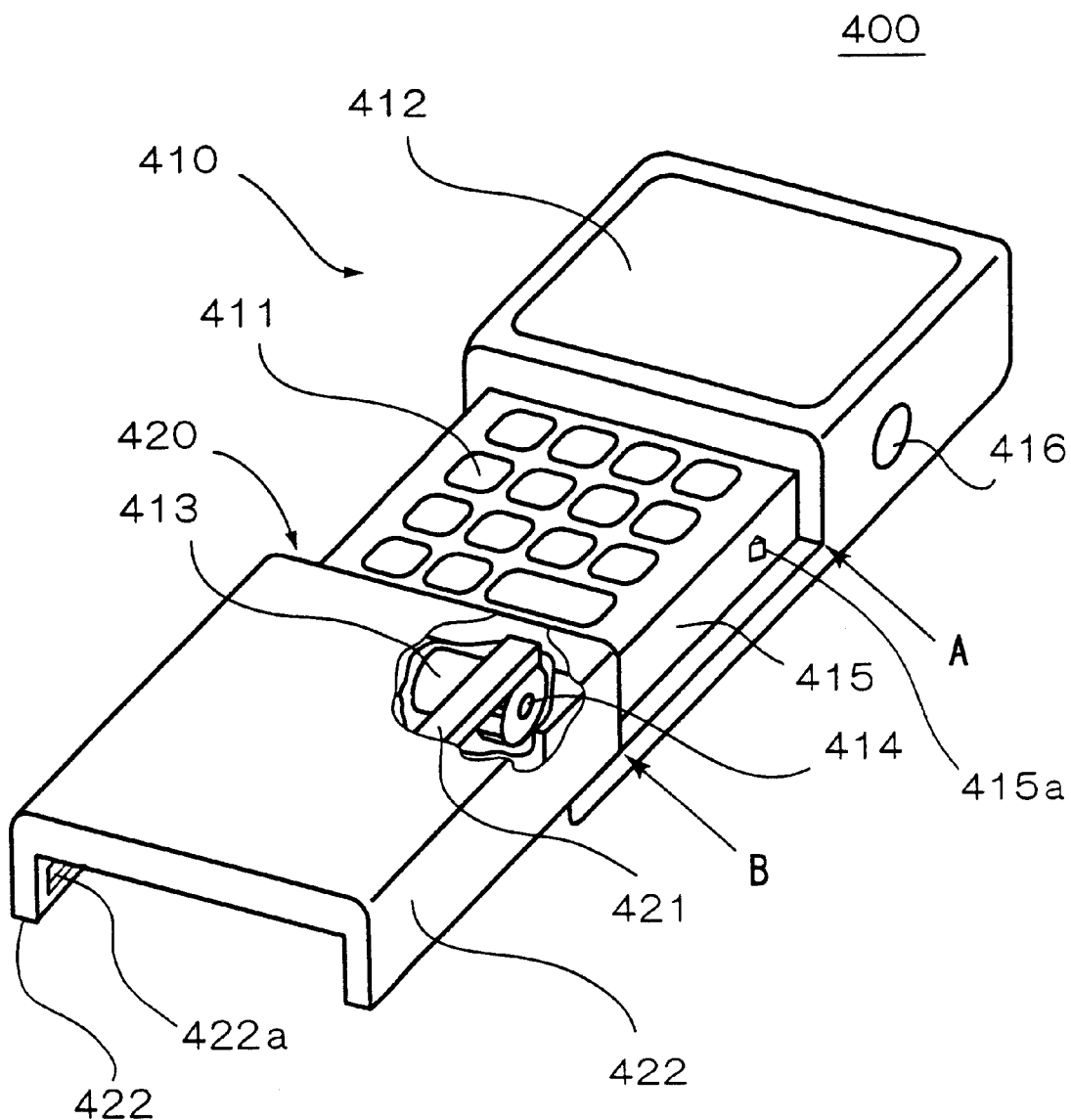
FIG. 57 is a general perspective view showing the structure of a thirty-fourth embodiment of the present invention.
Figure 58:
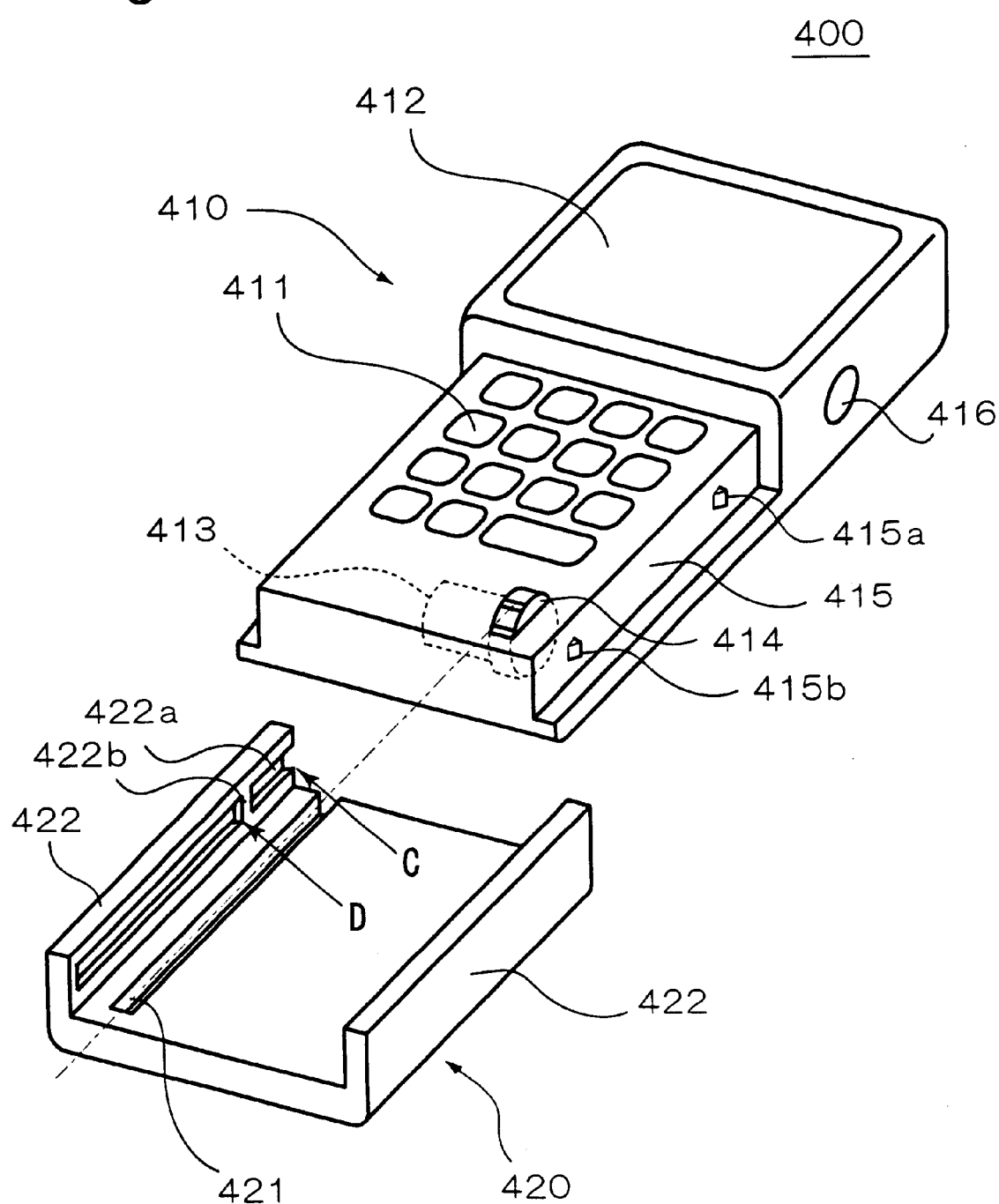
FIG. 58 is a general perspective view showing a state in which a main body and a cover are separated and the cover is turned upside down in the thirty-fourth embodiment of the present invention.

In the electronic device 400 with the above-described configuration, when the cover 420, which is separated from the main body 410 as shown in FIG. 58, is fitted onto the main body 410, and is slid by being pushed, as shown in FIG. 57, the rack portion 421 of the cover 420 is meshed with the gear 414 and rotates the gear 414, thereby winding up the mainspring (not shown) in the mainspring mechanism 413. By further sliding and pushing the cover 420 until the cover 420 is retained by the holding projections 415a after the ribs 422b cross the holding hooks 415b, the cover 420 is mounted onto the main body 410 in the closed state.

In the above closed state, since the holding projections 415a are retracted by pressing the unlock buttons 416, as described above, the cover 420 is opened by the driving force of the mainspring in the mainspring mechanism 413, and slides until the ribs 422b of the cover 420 abut the holding hooks 415b projecting from the side face portions 415.

Since the mainspring mechanism 413 is automatically wound up when the cover 420 is mounted on the main body 410 in this embodiment, it is unnecessary to wind up the mainspring mechanism 413 before mounting, and to maintain the winding state. Furthermore, since the stroke A-B required from the beginning of the engagement between the gear 414 and the rack portion 421 and to the closed state is longer than the opening and closing stroke of the mounted cover 420 by a distance C-D shown in FIG. 58, even in the state in which the mounted cover 420 is completely opened (that is, the ribs 422b are retained by the holding hooks 415b), the mainspring in the mainspring mechanism 413 is not completely unwound. Accordingly, the mainspring mechanism 413 allows the cover 420 to be opened by a stable driving force.

[Thirty-fifth Embodiment]

Figure 59:
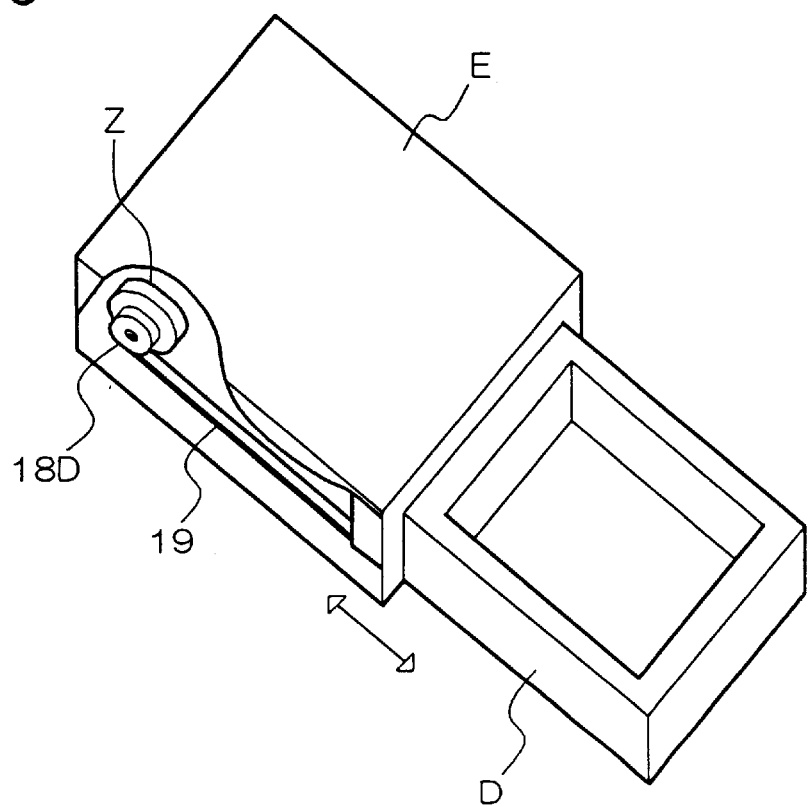
FIG. 59 is a general perspective view schematically showing the structure of a thirty-fifth embodiment of the present invention.

Next, a device having the mainspring mechanism of the present invention will be described as a thirty-fifth embodiment with reference to FIG. 59. In this embodiment, a mainspring mechanism Z according to the above embodiments is mounted in a drawer mechanism which includes a drawer D, and a case-shaped drawer holding section E capable of holding the drawer D therein. The mainspring mechanism Z is mounted inside the drawer holding section E, and has as output device a cylindrical member 18D shown in FIG. 8, and a belt 19 connected to the cylindrical member 18D at the base end. The leading end of the belt 19 is attached to the inner end of the drawer D.

In this embodiment, the mainspring in the mainspring mechanism Z is wound up by drawing the drawer D out, as shown in the figure, and is locked by a lock mechanism (not shown). When the lock is released in this state, since the cylindrical member 18D is rotated by the driving force of the mainspring, the belt 19 is wound onto the cylindrical member 18D, and the drawer D is slowly drawn back by the braking force which is applied from the braking section inside the mainspring mechanism Z.

While the mainspring in the mainspring mechanism Z is wound up when the drawer D is drawn out, and the drawer D is put into the drawer holding section E by the driving force of the mainspring in the drawer mechanism of the above embodiment, conversely, the mainspring in the mainspring mechanism Z may be wound up when the drawer D is put into the section E, and the drawer D may be locked in the closed state, and may be slowly drawn out by the driving force of the mainspring by releasing the locked state.

[Thirty-sixth Embodiment]

Figure 60:
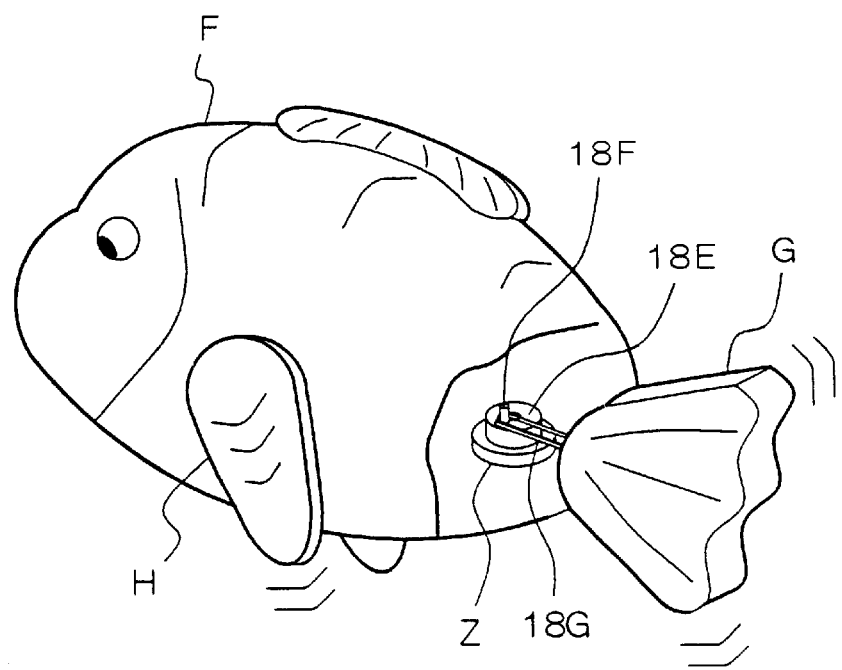
FIG. 60 is a general perspective view schematically showing the structure of a thirty-sixth embodiment of the present invention.

Finally, a device having the mainspring mechanism of the present invention will be described as a thirty-sixth embodiment with reference to FIG. 60. This embodiment shows an example in which the present invention is applied to a moving toy. A moving portion G (tail fin) and moving portions H (pectoral fins) are mounted on a toy body F so that they can swing. A mainspring mechanism Z is incorporated in the toy body F. The mainspring mechanism Z includes, as the output device, a cylindrical member 18E, an output shaft 18F mounted on the cylindrical member 18E, and a transmission belt 18G engaged with the output shaft 18F. The leading end of the transmission belt 18G is attached to the ends of the moving portions G and H.

When the cylindrical member 18E is rotated by the driving force of the mainspring in the mainspring mechanism Z, the output shaft 18f rotates and swings the transmission belt 18G, and therefore, the moving portions G and H swing in response thereto. Accordingly, for example, when the leading end of the output shaft 18F protrudes outward from the toy body F, the mainspring in the mainspring mechanism Z can be wound up by rotating the output shaft 18F, and the moving portions G and H can be swung by releasing the output shaft 18F.

[Other Alternatives]

The mainspring mechanism and device of the present invention are not limited only to the above illustrated embodiments, and various modifications are, of course, possible without departing from the scope of the present invention.

For example, while all the above embodiments include a single mainspring, the driving force may be increased or the driving time and driving distance may be increased by providing a plurality of mainsprings. In this case, for example, a relatively compact structure can be achieved by stacking the plurality of mainsprings in the axial direction thereof. When a plurality of mainsprings are provided, since the winding forces (driving forces) of the mainsprings may be different from one another, the winding force (driving force) of the entire mechanism can be freely and arbitrarily determined, and can be finely adjusted with ease.

In the mainspring mechanism of the present invention, it is preferable that most of the components (for example, the rotating member (shaft member) and the mainspring holding portion) be made of metal, in order to reduce the size and thickness of the mechanism. Furthermore, it is preferable that the output device be molded from synthetic resin in order to reduce noise.

While a spring shaped in a spiral that is made of stainless steel or iron material is generally used as the mainspring, it may be made of any material and may have any shape as long as it can produce a torque by its rotation.

While it is preferable to use various kinds of oils as the fluid, various kinds of liquids or powders (grains) may be used instead of the oils.

Industrial Applicability

Since the present invention adopts a configuration which can simplify the structure of the mainspring mechanism and which can reduce the number of components, the size and thickness of the mainspring mechanism can be reduced. Moreover, the production cost of the mainspring mechanism can be reduced. It is also possible to provide a mainspring mechanism which can efficiently transmit the driving force and which can be easily mounted in various devices. In addition, it is possible to easily control the braking properties of the braking section in the mainspring mechanism.

What is claimed is:

1. A mainspring mechanism comprising:

a driving-force storing section including a mainspring to be wound up by a winding force so as to store a resilient force, a mainspring holding portion connected to an outer end of said mainspring and holding said mainspring therein, and a rotating member connected to an inner end of said mainspring and rotatably supported by said mainspring holding portion;

output means connected to said rotating member; and a braking section having a braking member connected to said rotating member so as to produce a braking force in response to the rotation of said braking member.

2. A mainspring mechanism according to claim 1, wherein said driving-force storing section and said braking section are separate from each other.

3. A mainspring mechanism according to claim 2, wherein said braking section forms a unit by itself.

4. A mainspring mechanism according to claim 1, wherein said rotating member and said braking member are separate from each other, and are linked with each other at least in the rotating direction.

5. A mainspring mechanism according to claim 1, wherein said braking section has a cushioning mechanism for cushioning a rotational force transmitted from said driving-force storing section.

6. A mainspring mechanism according to claim 1, wherein said driving-force storing section is hermetically sealed.

7. A mainspring mechanism according to claim 1, wherein a fluid in contact with said braking member is stored in said braking section, and the braking force is produced by a rotational resistance of said braking member with respect to said fluid.

* * * * *